US012690606B2

(12) United States Patent
Robinson et al.

(10) Patent No.: US 12,690,606 B2
(45) **Date of Patent: *Jul. 28, 2026**

(54) TOBACCO-CONTAINING SMOKING ARTICLE

(71) Applicant: RAI Strategic Holdings, Inc., Winston-Salem, NC (US)

(72) Inventors: John Howard Robinson, Kernersville, NC (US); David William Griffith, Jr., Winston-Salem, NC (US); Billy Tyrone Conner, Clemmons, NC (US); Evon Llewellyn Crooks, Mocksville, NC (US); Dempsey Bailey Brewer, Jr., East Bend, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,492

(22) Filed: Mar. 6, 2024

(65) Prior Publication Data

US 2024/0206521 A1 Jun. 27, 2024

Related U.S. Application Data

(60) Continuation of application No. 18/469,365, filed on Sep. 18, 2023, now Pat. No. 11,986,009, which is a (Continued)

(51) Int. Cl.
*A24B 3/14* (2006.01)
*A24B 13/02* (2006.01)
(Continued)

(52) U.S. Cl.
CPC ................ *A24B 3/14* (2013.01); *A24B 13/02* (2013.01); *A24B 15/12* (2013.01); *A24B 15/167* (2016.11);
(Continued)

(58) Field of Classification Search
None
See application file for complete search history.

(56) References Cited

U.S. PATENT DOCUMENTS 32,013 A 4/1861 Taylor
374,584 A 12/1887 Cook
(Continued)

FOREIGN PATENT DOCUMENTS

AU 276250 7/1965
AU 1964039525 A 7/1965
(Continued)

OTHER PUBLICATIONS

Comments of The American Conservative Union in *Certain Tobacco Heating Articles and Components Thereof,* No. 337-3447 (U.S.I.T.C. Apr. 22, 2020).

(Continued)

*Primary Examiner* — Phu H Nguyen
(74) *Attorney, Agent, or Firm* — Womble Bond Dickinson (US) LLP

(57) ABSTRACT

A smoking article may include a cigarette incorporated within an electrically powered aerosol generating device that acts as a holder for that cigarette. The smoking article possesses at least one form of tobacco. The smoking article also possesses a mouth-end piece that is used by the smoker to inhale components of tobacco that are generated by the action of heat upon components of the cigarette. A representative smoking article possesses an outer housing incorporating a source of electrical power (e.g., a battery), a sensing mechanism for powering the device at least during periods of draw, and a heating device (e.g., at least one electrical resistance heating element) for forming a thermally generated aerosol that incorporates components of tobacco. During use, the cigarette is positioned within the (Continued)

device, and after use, the used cigarette is removed from the device and replaced with another cigarette.

16 Claims, 5 Drawing Sheets

Related U.S. Application Data division of application No. 16/271,443, filed on Feb. 8, 2019, now Pat. No. 11,785,978, which is a continuation of application No. 15/879,268, filed on Jan. 24, 2018, now Pat. No. 10,231,488, which is a continuation of application No. 15/286,087, filed on Oct. 5, 2016, now Pat. No. 9,901,123, which is a continuation of application No. 14/527,287, filed on Oct. 29, 2014, now Pat. No. 9,801,416, which is a continuation of application No. 13/297,983, filed on Nov. 16, 2011, now Pat. No. 8,899,238, which is a continuation of application No. 12/763,890, filed on Apr. 20, 2010, now Pat. No. 8,079,371, which is a continuation of application No. 11/550,634, filed on Oct. 18, 2006, now Pat. No. 7,726,320.

(51) Int. Cl.

*A24B 15/12* (2006.01)
*A24B 15/167* (2020.01)
*A24D 1/00* (2020.01)
*A24D 1/20* (2020.01)
*A24F 40/10* (2020.01)
*A24F 40/20* (2020.01)
*A24F 40/40* (2020.01)
*A24F 40/42* (2020.01)
*H05B 3/42* (2006.01)

(52) U.S. Cl.

CPC ............... *A24D 1/002* (2013.01); *A24D 1/20* (2020.01); *A24F 40/40* (2020.01); *A24F 40/42* (2020.01); *H05B 3/42* (2013.01); *A24F 40/10* (2020.01); *A24F 40/20* (2020.01); *H05B 2203/021* (2013.01)

(56) References Cited

U.S. PATENT DOCUMENTS

| | | | |
|---|---|---|---|
| 438,310 | A | 10/1890 | Edison |
| 576,653 | A | 2/1897 | Bowlby |
| 595,070 | A | 12/1897 | Oldenbusch |
| 705,919 | A | 7/1902 | Gill |
| 720,007 | A | 2/1903 | Dexter |
| 780,087 | A | 1/1905 | Burt |
| 799,844 | A | 9/1905 | Fuller |
| 968,160 | A | 8/1910 | Johnson |
| 969,076 | A | 8/1910 | Pender |
| 1,016,844 | A | 2/1912 | Moonelis |
| 1,067,531 | A | 7/1913 | MacGregor |
| 1,084,304 | A | 1/1914 | Vaughn |
| 1,147,416 | A | 7/1915 | MacDonald |
| 1,163,183 | A | 12/1915 | Stoll |
| 1,299,162 | A | 4/1919 | Fisher |
| 1,304,075 | A | 5/1919 | Lofgren |
| 1,347,631 | A | 7/1920 | Jean |
| 1,446,087 | A | 2/1923 | Griffin |
| 1,485,260 | A | 2/1924 | Fritz |
| 1,505,748 | A | 8/1924 | Louis |
| 1,514,682 | A | 11/1924 | Wilson |
| 1,517,584 | A | 12/1924 | Reece |
| 1,552,877 | A | 9/1925 | Phillipps et al. |
| 1,632,335 | A | 6/1927 | Hiering |
| 1,654,905 | A | 1/1928 | Voos |
| 1,706,244 | A | 3/1929 | Meyerson |
| 1,771,366 | A | 7/1930 | Wyss et al. |
| 1,775,947 | A | 9/1930 | Robinson |
| 1,845,340 | A | 2/1932 | Ritz |
| 1,879,128 | A | 9/1932 | Despe |
| 1,968,509 | A | 7/1934 | Tiffany |
| 1,972,118 | A | 9/1934 | McDill |
| 1,998,683 | A | 4/1935 | Montgomery |
| 2,031,363 | A | 2/1936 | Elof |
| 2,032,695 | A | 3/1936 | Gimera |
| 2,039,559 | A | 5/1936 | Segal |
| 2,057,353 | A | 10/1936 | Whittemore, Jr. |
| 2,086,192 | A | 7/1937 | Schumaker |
| 2,104,266 | A | 1/1938 | McCormick |
| 2,140,516 | A | 12/1938 | Cowan |
| 2,159,698 | A | 5/1939 | Julius et al. |
| 2,177,636 | A | 10/1939 | Norma et al. |
| 2,195,260 | A | 3/1940 | Rasener |
| 2,231,909 | A | 2/1941 | Hempel |
| 2,327,120 | A | 8/1943 | Mccoon |
| D142,178 | S | 8/1945 | Becwar |
| 2,460,427 | A | 2/1949 | Musselman et al. |
| 2,461,664 | A | 2/1949 | Smith |
| 2,472,282 | A | 6/1949 | Burchett |
| 2,483,304 | A | 9/1949 | Rudolf |
| 2,502,561 | A | 4/1950 | Ludwig |
| 2,545,851 | A | 3/1951 | Kardos |
| 2,765,949 | A | 10/1956 | Swan |
| 2,805,669 | A | 9/1957 | Merino |
| 2,830,597 | A | 4/1958 | Jakob |
| 2,860,638 | A | 11/1958 | Frank |
| 2,897,958 | A | 8/1959 | Tarleton et al. |
| 2,935,987 | A | 5/1960 | Ackerbauer |
| 2,956,569 | A | 10/1960 | Adams |
| 2,959,664 | A | 11/1960 | Fenn |
| 3,060,429 | A | 10/1962 | Winston |
| D194,088 | S | 11/1962 | Mann |
| 3,085,145 | A | 4/1963 | Wray, Jr. |
| 3,146,937 | A | 9/1964 | Joseph |
| 3,200,819 | A | 8/1965 | Gilbert |
| 3,203,025 | A | 8/1965 | Schreur |
| 3,234,357 | A | 2/1966 | Seuthe |
| 3,258,015 | A | 6/1966 | Ellis et al. |
| 3,271,719 | A | 9/1966 | Ovshinsky |
| 3,281,637 | A | 10/1966 | Hultquist |
| 3,292,634 | A | 12/1966 | Beucler |
| 3,292,635 | A | 12/1966 | Kolodny |
| 3,316,919 | A | 5/1967 | Green et al. |
| D207,887 | S | 6/1967 | Parsisson et al. |
| 3,356,094 | A | 12/1967 | Ellis et al. |
| 3,365,102 | A | 1/1968 | Castleberry |
| 3,373,915 | A | 3/1968 | Anderson et al. |
| 3,385,303 | A | 5/1968 | Hind |
| 3,393,927 | A | 7/1968 | Kelly et al. |
| 3,398,754 | A | 8/1968 | Tughn |
| 3,419,015 | A | 12/1968 | Wochnowski |
| 3,420,360 | A | 1/1969 | Young |
| 3,424,171 | A | 1/1969 | Rooker |
| 3,428,053 | A | 2/1969 | Schoenbaum |
| 3,431,393 | A | 3/1969 | Katsuda |
| 3,443,827 | A | 5/1969 | Acker et al. |
| 3,456,645 | A | 7/1969 | Brock |
| 3,476,118 | A | 11/1969 | Luttich |
| 3,479,561 | A | 11/1969 | Janning |
| 3,486,508 | A | 12/1969 | Sipos |
| 3,502,588 | A | 3/1970 | Winberg |
| 3,516,417 | A | 6/1970 | Moses |
| 3,567,014 | A | 3/1971 | Feigelman |
| 3,614,956 | A | 10/1971 | Thornton |
| 3,651,240 | A | 3/1972 | Kirkpatrick |
| 3,675,661 | A | 7/1972 | Weaver |
| 3,685,521 | A | 8/1972 | Dock |
| 3,685,522 | A | 8/1972 | Kleinhans |
| 3,707,017 | A | 12/1972 | Paquette |
| 3,738,374 | A | 6/1973 | Bennett |
| 3,747,120 | A | 7/1973 | Stemme |
| 3,766,000 | A | 10/1973 | Gibson |
| 3,771,533 | A | 11/1973 | Armstrong et al. |
| 3,779,770 | A | 12/1973 | Alston et al. |
| 3,792,704 | A | 2/1974 | Parker |

(56) References Cited

U.S. PATENT DOCUMENTS

| | | | |
|---|---|---|---|
| 3,815,597 | A | 6/1974 | Goettelman |
| 3,844,294 | A | 10/1974 | Webster |
| 3,860,012 | A | 1/1975 | Selke |
| 3,861,523 | A | 1/1975 | Fountain et al. |
| 3,878,850 | A | 4/1975 | Gibson et al. |
| 3,891,827 | A | 6/1975 | Wyse |
| 3,903,883 | A | 9/1975 | Pecina et al. |
| 3,927,300 | A | 12/1975 | Wada et al. |
| 3,931,824 | A | 1/1976 | Miano et al. |
| 3,933,643 | A | 1/1976 | Colvin |
| 3,934,117 | A | 1/1976 | Schladitz |
| 3,941,300 | A | 3/1976 | Troth |
| 3,943,941 | A | 3/1976 | Boyd et al. |
| 4,016,878 | A | 4/1977 | Castel et al. |
| 4,019,021 | A | 4/1977 | Schladitz |
| 4,020,853 | A | 5/1977 | Nuttall |
| 4,044,777 | A | 8/1977 | Boyd et al. |
| 4,049,005 | A | 9/1977 | Hernandez et al. |
| 4,054,145 | A | 10/1977 | Berndt et al. |
| 4,056,707 | A | 11/1977 | Farnam |
| 4,066,088 | A | 1/1978 | Ensor |
| 4,079,742 | A | 3/1978 | Rainer et al. |
| 4,083,372 | A | 4/1978 | Boden |
| D250,485 | S | 12/1978 | Cuthbertson |
| 4,131,117 | A | 12/1978 | Kite et al. |
| 4,150,677 | A | 4/1979 | Osborne, Jr. et al. |
| 4,168,712 | A | 9/1979 | Labbe |
| 4,170,262 | A | 10/1979 | Marcus et al. |
| 4,190,046 | A | 2/1980 | Virag |
| 4,195,646 | A | 4/1980 | Kite |
| D255,548 | S | 6/1980 | Grodin |
| 4,207,457 | A | 6/1980 | Haglund |
| 4,207,976 | A | 6/1980 | Herman |
| 4,215,708 | A | 8/1980 | Bron |
| 4,219,031 | A | 8/1980 | Rainer et al. |
| 4,219,032 | A | 8/1980 | Tabatznik |
| 4,233,993 | A | 11/1980 | Miano et al. |
| 4,259,970 | A | 4/1981 | Green, Jr. |
| 4,270,552 | A | 6/1981 | Jenkins |
| 4,284,089 | A | 8/1981 | Ray |
| D260,690 | S | 9/1981 | Stutzer |
| 4,286,604 | A | 9/1981 | Ehretsmann et al. |
| 4,303,083 | A | 12/1981 | Burruss, Jr. |
| 4,312,367 | A | 1/1982 | Seeman |
| 4,326,544 | A | 4/1982 | Hardwick et al. |
| 4,340,072 | A | 7/1982 | Bolt et al. |
| 4,341,228 | A | 7/1982 | Keritsis et al. |
| 4,347,855 | A | 9/1982 | Lanzillotti et al. |
| 4,361,374 | A | 11/1982 | Marmillion et al. |
| 4,382,707 | A | 5/1983 | Anderka |
| 4,391,285 | A | 7/1983 | Burnett et al. |
| D271,255 | S | 11/1983 | Rousseau |
| 4,449,541 | A | 5/1984 | Mays et al. |
| 4,484,376 | A | 11/1984 | Glock et al. |
| 4,492,480 | A | 1/1985 | Wadso et al. |
| 4,494,541 | A | 1/1985 | Archibald |
| 4,506,682 | A | 3/1985 | Muller |
| 4,506,683 | A | 3/1985 | Cantrell et al. |
| 4,510,950 | A | 4/1985 | Keritsis et al. |
| 4,519,319 | A | 5/1985 | Howlett |
| 4,520,938 | A | 6/1985 | Finke |
| 4,531,178 | A | 7/1985 | Uke |
| D280,494 | S | 9/1985 | Abel |
| RE32,013 | E | 10/1985 | de la Burde et al. |
| 4,550,967 | A | 11/1985 | Riches et al. |
| 4,577,646 | A | 3/1986 | Ziehn |
| 4,583,559 | A | 4/1986 | Hedge |
| 4,589,428 | A | 5/1986 | Keritsis |
| 4,595,024 | A | 6/1986 | Greene et al. |
| 4,611,608 | A | 9/1986 | Vos et al. |
| 4,625,737 | A | 12/1986 | Keritsis et al. |
| 4,629,665 | A | 12/1986 | Matsuo |
| 4,635,651 | A | 1/1987 | Jacobs |
| 4,637,407 | A | 1/1987 | Bonanno |
| 4,648,393 | A | 3/1987 | Landis et al. |
| 4,674,519 | A | 6/1987 | Keritsis et al. |
| 4,676,237 | A | 6/1987 | Wood |
| 4,682,010 | A | 7/1987 | Drapeau et al. |
| 4,700,727 | A | 10/1987 | Torigian |
| 4,706,692 | A | 11/1987 | Gellatly |
| 4,708,151 | A | 11/1987 | Shelar |
| 4,714,082 | A | 12/1987 | Banerjee et al. |
| 4,735,217 | A | 4/1988 | Gerth et al. |
| 4,756,318 | A | 7/1988 | Clearman et al. |
| 4,765,347 | A | 8/1988 | Sensabaugh, Jr. et al. |
| 4,771,295 | A | 9/1988 | Baker |
| 4,771,795 | A | 9/1988 | White et al. |
| 4,771,796 | A | 9/1988 | Myer |
| 4,776,353 | A | 10/1988 | Lilja et al. |
| 4,793,365 | A | 12/1988 | Sensabaugh, Jr. et al. |
| 4,794,323 | A | 12/1988 | Zhou et al. |
| 4,797,692 | A | 1/1989 | Ims |
| 4,798,310 | A | 1/1989 | Kasai et al. |
| 4,800,903 | A | 1/1989 | Ray et al. |
| 4,807,809 | A | 2/1989 | Pryor et al. |
| 4,813,536 | A | 3/1989 | Willis |
| 4,819,665 | A | 4/1989 | Roberts et al. |
| 4,821,749 | A | 4/1989 | Toft et al. |
| 4,823,817 | A | 4/1989 | Luke |
| 4,830,028 | A | 5/1989 | Lawson et al. |
| D301,837 | S | 6/1989 | Peterson et al. |
| 4,836,224 | A | 6/1989 | Lawson et al. |
| 4,836,225 | A | 6/1989 | Sudoh |
| 4,846,199 | A | 7/1989 | Rose |
| 4,848,374 | A | 7/1989 | Chard et al. |
| 4,848,376 | A | 7/1989 | Lilja et al. |
| 4,848,563 | A | 7/1989 | Robbins |
| D302,659 | S | 8/1989 | Peterson et al. |
| D303,722 | S | 9/1989 | Marlow et al. |
| 4,870,748 | A | 10/1989 | Hensgen et al. |
| 4,874,000 | A | 10/1989 | Tamol et al. |
| D304,771 | S | 11/1989 | Katayama |
| 4,878,506 | A | 11/1989 | Pinck |
| 4,880,018 | A | 11/1989 | Graves, Jr. et al. |
| 4,887,619 | A | 12/1989 | Burcham, Jr. et al. |
| 4,892,109 | A | 1/1990 | Strubel |
| 4,893,639 | A | 1/1990 | White |
| 4,896,683 | A | 1/1990 | Cohen et al. |
| 4,907,606 | A | 3/1990 | Lilja et al. |
| 4,913,168 | A | 4/1990 | Potter et al. |
| 4,917,119 | A | 4/1990 | Potter et al. |
| 4,917,121 | A | 4/1990 | Riehl et al. |
| 4,917,128 | A | 4/1990 | Clearman et al. |
| 4,920,990 | A | 5/1990 | Lawrence et al. |
| 4,922,901 | A | 5/1990 | Brooks et al. |
| 4,924,883 | A | 5/1990 | Perfetti et al. |
| 4,924,886 | A | 5/1990 | Litzinger |
| 4,924,888 | A | 5/1990 | Perfetti et al. |
| 4,928,714 | A | 5/1990 | Shannon |
| 4,938,236 | A | 7/1990 | Banerjee et al. |
| 4,941,483 | A | 7/1990 | Ridings et al. |
| 4,941,484 | A | 7/1990 | Clapp et al. |
| 4,941,486 | A | 7/1990 | Dube |
| 4,944,317 | A | 7/1990 | Thal |
| 4,945,448 | A | 7/1990 | Bremenour |
| D310,171 | S | 8/1990 | Cusenza |
| 4,945,929 | A | 8/1990 | Egilmex |
| 4,945,931 | A | 8/1990 | Gori |
| 4,947,874 | A | 8/1990 | Brooks et al. |
| 4,947,875 | A | 8/1990 | Brooks et al. |
| D310,349 | S | 9/1990 | Rowen |
| 4,955,397 | A | 9/1990 | Johnson et al. |
| 4,961,438 | A | 10/1990 | Korte |
| 4,962,773 | A | 10/1990 | White et al. |
| 4,966,171 | A | 10/1990 | Serrano et al. |
| 4,968,263 | A | 11/1990 | Silbernagel |
| 4,969,476 | A | 11/1990 | Bale et al. |
| 4,972,854 | A | 11/1990 | Kiernan et al. |
| 4,972,855 | A | 11/1990 | Kuriyama et al. |
| 4,974,609 | A | 12/1990 | Southwick et al. |
| 4,977,908 | A | 12/1990 | Luke |
| 4,981,522 | A | 1/1991 | Nichols et al. |
| 4,984,588 | A | 1/1991 | Steward, Jr. |
| 4,986,286 | A | 1/1991 | Roberts et al. |

(56) References Cited

U.S. PATENT DOCUMENTS 4,987,906 A 1/1991 Young et al.
D315,032 S 2/1991 Haynes
4,990,939 A 2/1991 Sekiya
4,991,606 A 2/1991 Serrano et al.
4,993,436 A 2/1991 Bloom
4,995,405 A 2/1991 Lettau
5,005,593 A 4/1991 Fagg
5,005,759 A 4/1991 Bouche
5,019,122 A 5/1991 Clearman et al.
5,020,548 A 6/1991 Farrier et al.
5,022,416 A 6/1991 Watson
5,025,814 A 6/1991 Raker
5,027,836 A 7/1991 Shannon et al.
5,027,837 A 7/1991 Clearman et al.
5,031,646 A 7/1991 Lippiello et al.
5,033,483 A 7/1991 Clearman et al.
5,040,551 A 8/1991 Schlatter et al.
5,042,509 A 8/1991 Banerjee et al.
5,042,510 A 8/1991 Curtiss et al.
5,046,514 A 9/1991 Bolt
5,050,621 A 9/1991 Creighton et al.
5,056,537 A 10/1991 Brown et al.
5,060,667 A 10/1991 Strubel
5,060,669 A 10/1991 White et al.
5,060,671 A 10/1991 Counts et al.
5,060,676 A 10/1991 Hearn et al.
5,065,775 A 11/1991 Fagg
5,065,776 A 11/1991 Lawson et al.
5,072,744 A 12/1991 Luke et al.
5,074,319 A 12/1991 White et al.
5,074,321 A 12/1991 Gentry et al.
5,076,296 A 12/1991 Nystrom et al.
5,076,297 A 12/1991 Farrier et al.
5,092,353 A 3/1992 Montoya et al.
5,093,894 A 3/1992 Deevi et al.
5,095,921 A 3/1992 Losee et al.
5,095,922 A 3/1992 Johnson et al.
5,097,850 A 3/1992 Braunshteyn et al.
5,099,861 A 3/1992 Clearman et al.
5,099,862 A 3/1992 White et al.
5,099,864 A 3/1992 Young et al.
5,101,838 A 4/1992 Schwartz et al.
5,101,839 A 4/1992 Jakob et al.
5,103,842 A 4/1992 Strang et al.
5,105,831 A 4/1992 Banerjee et al.
5,105,835 A 4/1992 Drewett et al.
5,105,836 A 4/1992 Gentry et al.
5,105,837 A 4/1992 Barnes et al.
5,105,838 A 4/1992 White et al.
5,115,820 A 5/1992 Hauser et al.
5,121,757 A 6/1992 White et al.
5,123,530 A 6/1992 Lee
5,124,200 A 6/1992 Mallonee
5,127,511 A 7/1992 Keen, Jr. et al.
5,129,409 A 7/1992 White
5,131,415 A 7/1992 Munoz et al.
5,133,368 A 7/1992 Neumann et al.
5,137,034 A 8/1992 Perfetti et al.
5,141,004 A 8/1992 Porenski
5,143,096 A 9/1992 Steinberg
5,143,097 A 9/1992 Stephen Sohn et al.
5,144,962 A 9/1992 Counts et al.
5,146,934 A 9/1992 Deevi et al.
5,148,817 A 9/1992 Houminer et al.
5,148,821 A 9/1992 Best et al.
5,152,456 A 10/1992 Ross et al.
5,159,940 A 11/1992 Hayward et al.
5,159,942 A 11/1992 Brinkley et al.
5,172,707 A 12/1992 Zambelli
5,175,791 A 12/1992 Muderlak et al.
5,177,424 A 1/1993 Connors
5,178,167 A 1/1993 Riggs et al.
5,179,966 A 1/1993 Losee et al.
5,183,062 A 2/1993 Clearman et al.
5,203,355 A 4/1993 Clearman et al.
5,211,684 A 5/1993 Shannon et al.
D336,346 S 6/1993 Miller et al.
5,220,930 A 6/1993 Gentry
5,224,265 A 7/1993 Dux
5,224,498 A 7/1993 Deevi et al.
5,228,460 A 7/1993 Sprinkel et al.
5,230,354 A 7/1993 Smith et al.
5,235,992 A 8/1993 Sensabaugh, Jr.
5,240,012 A 8/1993 Ehrman et al.
5,240,014 A 8/1993 Deevi et al.
5,240,016 A 8/1993 Nichols et al.
5,243,999 A 9/1993 Smith
5,246,018 A 9/1993 Deevi et al.
5,247,947 A 9/1993 Clearman et al.
5,249,586 A 10/1993 Morgan et al.
5,249,588 A 10/1993 Brown et al.
5,255,674 A 10/1993 Oftedal et al.
5,261,424 A 11/1993 Sprinkel, Jr.
5,266,746 A 11/1993 Nishihara
5,269,237 A 12/1993 Baker et al.
5,269,327 A 12/1993 Counts et al.
5,271,419 A 12/1993 Arzonico et al.
H1271 H 1/1994 Shouse
5,282,798 A 2/1994 Bruse et al.
5,285,798 A 2/1994 Banerjee et al.
5,293,883 A 3/1994 Edwards
5,296,685 A 3/1994 Burstein et al.
5,301,694 A 4/1994 Raymond et al.
5,303,720 A 4/1994 Banerjee et al.
5,318,050 A 6/1994 Gonzalez-Parra et al.
5,322,075 A 6/1994 Deevi et al.
5,322,076 A 6/1994 Brinkley et al.
5,324,498 A 6/1994 Streusand et al.
5,327,915 A 7/1994 Porenski
5,327,917 A 7/1994 Lekwauwa et al.
5,331,981 A 7/1994 Tamaoki et al.
5,339,838 A 8/1994 Young et al.
5,345,951 A 9/1994 Serrano et al.
5,345,955 A 9/1994 Clearman et al.
5,353,813 A 10/1994 Deevi et al.
5,357,984 A 10/1994 Farrier et al.
5,360,023 A 11/1994 Blakley et al.
5,369,723 A 11/1994 Counts et al.
5,372,148 A 12/1994 McCafferty et al.
5,377,698 A 1/1995 Litzinger et al.
5,388,574 A 2/1995 Ingebrethsen
5,388,594 A 2/1995 Counts et al.
5,396,911 A 3/1995 Casey, III et al.
5,408,574 A 4/1995 Deevi et al.
5,415,186 A 5/1995 Casey, III et al.
5,435,325 A 7/1995 Clapp et al.
5,445,169 A 8/1995 Brinkley et al.
5,449,078 A 9/1995 Akers
5,456,269 A 10/1995 Kollasch
5,468,266 A 11/1995 Bensalem et al.
5,468,936 A 11/1995 Deevi et al.
5,472,001 A 12/1995 Nicholson
5,479,948 A 1/1996 Counts et al.
D367,605 S 3/1996 Moore
5,497,791 A 3/1996 Bowen
5,498,850 A 3/1996 Das
5,498,855 A 3/1996 Deevi et al.
5,499,636 A 3/1996 Baggett, Jr. et al.
5,501,237 A 3/1996 Young et al.
D368,552 S 4/1996 Adams
5,505,214 A 4/1996 Collins et al.
5,515,842 A 5/1996 Ramseyer et al.
5,529,078 A 6/1996 Rehder et al.
5,530,225 A 6/1996 Hajaligol
D371,633 S 7/1996 Chenard
5,533,530 A 7/1996 Young et al.
5,545,904 A 8/1996 Orbach
5,551,450 A 9/1996 Hemsley
5,551,451 A 9/1996 Riggs et al.
5,564,442 A 10/1996 MacDonald et al.
5,573,692 A 11/1996 Das et al.
5,579,934 A 12/1996 Buono
5,588,446 A 12/1996 Clearman
5,591,368 A 1/1997 Fleischhauer et al.

(56) References Cited

U.S. PATENT DOCUMENTS

| | | | |
|---|---|---|---|
| 5,593,792 | A | 1/1997 | Farrier et al. |
| 5,595,577 | A | 1/1997 | Bensalem et al. |
| 5,596,706 | A | 1/1997 | Shimazaki et al. |
| 5,598,868 | A | 2/1997 | Jakob et al. |
| 5,605,226 | A | 2/1997 | Hernlein |
| 5,611,360 | A | 3/1997 | Tang |
| 5,613,504 | A | 3/1997 | Collins et al. |
| 5,613,505 | A | 3/1997 | Campbell et al. |
| D379,810 | S | 6/1997 | Giordano et al. |
| 5,641,064 | A | 6/1997 | Goserud |
| D380,293 | S | 7/1997 | Cudmore |
| 5,646,666 | A | 7/1997 | Cowger |
| 5,649,552 | A | 7/1997 | Cho et al. |
| 5,649,554 | A | 7/1997 | Sprinkel et al. |
| D382,146 | S | 8/1997 | Sandy |
| 5,659,656 | A | 8/1997 | Das |
| 5,665,262 | A | 9/1997 | Hajaligol et al. |
| 5,666,976 | A | 9/1997 | Adams et al. |
| 5,666,977 | A | 9/1997 | Higgins et al. |
| 5,666,978 | A | 9/1997 | Counts et al. |
| 5,687,746 | A | 11/1997 | Rose et al. |
| 5,687,748 | A | 11/1997 | Conrad et al. |
| 5,692,525 | A | 12/1997 | Counts et al. |
| 5,692,526 | A | 12/1997 | Adams et al. |
| 5,703,633 | A | 12/1997 | Gehrer |
| 5,708,258 | A | 1/1998 | Counts et al. |
| 5,711,320 | A | 1/1998 | Martin |
| 5,715,844 | A | 2/1998 | Young et al. |
| 5,724,998 | A | 3/1998 | Gellatly et al. |
| 5,726,421 | A | 3/1998 | Fleischhauer et al. |
| 5,727,571 | A | 3/1998 | Meiring et al. |
| 5,730,118 | A | 3/1998 | Harmanson |
| 5,730,158 | A | 3/1998 | Collins et al. |
| 5,732,685 | A | 3/1998 | Nakamura |
| 5,743,251 | A | 4/1998 | Howell et al. |
| 5,745,985 | A | 5/1998 | Ghosh |
| 5,746,587 | A | 5/1998 | Racine et al. |
| 5,750,964 | A | 5/1998 | Counts et al. |
| 5,778,899 | A | 7/1998 | Saito et al. |
| D397,504 | S | 8/1998 | Zelenik |
| D398,150 | S | 9/1998 | Vonarburg |
| 5,799,663 | A | 9/1998 | Gross et al. |
| 5,807,509 | A | 9/1998 | Shrier et al. |
| 5,810,164 | A | 9/1998 | Rennecamp |
| 5,816,263 | A | 10/1998 | Counts et al. |
| 5,819,751 | A | 10/1998 | Barnes et al. |
| 5,819,756 | A | 10/1998 | Mielordt |
| 5,829,453 | A | 11/1998 | White et al. |
| 5,845,649 | A | 12/1998 | Saito et al. |
| D405,007 | S | 2/1999 | Naas, Sr. |
| 5,865,185 | A | 2/1999 | Collins et al. |
| 5,865,186 | A | 2/1999 | Volsey, II |
| 5,873,372 | A | 2/1999 | Honeycutt et al. |
| 5,878,752 | A | 3/1999 | Adams et al. |
| 5,880,439 | A | 3/1999 | Deevi et al. |
| 5,881,884 | A | 3/1999 | Podosek |
| 5,894,841 | A | 4/1999 | Voges |
| D411,332 | S | 6/1999 | Zelenik |
| 5,908,032 | A | 6/1999 | Poindexter et al. |
| 5,915,387 | A | 6/1999 | Baggett, Jr. et al. |
| D412,279 | S | 7/1999 | Brice |
| 5,931,828 | A | 8/1999 | Durkee |
| 5,934,289 | A | 8/1999 | Watkins et al. |
| 5,938,018 | A | 8/1999 | Keaveney et al. |
| 5,944,025 | A | 8/1999 | Cook |
| 5,954,979 | A | 9/1999 | Counts et al. |
| D414,893 | S | 10/1999 | Moore |
| 5,967,148 | A | 10/1999 | Harris et al. |
| 5,967,310 | A | 10/1999 | Hill |
| 5,975,415 | A | 11/1999 | Zehnal |
| 5,979,460 | A | 11/1999 | Matsumura |
| 5,979,548 | A | 11/1999 | Rhodes et al. |
| 5,994,025 | A | 11/1999 | Iwasa et al. |
| 5,996,589 | A | 12/1999 | St. Charles |
| 6,024,097 | A | 2/2000 | Von Wielligh |
| 6,026,820 | A | 2/2000 | Baggett, Jr. et al. |
| 6,033,623 | A | 3/2000 | Deevi et al. |
| 6,040,560 | A | 3/2000 | Fleischhauer et al. |
| D422,884 | S | 4/2000 | Lafond |
| 6,053,176 | A | 4/2000 | Adams et al. |
| D424,236 | S | 5/2000 | Reed |
| D424,739 | S | 5/2000 | Ross |
| 6,062,213 | A | 5/2000 | Fuisz |
| 6,089,857 | A | 7/2000 | Matsuura et al. |
| 6,095,152 | A | 8/2000 | Beven et al. |
| 6,095,153 | A | 8/2000 | Kessler et al. |
| 6,102,036 | A | 8/2000 | Slutsky |
| 6,116,247 | A | 9/2000 | Banyasz et al. |
| 6,119,684 | A | 9/2000 | Nohl et al. |
| 6,119,700 | A | 9/2000 | Fleischhauer et al. |
| 6,125,853 | A | 10/2000 | Susa et al. |
| 6,125,855 | A | 10/2000 | Nevett et al. |
| 6,125,866 | A | 10/2000 | Nichols et al. |
| D433,532 | S | 11/2000 | Higgins et al. |
| 6,146,934 | A | 11/2000 | Gardner et al. |
| 6,155,268 | A | 12/2000 | Takeuchi |
| 6,164,287 | A | 12/2000 | White |
| D436,686 | S | 1/2001 | Fujisawa |
| 6,182,670 | B1 | 2/2001 | White et al. |
| 6,196,218 | B1 | 3/2001 | Voges |
| 6,196,219 | B1 | 3/2001 | Hess et al. |
| 6,196,232 | B1 | 3/2001 | Chkadua |
| 6,216,705 | B1 | 4/2001 | Ossepian |
| 6,216,706 | B1 | 4/2001 | Kumar et al. |
| 6,216,707 | B1 | 4/2001 | Pauly |
| 6,217,315 | B1 | 4/2001 | Mifune |
| D442,328 | S | 5/2001 | Barmes |
| 6,232,784 | B1 | 5/2001 | Dulasky |
| 6,234,167 | B1 | 5/2001 | Cox et al. |
| 6,234,169 | B1 | 5/2001 | Bulbrook et al. |
| 6,239,687 | B1 | 5/2001 | Shrier et al. |
| 6,265,789 | B1 | 7/2001 | Honda et al. |
| D446,499 | S | 8/2001 | Andre et al. |
| D447,276 | S | 8/2001 | Gustafson |
| 6,269,966 | B1 | 8/2001 | Pallo et al. |
| 6,285,017 | B1 | 9/2001 | Brickell |
| 6,289,898 | B1 | 9/2001 | Fournier et al. |
| 6,310,752 | B1 | 10/2001 | Shrier et al. |
| D450,313 | S | 11/2001 | Koinuma |
| D450,662 | S | 11/2001 | Kwok |
| 6,311,561 | B1 | 11/2001 | Bang |
| 6,322,268 | B1 | 11/2001 | Kaufmann |
| 6,324,261 | B1 | 11/2001 | Merte |
| 6,349,728 | B1 | 2/2002 | Pham |
| 6,349,729 | B1 | 2/2002 | Meyer et al. |
| D454,079 | S | 3/2002 | Fong |
| 6,357,671 | B1 | 3/2002 | Cewers |
| 6,376,816 | B2 | 4/2002 | Cooper et al. |
| 6,381,739 | B1 | 4/2002 | Breternitz, Jr. et al. |
| 6,386,371 | B1 | 5/2002 | Parsons |
| 6,397,852 | B1 | 6/2002 | McAdam |
| 6,407,371 | B1 | 6/2002 | Toya et al. |
| 6,408,856 | B1 | 6/2002 | McAdam |
| 6,418,938 | B1 | 7/2002 | Fleischhauer et al. |
| 6,431,363 | B1 | 8/2002 | Hackler |
| 6,443,146 | B1 | 9/2002 | Voges |
| 6,446,426 | B1 | 9/2002 | Sweeney et al. |
| 6,446,793 | B1 | 9/2002 | Layshock |
| D465,660 | S | 11/2002 | Doeing |
| 6,476,151 | B1 | 11/2002 | Araki |
| 6,491,233 | B2 | 12/2002 | Nichols |
| 6,501,052 | B2 | 12/2002 | Cox |
| 6,510,982 | B2 | 1/2003 | White et al. |
| 6,516,796 | B1 | 2/2003 | Cox et al. |
| D471,104 | S | 3/2003 | Hunt |
| 6,532,965 | B1 | 3/2003 | Abhulimen et al. |
| 6,533,395 | B2 | 3/2003 | Dante et al. |
| 6,536,442 | B2 | 3/2003 | St. Charles et al. |
| 6,537,186 | B1 | 3/2003 | Veluz |
| 6,542,065 | B2 | 4/2003 | Shrier et al. |
| 6,557,708 | B2 | 5/2003 | Polacco |
| 6,578,584 | B1 | 6/2003 | Beven et al. |
| 6,591,841 | B1 | 7/2003 | White et al. |
| 6,595,362 | B2 | 7/2003 | Penney et al. |

(56) References Cited

U.S. PATENT DOCUMENTS

| | | | |
|---|---|---|---|
| 6,598,607 | B2 | 7/2003 | Adiga et al. |
| D477,920 | S | 8/2003 | McCarty et al. |
| D478,569 | S | 8/2003 | Hussaini et al. |
| D478,897 | S | 8/2003 | Tsuge |
| 6,601,776 | B1 | 8/2003 | Oljaca et al. |
| 6,603,924 | B2 | 8/2003 | Brown et al. |
| 6,606,998 | B1 | 8/2003 | Gold |
| 6,612,404 | B2 | 9/2003 | Sweet et al. |
| 6,615,840 | B1 | 9/2003 | Fournier et al. |
| 6,620,659 | B2 | 9/2003 | Emma et al. |
| 6,622,867 | B2 | 9/2003 | Menceles |
| 6,637,430 | B1 | 10/2003 | Voges et al. |
| 6,655,379 | B2 | 12/2003 | Clark et al. |
| 6,657,532 | B1 | 12/2003 | Shrier et al. |
| D485,639 | S | 1/2004 | Stronski |
| 6,672,762 | B1 | 1/2004 | Faircloth et al. |
| 6,681,998 | B2 | 1/2004 | Sharpe et al. |
| 6,688,313 | B2 | 2/2004 | Wrenn et al. |
| 6,690,121 | B1 | 2/2004 | Weindorf |
| 6,701,921 | B2 | 3/2004 | Sprinkel, Jr. et al. |
| 6,701,936 | B2 | 3/2004 | Shafer et al. |
| 6,707,274 | B1 | 3/2004 | Karr |
| 6,708,846 | B1 | 3/2004 | Fuchs et al. |
| 6,715,494 | B1 | 4/2004 | McCoy |
| 6,719,443 | B2 | 4/2004 | Gutstein |
| 6,722,756 | B2 | 4/2004 | Choy et al. |
| 6,722,763 | B1 | 4/2004 | Hsu |
| 6,726,006 | B1 | 4/2004 | Funderburk et al. |
| 6,730,832 | B1 | 5/2004 | Dominguez et al. |
| 6,739,700 | B2 | 5/2004 | Dante et al. |
| 6,743,030 | B2 | 6/2004 | Lin et al. |
| 6,747,573 | B1 | 6/2004 | Gerlach et al. |
| 6,752,649 | B2 | 6/2004 | Arkin et al. |
| D494,315 | S | 8/2004 | Cartier |
| 6,769,436 | B2 | 8/2004 | Horian |
| 6,772,756 | B2 | 8/2004 | Shayan |
| D495,599 | S | 9/2004 | Biesecker |
| 6,799,572 | B2 | 10/2004 | Nichols et al. |
| 6,799,576 | B2 | 10/2004 | Farr |
| 6,803,545 | B2 | 10/2004 | Blake et al. |
| 6,803,550 | B2 | 10/2004 | Sharpe et al. |
| 6,803,744 | B1 | 10/2004 | Sabo |
| 6,804,458 | B2 | 10/2004 | Sherwood et al. |
| 6,805,545 | B2 | 10/2004 | Slaboden |
| 6,808,407 | B1 | 10/2004 | Cannon |
| 6,810,883 | B2 | 11/2004 | Felter et al. |
| 6,823,873 | B2 | 11/2004 | Nichols et al. |
| D500,301 | S | 12/2004 | Deguchi |
| D500,302 | S | 12/2004 | Deguchi |
| 6,827,573 | B2 | 12/2004 | St. Charles et al. |
| 6,854,461 | B2 | 2/2005 | Nichols |
| 6,854,470 | B1 | 2/2005 | Pu |
| 6,874,507 | B2 | 4/2005 | Farr |
| 6,874,508 | B2 | 4/2005 | Shafer et al. |
| 6,885,814 | B2 | 4/2005 | Saito |
| 6,889,687 | B1 | 5/2005 | Olsson |
| 6,895,974 | B2 | 5/2005 | Peele |
| D505,922 | S | 6/2005 | Mayo et al. |
| D506,447 | S | 6/2005 | Mayo et al. |
| D506,731 | S | 6/2005 | Mayo et al. |
| 6,909,840 | B2 | 6/2005 | Harwig et al. |
| D507,244 | S | 7/2005 | Mayo et al. |
| 6,923,327 | B1 | 8/2005 | Cohen |
| 6,923,890 | B2 | 8/2005 | Ricatto et al. |
| 6,938,986 | B2 | 9/2005 | Macler |
| 6,954,979 | B2 | 10/2005 | Logan |
| 6,976,493 | B2 | 12/2005 | Chapman et al. |
| 6,994,096 | B2 | 2/2006 | Rostami et al. |
| 7,000,775 | B2 | 2/2006 | Gelardi et al. |
| 7,011,096 | B2 | 3/2006 | Li et al. |
| 7,015,796 | B2 | 3/2006 | Snyder |
| 7,017,585 | B2 | 3/2006 | Li et al. |
| 7,025,066 | B2 | 4/2006 | Lawson et al. |
| 7,040,314 | B2 | 5/2006 | Nguyen et al. |
| 7,047,982 | B2 | 5/2006 | Seymour et al. |
| 7,049,926 | B2 | 5/2006 | Shrier et al. |
| D523,171 | S | 6/2006 | Mitten et al. |
| D525,948 | S | 8/2006 | Blair et al. |
| 7,082,825 | B2 | 8/2006 | Aoshima et al. |
| D528,992 | S | 9/2006 | Hobart et al. |
| D529,044 | S | 9/2006 | Andre et al. |
| 7,109,876 | B2 | 9/2006 | Smith et al. |
| D530,340 | S | 10/2006 | Andre et al. |
| D531,190 | S | 10/2006 | Lee et al. |
| 7,117,707 | B2 | 10/2006 | Adams et al. |
| 7,117,867 | B2 | 10/2006 | Cox et al. |
| D532,927 | S | 11/2006 | Sann |
| 7,147,170 | B2 | 12/2006 | Nguyen et al. |
| D534,921 | S | 1/2007 | Andre et al. |
| D535,261 | S | 1/2007 | Daniels |
| D535,308 | S | 1/2007 | Andre et al. |
| 7,159,464 | B2 | 1/2007 | Tohyama et al. |
| 7,163,015 | B2 | 1/2007 | Moffitt |
| 7,173,222 | B2 | 2/2007 | Cox et al. |
| 7,173,322 | B2 | 2/2007 | Sakata et al. |
| 7,185,651 | B2 | 3/2007 | Alston et al. |
| 7,185,659 | B2 | 3/2007 | Sharpe |
| D539,813 | S | 4/2007 | Chen |
| D540,131 | S | 4/2007 | Swann |
| D540,687 | S | 4/2007 | Egawa |
| D540,749 | S | 4/2007 | Kaule |
| 7,214,075 | B2 | 5/2007 | He et al. |
| D544,643 | S | 6/2007 | Lin |
| D545,303 | S | 6/2007 | Chang |
| 7,234,470 | B2 | 6/2007 | Yang |
| 7,234,593 | B2 | 6/2007 | Fath et al. |
| D545,904 | S | 7/2007 | Chen et al. |
| D546,782 | S | 7/2007 | Poulet et al. |
| D547,002 | S | 7/2007 | Lin |
| D551,548 | S | 9/2007 | Didier |
| D551,970 | S | 10/2007 | Didier |
| D553,458 | S | 10/2007 | Hood |
| 7,275,941 | B1 | 10/2007 | Bushby |
| 7,284,424 | B2 | 10/2007 | Kanke |
| D556,154 | S | 11/2007 | Poulet et al. |
| 7,290,549 | B2 | 11/2007 | Banerjee et al. |
| 7,293,565 | B2 | 11/2007 | Griffin et al. |
| D557,209 | S | 12/2007 | Ahlgren et al. |
| D558,060 | S | 12/2007 | Šír |
| D562,151 | S | 2/2008 | Ueda et al. |
| D562,761 | S | 2/2008 | Ueda et al. |
| 7,337,782 | B2 | 3/2008 | Thompson |
| D565,496 | S | 4/2008 | Disla |
| D568,298 | S | 5/2008 | Lundren et al. |
| D569,727 | S | 5/2008 | Moretti |
| 7,367,334 | B2 | 5/2008 | Faison, Jr. et al. |
| 7,374,048 | B2 | 5/2008 | Mazurek |
| D571,202 | S | 6/2008 | Vogt |
| D571,556 | S | 6/2008 | Raile |
| D573,474 | S | 7/2008 | Beam et al. |
| 7,392,809 | B2 | 7/2008 | Larson et al. |
| 7,415,982 | B1 | 8/2008 | Sheridan |
| D576,619 | S | 9/2008 | Udagawa et al. |
| D577,019 | S | 9/2008 | Udagawa et al. |
| D577,150 | S | 9/2008 | Bryman et al. |
| D577,591 | S | 9/2008 | Bouroullec |
| 7,428,905 | B2 | 9/2008 | Mua |
| 7,434,584 | B2 | 10/2008 | Steinberg |
| D580,756 | S | 11/2008 | Seebold |
| 7,445,007 | B2 | 11/2008 | Balch |
| 7,451,877 | B2 | 11/2008 | Koga et al. |
| 7,513,253 | B2 | 4/2009 | Kobayashi et al. |
| 7,647,932 | B2 | 1/2010 | Cantrell et al. |
| 7,690,385 | B2 | 4/2010 | Moffitt |
| 7,692,123 | B2 | 4/2010 | Baba et al. |
| 7,726,320 | B2 | 6/2010 | Robinson et al. |
| 7,775,459 | B2 | 8/2010 | Martens, III et al. |
| 7,810,505 | B2 | 10/2010 | Yang |
| 7,832,410 | B2 | 11/2010 | Hon |
| 7,845,359 | B2 | 12/2010 | Montaser |
| 7,878,209 | B2 | 2/2011 | Newbery et al. |
| 7,896,006 | B2 | 3/2011 | Hamano et al. |
| 7,992,626 | B1 | 8/2011 | Tilton et al. |
| 7,997,280 | B2 | 8/2011 | Rosenthal |

(56) References Cited

U.S. PATENT DOCUMENTS

| | | | |
|---|---|---|---|
| 8,066,010 | B2 | 11/2011 | Newbery et al. |
| 8,079,371 | B2 | 12/2011 | Robinson et al. |
| 8,127,772 | B2 | 3/2012 | Montaser |
| 8,156,944 | B2 | 4/2012 | Han |
| 8,205,622 | B2 | 6/2012 | Pan |
| 8,314,591 | B2 | 11/2012 | Terry et al. |
| 8,365,742 | B2 | 2/2013 | Hon |
| 8,375,957 | B2 | 2/2013 | Hon |
| 8,393,331 | B2 | 3/2013 | Hon |
| 8,402,976 | B2 | 3/2013 | Fernando et al. |
| 8,499,766 | B1 | 8/2013 | Newton |
| 8,528,569 | B1 | 9/2013 | Newton |
| 8,550,069 | B2 | 10/2013 | Alelov |
| 8,833,364 | B2 | 9/2014 | Buchberger |
| 8,851,068 | B2 | 10/2014 | Cohen et al. |
| 8,899,238 | B2 | 12/2014 | Robinson et al. |
| 8,950,587 | B2 | 2/2015 | Thomson et al. |
| 9,259,035 | B2 | 2/2016 | Terry et al. |
| 9,301,549 | B2 | 4/2016 | Liu |
| 9,427,022 | B2 | 8/2016 | Levin et al. |
| 9,462,832 | B2 | 10/2016 | Lord |
| 9,549,573 | B2 | 1/2017 | Monsees et al. |
| 9,714,878 | B2 | 7/2017 | Powers et al. |
| 9,801,416 | B2 | 10/2017 | Robinson et al. |
| 9,814,268 | B2 | 11/2017 | Robinson et al. |
| 9,839,238 | B2 | 12/2017 | Worm et al. |
| 9,901,123 | B2 | 2/2018 | Robinson et al. |
| 9,930,915 | B2 | 4/2018 | Worm et al. |
| 9,980,514 | B2 | 5/2018 | Malamud et al. |
| 9,993,024 | B2 | 6/2018 | Liu |
| 10,231,488 | B2 | 3/2019 | Robinson et al. |
| 10,524,511 | B2 | 1/2020 | Worm et al. |
| 10,543,323 | B2 | 1/2020 | Buchberger |
| 11,758,936 | B2 | 9/2023 | Robinson et al. |
| 11,785,978 | B2 | 10/2023 | Robinson et al. |
| 11,925,202 | B2 | 3/2024 | Robinson et al. |
| 2001/0015209 | A1 | 8/2001 | Zielke |
| 2001/0026788 | A1 | 10/2001 | Piskorz |
| 2001/0032643 | A1 | 10/2001 | Hochrainer et al. |
| 2001/0032795 | A1 | 10/2001 | Weinstein et al. |
| 2001/0036365 | A1 | 11/2001 | Sanda et al. |
| 2001/0052480 | A1 | 12/2001 | Kawaguchi et al. |
| 2002/0029779 | A1 | 3/2002 | Schmidt et al. |
| 2002/0043554 | A1 | 4/2002 | White et al. |
| 2002/0078951 | A1 | 6/2002 | Nichols et al. |
| 2002/0088469 | A1 | 7/2002 | Rennecamp |
| 2002/0142291 | A1 | 10/2002 | Bauer et al. |
| 2002/0146242 | A1 | 10/2002 | Vieira |
| 2002/0175164 | A1 | 11/2002 | Dees et al. |
| 2003/0004426 | A1 | 1/2003 | Melker et al. |
| 2003/0005926 | A1 | 1/2003 | Jones et al. |
| 2003/0011579 | A1 | 1/2003 | Gong |
| 2003/0033055 | A1 | 2/2003 | McRae |
| 2003/0089377 | A1 | 5/2003 | Hajaligol et al. |
| 2003/0106551 | A1 | 6/2003 | Sprinkel, Jr. et al. |
| 2003/0108342 | A1 | 6/2003 | Sherwood |
| 2003/0131859 | A1 | 7/2003 | Li et al. |
| 2003/0149372 | A1 | 8/2003 | Smith et al. |
| 2003/0150451 | A1 | 8/2003 | Shayan |
| 2003/0154991 | A1 | 8/2003 | Jay et al. |
| 2003/0189826 | A1 | 10/2003 | Yoon |
| 2003/0226837 | A1 | 12/2003 | Blake et al. |
| 2004/0020500 | A1 | 2/2004 | Wrenn et al. |
| 2004/0020508 | A1 | 2/2004 | Earl |
| 2004/0031495 | A1 | 2/2004 | Steinberg |
| 2004/0050382 | A1 | 3/2004 | Goodchild |
| 2004/0099266 | A1 | 5/2004 | Cross et al. |
| 2004/0118401 | A1 | 6/2004 | Smith et al. |
| 2004/0129280 | A1 | 7/2004 | Woodson et al. |
| 2004/0149282 | A1 | 8/2004 | Hickle |
| 2004/0149296 | A1 | 8/2004 | Rostami et al. |
| 2004/0149624 | A1 | 8/2004 | Wischusen et al. |
| 2004/0173224 | A1 | 9/2004 | Burgard et al. |
| 2004/0173229 | A1 | 9/2004 | Crooks et al. |
| 2004/0182403 | A1 | 9/2004 | Andersson et al. |
| 2004/0182404 | A1 | 9/2004 | Poindexter et al. |
| 2004/0191322 | A1 | 9/2004 | Hansson |
| 2004/0198127 | A1 | 10/2004 | Yamamoto et al. |
| 2004/0200488 | A1 | 10/2004 | Felter et al. |
| 2004/0206350 | A1 | 10/2004 | Alston et al. |
| 2004/0221857 | A1 | 11/2004 | Dominguez |
| 2004/0224435 | A1 | 11/2004 | Shibata et al. |
| 2004/0226568 | A1 | 11/2004 | Takeuchi et al. |
| 2004/0226569 | A1 | 11/2004 | Yang et al. |
| 2004/0234916 | A1 | 11/2004 | Hale |
| 2004/0237974 | A1 | 12/2004 | Min |
| 2004/0255965 | A1 | 12/2004 | Perfetti et al. |
| 2004/0261802 | A1 | 12/2004 | Griffin |
| 2005/0005947 | A1 | 1/2005 | Hampl et al. |
| 2005/0016533 | A1 | 1/2005 | Schuler et al. |
| 2005/0016549 | A1 | 1/2005 | Banerjee et al. |
| 2005/0016550 | A1 | 1/2005 | Katase |
| 2005/0029137 | A1 | 2/2005 | Wang |
| 2005/0034723 | A1 | 2/2005 | Bennett et al. |
| 2005/0051453 | A1 | 3/2005 | Schuler et al. |
| 2005/0056280 | A1 | 3/2005 | Alston et al. |
| 2005/0061759 | A1 | 3/2005 | Doucette |
| 2005/0066986 | A1 | 3/2005 | Nestor et al. |
| 2005/0067503 | A1 | 3/2005 | Katase |
| 2005/0069831 | A1 | 3/2005 | St. Charles et al. |
| 2005/0081601 | A1 | 4/2005 | Lawson |
| 2005/0090798 | A1 | 4/2005 | Clark et al. |
| 2005/0115243 | A1 | 6/2005 | Adle |
| 2005/0118545 | A1 | 6/2005 | Wong |
| 2005/0145533 | A1 | 7/2005 | Seligson |
| 2005/0151126 | A1 | 7/2005 | Yamakawa et al. |
| 2005/0161467 | A1 | 7/2005 | Jones |
| 2005/0172976 | A1 | 8/2005 | Newman et al. |
| 2005/0205084 | A1 | 9/2005 | Gupta et al. |
| 2005/0229918 | A1 | 10/2005 | Shim |
| 2005/0236006 | A1 | 10/2005 | Cowan |
| 2005/0244521 | A1 | 11/2005 | Strickland et al. |
| 2005/0268908 | A1 | 12/2005 | Bonney et al. |
| 2005/0268911 | A1 | 12/2005 | Cross et al. |
| 2005/0274390 | A1 | 12/2005 | Banerjee et al. |
| 2006/0016453 | A1 | 1/2006 | Kim |
| 2006/0018840 | A1 | 1/2006 | Lechuga-Ballesteros et al. |
| 2006/0032501 | A1 | 2/2006 | Hale et al. |
| 2006/0047368 | A1 | 3/2006 | Maharajh et al. |
| 2006/0054676 | A1 | 3/2006 | Wischusen |
| 2006/0070633 | A1 | 4/2006 | Rostami et al. |
| 2006/0093977 | A1 | 5/2006 | Pellizzari |
| 2006/0102175 | A1 | 5/2006 | Nelson |
| 2006/0150991 | A1 | 7/2006 | Lee |
| 2006/0162733 | A1 | 7/2006 | McGrath et al. |
| 2006/0185687 | A1 | 8/2006 | Hearn et al. |
| 2006/0191546 | A1 | 8/2006 | Takano et al. |
| 2006/0191548 | A1 | 8/2006 | Strickland et al. |
| 2006/0191594 | A1 | 8/2006 | Py |
| 2006/0196518 | A1 | 9/2006 | Hon |
| 2006/0254948 | A1 | 11/2006 | Herbert et al. |
| 2006/0255105 | A1 | 11/2006 | Sweet |
| 2007/0006889 | A1 | 1/2007 | Kobal et al. |
| 2007/0030306 | A1 | 2/2007 | Okamura |
| 2007/0045288 | A1 | 3/2007 | Nelson |
| 2007/0062548 | A1 | 3/2007 | Horstmann et al. |
| 2007/0062549 | A1 | 3/2007 | Holton et al. |
| 2007/0074734 | A1 | 4/2007 | Braunshteyn et al. |
| 2007/0089757 | A1 | 4/2007 | Bryman |
| 2007/0098148 | A1 | 5/2007 | Sherman |
| 2007/0102013 | A1 | 5/2007 | Adams et al. |
| 2007/0125765 | A1 | 6/2007 | Nelson |
| 2007/0144514 | A1 | 6/2007 | Yeates et al. |
| 2007/0163610 | A1 | 7/2007 | Lindell et al. |
| 2007/0169773 | A1 | 7/2007 | Rock |
| 2007/0191756 | A1 | 8/2007 | Tapper |
| 2007/0215164 | A1 | 9/2007 | Mehio |
| 2007/0215167 | A1 | 9/2007 | Crooks et al. |
| 2007/0215168 | A1 | 9/2007 | Banerjee et al. |
| 2007/0229025 | A1 | 10/2007 | Tsai et al. |
| 2007/0235046 | A1 | 10/2007 | Gedevanishvili |
| 2007/0267031 | A1 | 11/2007 | Hon |
| 2007/0267033 | A1 | 11/2007 | Mishra et al. |
| 2007/0277816 | A1 | 12/2007 | Morrison et al. |

(56) References Cited

U.S. PATENT DOCUMENTS

2007/0280652 A1 12/2007 Williams
2007/0283972 A1 12/2007 Monsees et al.
2007/0295347 A1 12/2007 Paine et al.
2008/0000763 A1 1/2008 Cove
2008/0023003 A1 1/2008 Rosenthal
2008/0029095 A1 2/2008 Esser
2008/0038363 A1 2/2008 Zaffaroni et al.
2008/0065176 A1 3/2008 Zhang et al.
2008/0085103 A1 4/2008 Beland et al.
2008/0092912 A1 4/2008 Robinson et al.
2008/0138423 A1 6/2008 Gonda
2008/0149118 A1 6/2008 Oglesby et al.
2008/0207276 A1 8/2008 Burrell
2008/0214103 A1 9/2008 Nelson et al.
2008/0216828 A1 9/2008 Wensley et al.
2008/0241255 A1 10/2008 Rose et al.
2008/0245377 A1 10/2008 Marshall et al.
2008/0257367 A1 10/2008 Paterno et al.
2008/0276947 A1 11/2008 Martzel
2008/0286340 A1 11/2008 Andersson et al.
2008/0302374 A1 12/2008 Wengert et al.
2008/0302375 A1 12/2008 Andersson et al.
2009/0065010 A1 3/2009 Shands
2009/0095311 A1 4/2009 Hon
2009/0095312 A1 4/2009 Herbrich et al.
2009/0126745 A1 5/2009 Hon
2009/0151717 A1 6/2009 Bowen et al.
2009/0188490 A1 7/2009 Hon
2009/0230117 A1 9/2009 Fernando et al.
2009/0260641 A1 10/2009 Monsees et al.
2009/0260642 A1 10/2009 Monsees et al.
2009/0272379 A1 11/2009 Thorens et al.
2009/0283103 A1 11/2009 Nielsen et al.
2009/0293892 A1 12/2009 Williams et al.
2009/0320863 A1 12/2009 Fernando et al.
2009/0320864 A1 12/2009 Rowley
2009/0324206 A1 12/2009 Young et al.
2010/0006113 A1 1/2010 Urtsev et al.
2010/0024834 A1 2/2010 Oglesby et al.
2010/0028766 A1 2/2010 Peckerar et al.
2010/0043809 A1 2/2010 Magnon
2010/0059070 A1 3/2010 Potter et al.
2010/0059073 A1 3/2010 Hoffmann et al.
2010/0065075 A1 3/2010 Banerjee et al.
2010/0083959 A1 4/2010 Siller
2010/0163063 A1 7/2010 Fernando et al.
2010/0200006 A1 8/2010 Robinson et al.
2010/0229881 A1 9/2010 Hearn
2010/0242974 A1 9/2010 Par
2010/0242976 A1 9/2010 Katayama et al.
2010/0258139 A1 10/2010 Onishi et al.
2010/0300467 A1 12/2010 Kuistila et al.
2010/0307518 A1 12/2010 Wang
2010/0313901 A1 12/2010 Fernando et al.
2010/0319686 A1 12/2010 Schennum
2011/0005535 A1 1/2011 Xiu
2011/0011286 A1 1/2011 Strasser
2011/0011396 A1 1/2011 Fang
2011/0015513 A1 1/2011 Yanez
2011/0036346 A1 2/2011 Cohen et al.
2011/0036363 A1 2/2011 Urtsev et al.
2011/0036365 A1 2/2011 Chong et al.
2011/0073121 A1 3/2011 Levin et al.
2011/0088707 A1 4/2011 Hajaligol
2011/0094523 A1 4/2011 Thorens et al.
2011/0120480 A1 5/2011 Gedevanishvili et al.
2011/0120482 A1 5/2011 Brenneise
2011/0126847 A1 6/2011 El-Shall et al.
2011/0126848 A1 6/2011 Zuber et al.
2011/0155153 A1 6/2011 Thorens et al.
2011/0155718 A1 6/2011 Greim et al.
2011/0162663 A1 7/2011 Bryman
2011/0168194 A1 7/2011 Hon
2011/0180082 A1 7/2011 Banerjee et al.
2011/0226236 A1 9/2011 Buchberger
2011/0265806 A1 11/2011 Alarcon et al.
2011/0290248 A1 12/2011 Schennum
2011/0290268 A1 12/2011 Schennum
2011/0309157 A1 12/2011 Yang et al.
2012/0042885 A1 2/2012 Stone et al.
2012/0060853 A1 3/2012 Robinson et al.
2012/0111347 A1 5/2012 Hon
2012/0132643 A1 5/2012 Choi et al.
2012/0186594 A1 7/2012 Liu
2012/0199146 A1 8/2012 Marangos
2012/0227752 A1 9/2012 Alelov
2012/0227753 A1 9/2012 Newton
2012/0231464 A1 9/2012 Yu et al.
2012/0260927 A1 10/2012 Liu
2012/0279512 A1 11/2012 Hon
2012/0318882 A1 12/2012 Abehasera
2013/0037031 A1 2/2013 Gredat
2013/0037041 A1 2/2013 Worm et al.
2013/0042865 A1 2/2013 Monsees et al.
2013/0056013 A1 3/2013 Terry et al.
2013/0081625 A1 4/2013 Rustad et al.
2013/0081642 A1 4/2013 Safari
2013/0185903 A1 7/2013 Matsuzawa et al.
2013/0192619 A1 8/2013 Tucker et al.
2013/0213418 A1 8/2013 Tucker et al.
2013/0213419 A1 8/2013 Tucker et al.
2013/0220315 A1 8/2013 Conley et al.
2013/0228191 A1 9/2013 Newton
2013/0255702 A1 10/2013 Griffith, Jr. et al.
2013/0284192 A1 10/2013 Peleg et al.
2013/0298905 A1 11/2013 Levin et al.
2013/0306064 A1 11/2013 Thorens et al.
2013/0306074 A1 11/2013 Bowditch et al.
2013/0306084 A1 11/2013 Flick
2013/0312742 A1 11/2013 Monsees et al.
2013/0312776 A1 11/2013 Newton
2013/0319431 A1 12/2013 Cyphert et al.
2013/0319439 A1 12/2013 Gorelick et al.
2013/0340750 A1 12/2013 Thorens et al.
2013/0340775 A1 12/2013 Juster et al.
2014/0000638 A1 1/2014 Sebastian et al.
2014/0014124 A1 1/2014 Glasberg et al.
2014/0020696 A1 1/2014 Liu
2014/0034071 A1 2/2014 Levitz et al.
2014/0060552 A1 3/2014 Cohen
2014/0060554 A1 3/2014 Collett et al.
2014/0060555 A1 3/2014 Chang et al.
2014/0076310 A1 3/2014 Newton
2014/0083442 A1 3/2014 Scatterday
2014/0096781 A1 4/2014 Sears et al.
2014/0096782 A1 4/2014 Ampolini et al.
2014/0109921 A1 4/2014 Chen
2014/0157583 A1 6/2014 Ward et al.
2014/0209105 A1 7/2014 Sears et al.
2014/0253144 A1 9/2014 Novak et al.
2014/0261408 A1 9/2014 DePiano et al.
2014/0261486 A1 9/2014 Potter et al.
2014/0261487 A1 9/2014 Chapman et al.
2014/0261489 A1 9/2014 Cadieux et al.
2014/0261495 A1 9/2014 Novak et al.
2014/0270727 A1 9/2014 Ampolini et al.
2014/0270729 A1 9/2014 DePiano et al.
2014/0270730 A1 9/2014 DePiano et al.
2014/0290674 A1 10/2014 Liu
2014/0305453 A1 10/2014 Hon
2014/0334804 A1 11/2014 Choi
2014/0345631 A1 11/2014 Bowen et al.
2014/0366898 A1 12/2014 Monsees et al.
2015/0020824 A1 1/2015 Bowen et al.
2015/0147055 A1 5/2015 Mino
2015/0201675 A1 7/2015 Lord
2015/0208729 A1 7/2015 Monsees et al.
2015/0245659 A1 9/2015 DePiano et al.
2016/0198767 A1 7/2016 Verleur

FOREIGN PATENT DOCUMENTS

CA 2562581 10/2005
CA 2 641 869 5/2010

(56) References Cited

FOREIGN PATENT DOCUMENTS

| | | | |
|---|---|---|---|
| CA | 2 752 255 | | 8/2010 |
| CN | 85106876 | A | 9/1986 |
| CN | 1122213 | A | 5/1996 |
| CN | 1135860 | | 11/1996 |
| CN | 2 291 796 | Y | 9/1998 |
| CN | 2293957 | | 10/1998 |
| CN | 2293957 | Y | 10/1998 |
| CN | 1233436 | A | 11/1999 |
| CN | 1333657 | | 1/2002 |
| CN | 1530041 | A | 9/2004 |
| CN | 1541577 | | 11/2004 |
| CN | 1596775 | A | 3/2005 |
| CN | 2719043 | | 8/2005 |
| CN | 1775123 | | 5/2006 |
| CN | 2777995 | | 5/2006 |
| CN | 2819833 | | 9/2006 |
| CN | 2870485 | | 2/2007 |
| CN | 1931040 | | 3/2007 |
| CN | 1931042 | | 3/2007 |
| CN | 200997909 | Y | 1/2008 |
| CN | 101116542 | A | 2/2008 |
| CN | 201018481 | Y | 2/2008 |
| CN | 201018927 | Y | 2/2008 |
| CN | 101176805 | A | 5/2008 |
| CN | 201085044 | Y | 7/2008 |
| CN | 201104488 | | 8/2008 |
| CN | 201226774 | | 4/2009 |
| CN | 201379072 | | 1/2010 |
| CN | 301547686 | S | 5/2011 |
| CN | 201860753 | | 6/2011 |
| CN | 102132957 | A | 7/2011 |
| CN | 201900065 | | 7/2011 |
| CN | 301970169 | S | 6/2012 |
| CN | 202566289 | U | 12/2012 |
| CN | 202774133 | U | 3/2013 |
| CN | 302396126 | S | 4/2013 |
| CN | 103584287 | A | 2/2014 |
| CN | 303103389 | S | 2/2014 |
| CN | 302799554 | S | 4/2014 |
| CN | 302810246 | S | 4/2014 |
| CN | 302884434 | S | 7/2014 |
| CN | 302926289 | S | 8/2014 |
| CN | 302950830 | S | 9/2014 |
| CN | 104095291 | A | 10/2014 |
| CN | 303089422 | S | 1/2015 |
| CN | 303091331 | S | 1/2015 |
| CN | 303103390 | S | 2/2015 |
| CN | 303210086 | S | 5/2015 |
| CN | 303568163 | S | 1/2016 |
| DE | 2653133 | | 5/1978 |
| DE | 2704218 | A1 | 8/1978 |
| DE | 4200639 | A1 | 7/1992 |
| DE | 199410665 | U1 | 12/1994 |
| DE | 19854005 | A1 | 5/2000 |
| DE | 19854008 | | 5/2000 |
| DE | 19854012 | A1 | 5/2000 |
| DE | 19935706 | A1 | 2/2001 |
| DE | 10 2006 004 484 | | 8/2007 |
| DE | 10 2006 041 042 | A1 | 3/2008 |
| DE | 20 2009 010 400 | U1 | 11/2009 |
| EM | 2626416-001 | S | 4/2015 |
| EM | 2626416-002 | S | 4/2015 |
| EP | 0 283 672 | | 9/1988 |
| EP | 0 295 122 | | 12/1988 |
| EP | 0 342 538 | | 11/1989 |
| EP | 0173845 | | 11/1989 |
| EP | 0 358 114 | A2 | 3/1990 |
| EP | 0 430 559 | A2 | 6/1991 |
| EP | 0 430 566 | | 6/1991 |
| EP | 0 501 419 | A1 | 9/1992 |
| EP | 0 503 767 | | 9/1992 |
| EP | 0 532 194 | A1 | 3/1993 |
| EP | 0 535 695 | A2 | 4/1993 |
| EP | 0 283 672 | B1 | 9/1993 |
| EP | 0 762 258 | A2 | 3/1997 |
| EP | 0 845 220 | | 6/1998 |
| EP | 0 706 352 | | 3/2002 |
| EP | 0 845 220 | B1 | 9/2003 |
| EP | 1 154 815 | | 7/2004 |
| EP | 1458388 | A1 | 9/2004 |
| EP | 1 618 803 | | 1/2006 |
| EP | 1942754 | A2 | 7/2008 |
| EP | 1 989 946 | | 11/2008 |
| EP | 2022349 | | 2/2009 |
| EP | 1 942 754 | | 12/2010 |
| EP | 2 316 286 | A1 | 5/2011 |
| EP | 2319334 | | 5/2011 |
| EP | 2 468 116 | A1 | 6/2012 |
| EP | 3266322 | A1 | 10/2018 |
| EP | 3 669 682 | | 6/2022 |
| ES | 2118034 | A1 | 9/1998 |
| ES | 1070375 | | 8/2009 |
| FR | 2128256 | A1 | 10/1972 |
| GB | 191125575 | A | 3/1912 |
| GB | 588117 | | 5/1947 |
| GB | 755475 | | 8/1956 |
| GB | 1025630 | A | 4/1966 |
| GB | 1065678 | A | 4/1967 |
| GB | 1 431 045 | | 4/1976 |
| GB | 1444461 | | 7/1976 |
| GB | 2 070 409 | | 9/1981 |
| GB | 2469850 | | 11/2010 |
| JP | S54-16614 | B2 | 6/1979 |
| JP | S6437276 | A | 2/1989 |
| JP | H02234905 | A | 9/1990 |
| JP | H05247711 | A | 9/1993 |
| JP | 9075058 | | 3/1997 |
| JP | H09-326299 | | 12/1997 |
| JP | H10501999 | A | 2/1998 |
| JP | 11075807 | | 3/1999 |
| JP | 2949114 | | 9/1999 |
| JP | 2000041654 | A | 2/2000 |
| JP | 2000203639 | A | 7/2000 |
| JP | 2000236865 | A | 9/2000 |
| JP | 2001161819 | A | 6/2001 |
| JP | 2001165437 | A | 6/2001 |
| JP | P2001-291598 | | 10/2001 |
| JP | 2005034021 | A | 2/2005 |
| JP | 2006504430 | A | 2/2006 |
| JP | 2006320285 | A | 11/2006 |
| JP | 2006320286 | A | 11/2006 |
| KR | 10-0193885 | B1 | 6/1999 |
| KR | 2002-0067473 | A | 8/2002 |
| KR | 10-0636287 | | 10/2006 |
| KR | 10-0929382 | | 12/2009 |
| KR | 100933516 | | 12/2009 |
| KR | 200448259 | | 3/2010 |
| KR | 20-20100006995 | | 7/2010 |
| KR | 20110001457 | | 2/2011 |
| KR | 20110004049 | | 4/2011 |
| KR | 200453424 | Y1 | 5/2011 |
| KR | 10-2011-0079584 | | 7/2011 |
| KR | 20-2011-0006928 | U | 7/2011 |
| KR | 10-1069342 | B1 | 10/2011 |
| KR | 10-2012-0080287 | A | 7/2012 |
| KR | 10-2012-0105655 | A | 9/2012 |
| KR | 10-2012-0132004 | A | 12/2012 |
| KR | 10-1241782 | | 3/2013 |
| KR | 20-2013-0003312 | | 6/2013 |
| KR | 2013-0127412 | | 11/2013 |
| WO | WO 86/02528 | A1 | 5/1986 |
| WO | WO 95/01137 | A1 | 1/1995 |
| WO | WO 95/27412 | | 10/1995 |
| WO | WO 96/32854 | | 10/1996 |
| WO | WO 97/12639 | A1 | 4/1997 |
| WO | WO 97/48293 | | 12/1997 |
| WO | WO 98/16125 | | 4/1998 |
| WO | WO 98/57556 | | 12/1998 |
| WO | WO 00/05976 | A1 | 2/2000 |
| WO | WO 00/28842 | | 5/2000 |
| WO | WO 00/28843 | A1 | 5/2000 |
| WO | WO 00/28844 | | 5/2000 |
| WO | WO 00/50111 | A1 | 8/2000 |
| WO | WO 01/02040 | A1 | 1/2001 |

(56) References Cited

FOREIGN PATENT DOCUMENTS

| | | |
|---|---|---|
| WO | WO 02/37990 A2 | 5/2002 |
| WO | WO 03/000327 A1 | 1/2003 |
| WO | WO 03/055486 A1 | 7/2003 |
| WO | WO 03/056948 A1 | 7/2003 |
| WO | WO 03/082031 A1 | 10/2003 |
| WO | WO 03/094900 A1 | 11/2003 |
| WO | WO 03/101454 A1 | 12/2003 |
| WO | WO 03/103387 A2 | 12/2003 |
| WO | WO 2004/095955 A1 | 3/2004 |
| WO | WO 2004/043175 | 5/2004 |
| WO | WO 2004/064548 A1 | 8/2004 |
| WO | WO 2004/080216 A1 | 9/2004 |
| WO | WO 2004/098324 | 11/2004 |
| WO | WO 2005/020726 A1 | 3/2005 |
| WO | WO 2005/099494 A1 | 3/2005 |
| WO | WO 2005/032285 | 4/2005 |
| WO | WO 2005/039326 | 5/2005 |
| WO | WO 2005/060366 A2 | 7/2005 |
| WO | WO 2006/015070 A1 | 2/2006 |
| WO | WO 2006/021153 A1 | 3/2006 |
| WO | WO 2006/082571 | 8/2006 |
| WO | WO 2006/098936 | 9/2006 |
| WO | WO 2007/015735 | 2/2007 |
| WO | WO 2007/026131 A1 | 3/2007 |
| WO | WO 2007/042941 | 4/2007 |
| WO | WO 2007/066374 A1 | 6/2007 |
| WO | WO 2007/077167 | 7/2007 |
| WO | WO 2007/078273 | 7/2007 |
| WO | WO 2007/095109 A2 | 8/2007 |
| WO | WO 2007/117675 A2 | 10/2007 |
| WO | WO 2007/131449 | 11/2007 |
| WO | WO 2007/131450 A1 | 11/2007 |
| WO | WO 2007/141520 A1 | 12/2007 |
| WO | WO 2008/077271 A1 | 7/2008 |
| WO | WO 2008/108889 A1 | 9/2008 |
| WO | WO 2008/139411 | 11/2008 |
| WO | WO 2008/151777 A2 | 12/2008 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 A1 | 7/2010 |
| WO | WO 2010/091593 | 8/2010 |
| WO | WO 2010/118644 | 10/2010 |
| WO | WO 2010/140937 | 12/2010 |
| WO | WO 2011/010334 | 1/2011 |
| WO | WO 2011/050964 | 5/2011 |
| WO | WO 2010/073122 B2 | 7/2011 |
| WO | WO 2011/081558 | 7/2011 |
| WO | WO 2011/147699 | 12/2011 |
| WO | WO 2012/062600 | 5/2012 |
| WO | DM079112 S | 6/2012 |
| WO | WO 2012/072762 | 6/2012 |
| WO | WO 2012/142293 | 10/2012 |
| WO | WO 2012/174677 | 12/2012 |
| WO | WO 2013/025921 | 2/2013 |
| WO | WO 2013/089551 | 6/2013 |
| WO | WO 2013/098396 | 7/2013 |
| WO | WO 2013/098405 | 7/2013 |
| WO | WO 2013/102611 | 7/2013 |
| WO | WO 2013/147492 | 10/2013 |
| WO | WO 2014/012906 | 1/2014 |
| WO | WO 2014/012907 | 1/2014 |
| WO | WO 2015/130598 | 9/2015 |

OTHER PUBLICATIONS

Commission Investigative Staff's Opening Claim Construction Brief in *Certain Tobacco Heating Articles and Components Thereof*, No. 337-TA-1199 (U.S.I.T.C. Aug. 21, 2020).
Commission Investigative Staff's Responsive Claim Construction Brief in *Certain Tobacco Heating Articles and Components Thereof*, No. 337-TA-1199 (U.S.I.T.C. Sep. 4, 2020).
Communication of Further Notices of Opposition filed in corresponding European Application No. 19151511.3, U.S. Pat. No. 3,491,944, mailed Mar. 16, 2021, 27 pages.
Communication of Further Notices of Opposition filed in corresponding European Application No. 19151511.3, U.S. Pat. No. 3,491,944, mailed Mar. 16, 2021, 63 pages.
Complainants RAI Strategic Holdings, Inc., R.J. Reynolds Vapor Company, and R.J. Reynolds Tobacco Company's Infringement Claim Chart for U.S. Pat. No. 9,839,238 from ITC Inv. No. 337-TA-1199.
Complainants' Opening Claim Construction Brief in Certain Tobacco Heating Articles and Components Thereof, No. 337-TA-1199 (U.S. I.T.C. Aug. 21, 2020).
Complainants' Responsive Claim Construction Brief in Certain Tobacco Heating Articles and Components Thereof, No. 337-TA-1199 (U.S.I.T.C. Sep. 4, 2020).
Complaint and Public Interest Statement in *Certain Tobacco Heating Articles and Components Thereof,* ITC Inv. No. 337-TA-1199.
Complaint for Patent Infringement in *RAI Strategic Holdings, Inc.* v. *Altria Client Services LLC,* No. 1:20-cv-393 (E.D. Va. Apr. 9, 2020).
Concise Oxford English Dictionary ($11^{th}$ ed., 2008), pp. 311, 1213.
Consent Order in *RAI Strategic Holdings, Inc.* v. *Altria Client Services LLC,* No. 1:20-cv-393 (E.D. Va. May 4, 2020).
Coresta, Physical Test Methods Sub-Group Technical Report: Tobacco Moisture, Water and Oven Volatiles, Jul. 2014.
Coresta, Tobacco and Tobacco Products Analytes Sub-Group Technical Report: 2018 Moisture (OV), Water by Karl Fischer and Gas Chromatography Interlaboratory Study, Aug. 2018.
Curriculum Vitae of Dr. Deevi.
Curriculum Vitae of Dr. Seetharama C. Deevi.
Curriculum Vitae of Samir Nayfeh, Ph.D.
Curriculum Vitae of Stewart Fox.
D. Kirk Davidson, Selling Sin: The Marketing of Socially Unacceptable Products (2d ed. 2003).
Decision Denying Institution of Inter Partes Review in Inter Partes Review of U.S. Pat. No. 9,814,268, dated Nov. 16, 2020.
Decision Denying Institution of Inter Partes Review of U.S. Pat. No. 9,839,238 (Jan. 19, 2021).
Decision Denying Patent Owner's Request for Rehearing in Inter Partes Review of U.S. Pat. No. 9,930,915, dated Feb. 25, 2022.
Decision Denying Petitioner's Request for Rehearing in Inter Partes Review of U.S. Pat. No. 9,839,238 (Jul. 30, 2021).
Decision Granting Institution of Inter Partes Review in Inter Partes Review of U.S. Pat. No. 9,930,915, dated Jan. 25, 2021.
Decision Granting Request for Rehearing and Granting Institution of Inter Partes Review in Inter Partes Reexamination of U.S. Pat. No. 9,814,268, dated Aug. 5, 2021.
Decision of the Opposition Division dated Jul. 20, 2021 in corresponding European Application No. 18173918.6.
Declaration of Charles E. Clemens in Inter Partes Review of U.S. Pat. No. 9,930,915, dated Apr. 16, 2021.
Declaration of Dr. Deevi in Support of Petition for Inter Partes Review of '915 Patent ("Deevi Decl.").
Declaration of Dr. Seetharama C. Deevi in Support of Petition for Inter Partes Review of '268 Patent.
Declaration of Dr. Seetharama C. Deevi in Support of Petition for Inter Partes Review of '123 Patent.
Declaration of Dr. Seetharama C. Deevi in Support of Petitions for PTAB Review of '542 Patent ("Deevi Decl.").
Declaration of Dr. Seetharama Deevi in support of Petitioner's Reply in Inter Partes Review of U.S. Pat. No. 9,930,915, dated Jul. 10, 2021.
Declaration of Jonathan M. Strang in Response to Patent Owner's Objections to Petitioner's Exhibits [served Aug. 12, 2021, not filed].
Declaration of Samir Nayfeh, Ph.D. in Support of Petition for Inter Partes Review of '238 Patent ("Nayfeh Decl.").
Declaration of Stewart Fox in Support of Petition for Inter Partes Review of '123 Patent.
Defendants' Unopposed Motion to Invoke the Statutory Stay of Plaintiffs' Claims Relating to U.S. Pat. No. 9,839,238, U.S. Pat. No. 9,901,123, and U.S. Pat. No. 9,930,915 Pursuant to 28 U.S.C. §

(56) References Cited

OTHER PUBLICATIONS 1659 in *RAI Strategic Holdings, Inc.* v. *Altria Client Services LLC,* No. 1:20-cv-393 (E.D. Va. Jun. 12, 2020).
Douglas C. McGill, 'Smokeless' Cigarette's Hapless Start, N.Y. Times, Nov. 19, 1988, at 33.
Email exchange among Carolyn Carpenter, John Robinson et al. regarding electric cigarette, available at https://www.industrydocuments.ucsf.edu/docs/nsxy0228.
Email from Jonathan Strang "Precedential Opinion Panel Request: IPR2020-00921 (U.S. Pat. No. 9,814,268)", Exhibit 3002 in Inter Partes Review of U.S. Pat. No. 9,814,268, dated Dec. 15, 2020.
Email from Jonathan Strang "Precedential Opinion Panel Request: IPR2020-01097 (U.S. Pat. No. 9,839,238)" Exhibit 3001 in Inter Partes Review of U.S. Pat. No. 9,839,238 (Feb. 18, 2021).
Excerpts from James W. Dally, Packaging of Electronic Systems: A Mechanical Engineering Approach (1990), 18 pgs.
Extended European Search Report, EP 17 18 5645, mailed Nov. 28, 2017.
FDA News release, *FDA Authorizes Marketing of IQOS Tobacco Heating System with 'Reduced Exposure' Information* (Jul. 7, 2020), https://www.fda.gov/news-events/press-announcements/fda-authorizesmarketing-iqos-tobacco-heating-system-reduced-exposure-information.
FDA News Release, FDA Permits Sale of IQOS Tobacco Heating System Through Premarket Tobacco Product Application Pathway (Apr. 30, 2019).
FDA News release, *FDA permits sale of IQOS Tobacco Heating System through premarket tobacco product application pathway* (Apr. 30, 2019), https://www.fda.gov/news-events/press-announcements/fdapermits-sale-iqos-tobacco-heating-system-through-premarket-tobaccoproduct-application-pathway.
File history for U.S. Pat. No. 9,814,268.
File History regarding U.S. Pat. No. 10,588,355 ("'355 FH").
File History regarding U.S. Pat. No. 9,839,238.
George Wypych, *Handbook of Polymers* (2d ed. 2016).
Hajaligol et al., "Method of Making a Heather with Bullet Shape (Design) to be Used in the Beta Article, Specifically Useful for Beta Cigarettes Made with Cut Filler" May 1994, Invention Record www.industrydocuments.ucsf.edu/docs/#id=mhpp0217.
Hajaligol, M. R., "Method of Making a Heater With Bullet Shape," Mar. 1994. Philip Morris Records; Master Settlement Agreement. https://www.industrydocuments.ucsf.edu/docs/ktbn0130.
Harvard School of Public Health, Division of Public Health Practice, Potentially Reduced Exposure Tobacco Products—A Public Health Information Guide (2008) ("Eclipse-Premier").
Hon Lik, *I Was Sure That The Electronic Cigarette Would Be Welcomed With Open Arms,* Sciences at Avenir (Oct. 7, 2013) https://www.sciencesetavenir.fr/sante/i-was-sure-that-the-electronic-cigarette-would-be-welcomed-with-open-arms_26020 (updated Oct. 18, 2013).
Honeywell datasheet for Pressure Sensors, 160PC Series ("Honeywell datasheet").
Honeywell Microbridge Mass Airflow Sensor/Unamplified, AWM2000 Series.
Horowitz, et al., The Art of Electronics, 1980, pp. 33-35.
IEEE 100, The Authoritative Dictionary of IEEE Standards Terms ($7^{th}$ ed. 2000), pp. 230, 234.
In re Court Operations Under the Exigent Circumstances Created by the Outbreak of Coronavirus Disease 2019 (COVID-19): Temporary Suspension of Criminal Jury Trials (E.D. Va. Nov. 16, 2020).
Inhalation Technology, Dr. Donald E. Garden, ed., vol. 12, No. 5, pp. 1-58, (2000).
IQOS—A New Era in Tobacco (2014).
J.P. Hammond et al., Brazing Ceramic Oxides to Metals at Low Temperatures, Welding Research Supplement, 227-232-s (1998) ("Hammond Brazing").
J.R. Davis, Joining, Metals Handbook Desk Edition, 1049-1056 (2d ed. 1998) ("ASM Joining").
James A. Speck, Mechanical Fastening, Joining, and Assembly, Marcel Dekker, Inc. 1997, 4 pgs.
Joint Proposed Discovery Plan Pursuant to Rule 26(f), *RAI Strategic Holdings, Inc.* v. *Altria Client Services LLC,* No. 1:20-cv-00393-LO-TCB (E.D. Va. Sep. 2, 2020), ECF No. 97.
Joint Proposed Procedural Schedule in *Certain Tobacco Heating Articles and Components Thereof,* ITC Inv. No. 337-TA-1199 (U.S.I.T.C. Jun. 9, 2020).
Jones J. et al. Cigarette Brainstorming Team No. 2. May 1, 19943. Philip Morris Records; Master Settlement Agreement. Unknown. https://www.industrydocuments.ucsf.edu/docs/gqcv0119.
Judgment Final Written Decision Determining All Challenged Claims Unpatentable in Inter Partes Review of U.S. Pat. No. 9,814,268, dated Jun. 30, 2022.
Judgment Final Written Decision Determining All Challenged Claims Unpatentable in IPR2020-01094, Inter Partes Review of U.S. Pat. No. 9,930,915, Jan. 11, 2022.
Judgment Final Written Decision in Inter Partes Review of U.S. Pat. No. 9,901,123, dated Mar. 30, 2022.
Memorandum in Support of Defendants' Partial Motion to Stay Plaintiffs' Claims Regarding U.S. Pat. No. 9,814,268 and U.S. Pat. No. 10,492,542, *RAI Strategic Holdings, Inc.* v. *Altria Client Services LLC,* No. 1:20-cv-00393-LO-TCB (E.D. Va. Nov. 27, 2020), ECF No. 371.
Merriam-Webster's Collegiate Dictionary ($10^{th}$ ed., 2001), (excerpt).
Modern Dictionary of Electronics ($7^{th}$ ed., 1999), pp. 151, 636, 637.
Modification of Limited Exclusion Order and Cease and Desist Order; Termination of the Modification Proceeding as to U.S. Pat. No. 6,377,577 and Suspension of the Modification Proceeding as to U.S. Pat. No. 7,224,668 in Certain Network Devices, Related Software and Components Thereof, No. 337-TA-945 (U.S.I.T.C. Jun. 26, 2018) ("Commission Order").
Monique Williams & Prue Talbot, Variability Among Electronic Cigarettes in the Pressure Drop, Airflow Rate, and Aerosol Production, 13 Nicotine & Tobacco Research 1276-84 (Dec. 2011) ("Williams and Talbot").
Morgan et al., "Philip Morris USA Invention Record," Oct. 1988, www.industrydocuments.ucsf.edu/docs/#id=znbc0114.
Mosdesign Semiconductor Corp. Datasheet for M1600 Led Drivers ("Mosdesign M1600 Datasheet"), 1 pg.
MPL 502 Series Specifications, Micro Pneumatic Logic, Inc., (Mar. 11, 2006), http://www.pressureswitch.com/PDFs/0502STANDARDA.pdf [https://web.archive.org/web/20060311132848 /http://www.pressureswitch.com/PDFs/0502STANDARDA.pdf], 17 pgs.
MPL Pressure Switch Solutions, Micro Pneumatic Logic, Inc., (Product Brochure) (Mar. 11, 2006), http://www.pressureswitch.com/PDFs/2000_MPLBrochure.pdf [https://web.archive.org/web/20060311132419/http://www.pressureswitch.com/PDFs/2000_MPLBrochure.pdf]. 2 pgs.
N.A. Fuchs, The Mechanics of Aerosols (1989), 22 pgs.
Patent Owner's Sur-Reply to Petitioner's Reply to Patent Owner's Preliminary Response in Inter Partes Review of U.S. Pat. No. 9,839,238 (Dec. 10, 2020).
Patent Owner's Sur-Reply to Petitioner's Reply to Patent Owner's Preliminary Response in Inter Partes Review of U.S. Pat. No. 9,930,915, dated Dec. 10, 2020.
Petition for Inter Partes Review of U.S. Pat. No. 10,492,542.
Petition for Inter Partes Review of U.S. Pat. No. 9,839,238.
Petition for Inter Partes Review of U.S. Pat. No. 9,930,915.
Petition for Inter Partes Review of U.S. Pat. No. 9,814,268, submitted May 8, 2020.
Petition for Inter Partes Review of U.S. Pat. No. 9,901,123, submitted May 8, 2020.
Petition for Inter Partes Review of U.S. Pat. No. 9,901,123, submitted Sep. 18, 2020.
Petition for Post-Grant Review of U.S. Pat. No. 10,492,542.
Petitioner's Demonstratives: *Philip Morris Products, S.A.* v. *RAI Strategic Holdings, Inc.,* IPR2020-00921, May 11, 2022.
Petitioner's Demonstratives: *Philip Morris Products, S.A.* v. *RAI Strategic Holdings, Inc.,* IPR2020-01094, in Inter Partes Review of U.S. Pat. No. 9,930,915, Oct. 27, 2021.
Petitioner's Reply in Inter Partes Review of U.S. Pat. No. 9,814,268, entered Feb. 28, 2022.
Sherz, Paul, Practical Electronics for Inventors, 2000, p. 107, p. 234.

(56) References Cited

OTHER PUBLICATIONS

Steven M. Kaplan, Wiley Electrical and Electronics Engineering Dictionary (2004), pp. 144-145.
Submission in Opposition Proceedings, filed in corresponding European Application No. 18173918.6, Patent No. 3398460, dated Dec. 3, 2020.
Submission in opposition proceedings, Further Written Submissions filed in corresponding European Application No. 18173918.6, U.S. Pat. No. 3,398,460. Dated Apr. 16, 2021.
Summary of Group #3 Brainstorming on May 13, 1994.
The American Heritage Dictionary of the English Language (5th ed. 2011), p. 1467.
The Lady Smokes, www.theladysmokes.com, webpages archived at https://web.archive.org/web/20061107040128/http://theladysmokes.com (Nov. 7, 2006), https://web.archive.org/web/20061107040116/http://www.theladysmokes.com/CigaretteHolders.html (Nov. 7, 2006), https://web.archive.org/web/20061107040116/http://www.theladysmokes.com/Bitchsticks.html (Nov. 7, 2006), and https://web.archive.org/web/20061107040116/http://www.theladysmokes.com/FAQs.html (Mar. 13, 2007).
Thermal Ink-Jet Print Cartridge Designer's Guide (2nd Edition Hewlett Packard) ("Jet Print Cartridge Designers Guide"), 12 pgs.
Third Party Observation filed in corresponding European Application No. 19151515.4, U.S. Pat. No. 3,508,076, mailed Jan. 18, 2021.
Third Party Observation filed in corresponding European Application No. 19151515.4, U.S. Pat. No. 3,508,076, mailed Mar. 12, 2020.
Transcript of Motion Hearing Proceedings (Via Zoom Conference) Before the Honorable Theresa C. Buchanan, United States District Court Magistrate Judge, *RAI Strategic Holdings, Inc.* v. *Altria Client Services LLC,* No. 1:20-cv-00393-LO-TCB (E.D. Va. Dec. 4, 2020).
Transcript Record of Oral Hearing held May 11, 2022 in Inter Partes Review of U.S. Pat. No. 9,814,268.
U.S. Appl. No. 60/722,036.
UK Approved Judgment In the High Court of Justice Business and Property Courts of England and Wales Intellectual Property List (ChD) Patents Court, dated Mar. 9, 2021, EWHC 537.
Unknown. Heater Development. Mar. 1994. Philip Morris Records; Master Settlement Agreement. Unknown. https://www.industrydocuments.ucsf.edu/docs/hxwy0118.
Unknown. Philip Morris Patent Database Search Invention Disclosures Dating From About 800000 to Present for Which Patent Applications Were Not Filed. Aug. 21, 1996. Philip Morris Records; Master Settlement Agreement. Unknown. https://www.industrydocuments.ucsf.edu/docs/kgd10071.
Unknown. Project Beta Core Teams—Ashland. May 6, 1994. Philip Morris Records; Master Settlement Agreement. Unknown. https://www.industrydocuments.ucsf.edu/docs/szjn0076.
Videotaped Deposition of Charles E. Clemens, Conducted Virtually in United States International Trade Commission Investigation 337-TA-1199 in the matter of Certain Tobacco Heating Articles and Components Thereof on Nov. 5, 2020.
Waybackmachine Archive of Wikipedia page "Polycarbonate" 2006, Accessed from web.archive.org/web/20060913000000/https://en.wikipedia.org/wiki/Polycarbonate.
Webpages from Beijing SBT Ruyan Technology & Development Corp., Sbtry.cn (archived at web.archive.org, 2005-2006, with affidavit).
Webpages from E-cig.com (archived at web.archive.org, 2006-2007, with affidavit).
Patent Owner Sur-Reply in post-grant review of U.S. Pat. No. 10,492,542 dated Aug. 11, 2021.
Judgment Final Written Decision Determining All Challenged Claims Unpatentable in post-grant review of U.S. Pat. No. 10,492,542 entered Jan. 10, 2022.
Patent Owner's Rehearing Request in post-grant review of U.S. Pat. No. 10,492,542 dated Feb. 9, 2022.
Decision Denying Patent Owner's Request for Rehearing in post-grant review of U.S. Pat. No. 10,492,542 entered Mar. 31, 2022.
File History regarding U.S. Pat. No. 10,492,542 ("'542 FH").
Patent Owner Preliminary Response in Inter Partes Review of U.S. Pat. No. 9,901,123, dated Aug. 17, 2020.
Petitioner's Reply to the Patent Owner Preliminary Response in Inter Partes Review of U.S. Pat. No. 9,901,123, entered Sep. 18, 2020.
Patent Owner's Sur-Reply to Petitioner's Reply to the Patent Owner's Preliminary Response in Inter Partes Review of U.S. Pat. No. 9,901,123, dated Sep. 29, 2020.
Decision Denying Institution of Inter Partes Review in Inter Partes Review of U.S. Pat. No. 9,901,123, dated Nov. 16, 2020.
Patent Owner's Demonstratives for Oral Argument: RAI's PTAB Presentation, *Philip Morris Products, S.A.* v. *RAI Strategic Holdings, Inc.,* IPR2020-01602, Exhibit 2017, Jan. 6, 2021.
Patent Owner Preliminary Response in Inter Partes Review of U.S. Pat. No. 9,901,123, dated Jan. 8, 2021.
Petitioner's Reply to the Patent Owner Preliminary Response in Inter Partes Review of U.S. Pat. No. 9,901,123, entered Feb. 9, 2021.
Decision Granting Institution of Inter Partes Review in Inter Partes Review of U.S. Pat. No. 9,901,123, dated Apr. 2, 2021.
Declaration of Charles E. Clemens in Inter Partes Review of U.S. Pat. No. 9,901,123, dated Jul. 1, 2021.
Patent Owner Response in Inter Partes Review of U.S. Pat. No. 9,901,123, dated Jul. 2, 2021.
Remote Videotaped Deposition of Stewart M. Fox on Jun. 25, 2021, in Inter Partes Review of U.S. Pat. No. 9,901,123.
Petitioner's Reply in Inter Partes Review of U.S. Pat. No. 9,901,123, dated Oct. 8, 2021.
Patent Owner Sur-Reply in Inter Partes Review of U.S. Pat. No. 9,901,123, dated Nov. 19, 2021.
Record of Oral Hearing held Jan. 6, 2022, in Inter Partes Review of U.S. Pat. No. 9,901,123, entered Mar. 1, 2022.
Petitioner's Request for Rehearing of the Institution Decision in Inter Partes Review of U.S. Pat. No. 9,901,123, entered Jul. 21, 2022.
File History for U.S. Pat. No. 9,930,915.
File History for U.S. Pat. No. 9,901,123.
Patent Owner's Notice of Appeal in IPR2020-01094, Inter Partes Review of U.S. Pat. No. 9,930,915, Apr. 28, 2022.
Petitioner's Notice of Appeal in IPR2020-01602, Inter Partes Review of U.S. Pat. No. 9,901,123, May 27, 2022.
Annex to Notice of Opposition filed in corresponding European Patent Application No. 20156199.0, Patent No. 3669682, dated Mar. 3, 2023, "Feature Analysis of Claim 1".
Notice of Opposition filed in corresponding European Patent Application No. 20156199.0, Patent No. 3669682, dated Mar. 3, 2023.
Notice of Opposition filed in corresponding European Patent Application No. 20156199.0, Patent No. 3669682, dated Mar. 8, 2023. (37 pgs).
"(±)-1,2-propanediol," ChemSpider, [online], 2019, retrieved from the Internet, [retrieved Jan. 16, 2019], <URL: http://www.chemspider.com/Chemical-Structure.13835224.html?id=aelc106a-376d-4104-9a7c-f0910a5b5b20&page_num=0>. (Year: 2019).
"(±)-nicotine," ChemSpider, [online], 2019, retrieved from the Internet, [retrieved Jan. 16, 2019], <URL: http://www.chemspider.com/Chemical-Structure.917.html>. (Year: 2019).
"Coresta Recommended Method No. 76; Determination of Moisture Content (Oven Volatiles) of Tobacco and Tobacco Products" CRM 76, Jul. 2017.
Aug. 13, 2020—717260—Respondents' notice of prior art (Public).
Dec. 18, 2020—728462—Respondents' pre-hearing brief, Part 1 of 2 (Public).
Dec. 18, 2020—728462—Respondents' pre-hearing brief, Part 2 of 2 (Public).
Dec. 18, 2020—728487—Complainants' Pre-Hearing Trial Brief, Part 1 of 8 (Public).
Dec. 18, 2020—728487—Complainants' Pre-Hearing Trial Brief, Part 2 of 8 (Public).
Dec. 18, 2020—728487—Complainants' Pre-Hearing Trial Brief, Part 3 of 8 (Public).
Dec. 18, 2020—728487—Complainants' Pre-Hearing Trial Brief, Part 4 of 8 (Public).

(56) References Cited

OTHER PUBLICATIONS

Dec. 18, 2020—728487—Complainants' Pre-Hearing Trial Brief, Part 5 of 8 (Public).
Dec. 18, 2020—728487—Complainants' Pre-Hearing Trial Brief, Part 6 of 8 (Public).
Dec. 18, 2020—728487—Complainants' Pre-Hearing Trial Brief, Part 7 of 8 (Public).
Dec. 18, 2020—728487—Complainants' Pre-Hearing Trial Brief, Part 8 of 8 (Public).
Jan. 19, 2021—731208—Staff's pre-hearing brief Part 1 of 2 (Public).
Jan. 19, 2021—731208—Staff's pre-hearing brief Part 2 of 2 (Public).
Feb. 22, 2021—734799—Respondents Post-Hearing Initial Brief (Public).
A Presentation of CORESTA, updated Sep. 2019, pp. 1-7.
Amended Complaint for Patent Infringement, *RAI Strategic Holdings, Inc.* v. *Altria Client Services LLC,* No. 1:20-cv-00393-LO-TCB, filed Jul. 13, 2020: Exhibit 2007 *Philip Morris Products, S.A.* v. *RAI Strategic Holdings Inc.* IPR2020-00921.
American Heritage College Dictionary (4th ed. 2010), p. 386.
Andrus et al., "Nicotine Microaerosol Inhaler", Can Respir Journal, vol. 6, No. 6, 1999, pp. 509-512.
Ariat-Technology, Honeywell Sensing and Productivity Solutions, accessed 2021, https://www.ariat-tech.com/parts/honeywell-sensing-and-productivity-solutions/CPCL04GC.
Author Unknown, "Beta Patent Review Meeting," 1995, p. 6, www.industrydocuments.ucsf.edu/docs/#id=tpfn0023.
Author Unknown, "Cigarette Brainstorming Team Number 2," May 1994, www. industrydocuments ucsf.edu/docs/#id=gqcy0119.
Author Unknown, "Heater Development," Mar. 1994 www. industrydocuments.ucsf.edu/docs/#id=hxwy0118.
Author Unknown, "Philip Morris Patent Database Search Invention Disclosures Dating From About 800000 to Present for which Patent Applications Were Not Filed," 1996, p. 65, www.industrydocuments. ucsf edu/docs/#id=kgd10071.
Author Unknown, "Project Beta Core Teams—Ashland," May 1994, www.industrydocuments.ucsf.edu/docs/#id=szjn0076.
Barbara Demick, *A High-Tech Approach to Getting a Nicotine Fix.* L.A. Times (Apr. 25, 2009), https://www.latimes.com/archives/la-xprn-2009-apr-25-fg-china-cigarettes25-story.html.
Barney J. Feder, Reynolds Expands Test of Smokeless Cigarette, N. Y. Times, Apr. 30, 1996, at D10.
Beta Patent review meeting, p. 6, 1995.
Bourlas, M.C., et al., "The Generation of Water in the Tobacco Oven Volatile Test", 1980, *Beitraege zur Tabakforschung International,* vol. 10(3), pp. 149-154.
Brief of Amicus Curiae Fitbit, Inc. in Support of Plaintiffs' Motion for Summary Judgment, *Apple Inc.* v. *Iancu,* No. 20-cv-06128-EJD (N.D. Cal Dec. 23, 2020), ECF No. 81-1.
Cambridge Dictionary of American English (2nd ed. 2008), p. 715.
Chambers Dictionary of Science and Technology (Peter M.B. Walker, ed., 1999), pp. 261, 975.
Chemical and Biological Studies on New Cigarette Prototypes that Heat Instead of Burn Tobacco, R. J. Reynolds Tobacco Company Monograph, 1988, pp. 43-72.
*Chemical and Biological Studies on New Cigarette Prototypes that Heat Instead of Burn Tobacco,* R.J. Reynolds Tobacco Company Monograph (1988) ("RJR monograph") (excerpts).
Civil docket report for *RAI Strategic Holdings, Inc.* v. *Altria Client Services LLC,* No. 1:20-cv-00393-LO-TCB (E.D. Va. filed Apr. 9, 2020).
Civil Minutes, *Ancora Technologies, Inc.* v. *TCT Mobile* (*US*), *Inc., et al.,* No. SACV 19-2192-GW-ADSx (C.D. Cal. Nov. 12, 2020).
Claim Construction Order, *RAI Strategic Holdings, Inc.* v. *Altria Client Services LLC,* No. 1:20-cv-00393-LO-TCB (E.D. Va. Nov. 24, 2020), ECF No. 360.
Kevin Hatch, et al., *Preliminary Evaluation of a Commercially Available Electric Aerosol Inhaler from China* (Sep. 14, 2006) ("RJR Teardown"), available at https://www.industrydocuments.ucsf.edu/docs/nyvy0228.
Laroy, B; Utsch, F. An Outline of Permanent Heater / Disposable Flavor Insert Concepts. Nov. 1991. Philip Morris Records; Master Settlement Agreement. Unknown. https://www.industrydocuments.ucsf.edu/docs/ygcc0114.
Laroy, et al., "An Outline of Permanent Heater/Disposable Flavor Insert Cncepts," Nov. 1991, www.industrydocuments.ucsf.edu/docs/#id=jxbh0090.
Letter accompanying subsequently filed items, Further Written Submissions filed in corresponding European Application No. 19151511.3, U.S. Pat. No. 3,491,944. Dec. 13, 2021.
Letter from David M. Maiorana, counsel for Complainants, to The Honorable Lisa R. Barton, regarding Certain Tobacco Heating Articles and Components Thereof, No. 337-TA-1199 (U.S.I.T.C. Apr. 9, 2020).
Letter from Maximillian Grant, counsel for Defendants, to David Maiorana, counsel for Plaintiffs, regarding *RAI Strategic Holdings, Inc.* v. *Altria Client Services LLC,* No. 1:20-cv-00393-LO-TCB (Sep. 18, 2020).
Letter from Robert B. Swierupski, Director, National Commodity Specialist Division, to Mark Weiss, Weiss & Moy, P.C. regarding tariff classification ruling (Aug. 22, 2006), https://rulings.cbp.gov/ruling/M85579.
Lish, Tom, What is the difference between Vented and Sealed Gauge Reference Pressure, Setra, Jan. 26, 2017, https://www.setra.com/blog/what-is-the-difference-between-vented-and-sealed-gauge-reference-pressure.
Lu, Zhang, "Safe Substitute", China Daily, Jul. 11, 2005.
Mark's Standard Handbook for Mechanical Engineers, Eugene A. Avallone et al., published 1978, p. 15-6.
McGraw-Hill Dictionary of Electrical and Computer Engineering (2003), p. 479.
Notice of Opposition filed in corresponding European Application No. 18173918.6, U.S. Pat. No. 3,398,460 on Apr. 14, 2020.
Notification of Receipt of POP Request in Inter Partes Review of U.S. Pat. No. 9,839,238 (Mar. 24, 2021).
Order Granting Defendants' Unopposed Motion to Invoke the Statutory Stay of Plaintiffs' Claims Relating to U.S. Pat. No. 9,839,238, U.S. Pat. No. 9,901,123, and U.S. Pat. No. 9,930,915 Pursuant to 28 U.S.C. § 1659 in *RAI Strategic Holdings, Inc.* v. *Altria Client Services LLC,* No. 1:20-cv-393 (E.D. Va. Jun. 18, 2020).
Order No. 28: Construing Certain Claims in *Certain Tobacco Heating Articles and Components Thereof,* No. 337-TA-1199 (U.S. I.T.C. Jan. 6, 2021).
Order No. 8 in *Certain Laser-driven Light Sources, Subsystems Containing Laser-driven Light Sources, and Products Containing Same,* No. 337-TA-983 (U.S.I.T.C. Mar. 3, 2016).
Order No. 8, Amending Ground Rules in *Certain Tobacco Heating Articles and Components Thereof,* No. 337-TA-1199 (U.S.I.T.C. Jul. 27, 2020).
Order, *Bushnell Hawthorne, LLC* v. *Cisco Systems, Inc.,* No. 1:18-cv-760 (E.D. Va. Apr. 22, 2019).
Order, *RAI Strategic Holdings, Inc.* v. *Altria Client Services LLC,* No. 1:20-cv-00393-LO-TCB (E.D. Va. Dec. 4, 2020), ECF No. 426.
Order, *RAI Strategic Holdings, Inc.* v. *Altria Client Services LLC,* No. 1:20-cv-00393-LO-TCB (E.D. Va. Dec. 7, 2020), ECF No. 432.
Order, *RAI Strategic Holdings, Inc.* v. *Altria Client Services LLC,* No. 1:20-cv-393 (E.D. Va. Feb. 16, 2021).
Ott, Henry W., Noise Reduction Techniques in Electronic Systems, (2d E. 1988), pp. 286-293.
Oxford Dictionary of English (3d ed. 2010), p. 477.
Patent Owner Preliminary Response in Inter Partes Review of U.S. Pat. No. 9,814,268 dated Aug. 17, 2020.
Patent Owner Preliminary Response in Inter Partes Review of U.S. Pat. No. 9,839,238 (Oct. 27, 2020).
Patent Owner Preliminary Response in Inter Partes Review of U.S. Pat. No. 9,930,915 dated Oct. 27, 2020.

(56) References Cited

OTHER PUBLICATIONS

Patent Owner Response to Petition for Inter Partes Review Pursuant to 37 C.F.R. § 42.220 in Inter Partes Review of U.S. Pat. No. 9,814,268, dated Dec. 6, 2021.
Patent Owner Response to Petition for Inter Partes Review Pursuant to 37 C.F.R. § 42.220 in Inter Partes Review of U.S. Pat. No. 9,930,915, dated Apr. 19, 2021.
Patent Owner Sur-Reply in Inter Partes Review of U.S. Pat. No. 9,814,268, dated Apr. 11, 2022.
Patent Owner Sur-Reply in Inter Partes Review of U.S. Pat. No. 9,930,915, dated Aug. 30, 2021.
Patent Owner's Demonstratives for Oral Argument: RAI's PTAB Presentation, *Philip Morris Products, S.A.* v. *RAI Strategic Holdings, Inc.*, IPR2020-00921, Exhibit 2011, May 11, 2022.
Patent Owner's Infringement Chart for '123 patent, In the Matter of Certain Tobacco Heating Articles and Components Thereof, Inv. No. ___, EDIS Doc. ID 707369 (filed Apr. 9, 2020).
Patent Owner's Mandatory Notices in Inter Partes Review of U.S. Pat. No. 9,839,238, Jul. 2, 2020.
Patent Owner's Rehearing Request in Inter Partes Review of U.S. Pat. No. 9,930,915, dated Feb. 10, 2022.
Patent Owner's Sur-Reply to Petitioner's Reply to Patent Owner's Preliminary Response in Inter Partes Review of U.S. Pat. No. 9,814,268, dated Sep. 29, 2020.
Petitioner's Reply in Inter Partes Review of U.S. Pat. No. 9,930,915, dated Jul. 12, 2021.
Petitioner's Reply to Patent Owner Preliminary Response in Inter Partes Review of U.S. Pat. No. 9,814,268, entered Sep. 18, 2020.
Petitioner's Reply to the Patent Owner Preliminary Response in Inter Partes Review of U.S. Pat. No. 9,839,238 (Nov. 25, 2020).
Petitioner's Reply to the Patent Owner Preliminary Response in Inter Partes Review of U.S. Pat. No. 9,930,915 (Nov. 25, 2020).
Petitioner's Request for Rehearing of Decision Denying Institution in Inter Partes Review of U.S. Pat. No. 9,839,238 (Feb. 18, 2021).
Petitioner's Updated Mandatory Notices in Inter Partes Review of U.S. Pat. No. 9,839,238 (May 11, 2021).
Philip Morris Incorporated Invention Record (dated Oct. 11, 1988).
Philip Morris Incorporated Invention Record (submitted May 19, 1994; witnessed May 23, 1994).
Philip Morris Int'l, 2019 Third-Quarter Results Presentation (Oct. 17, 2019).
Philip Morris Int'l, The IQOS Heating System, Tobacco Products Scientific Advisory Committee Presentation (Jan. 24, 2018).
Philip Morris Products SA's Comments to Complainants' Public Interest Statement in *Certain Tobacco Heating Articles and Components Thereof,* No. 337-TA-3447 (U.S.I.T.C. Apr. 23, 2020).
Philip Morris U.S.A. interoffice correspondence from R.H. Moffitt to K. Torrence regarding operational analysis of SBT Ruyan Atomizing Nicotine Inhaler (Sep. 27, 2004) (Original).
Philip Morris U.S.A. interoffice correspondence from R.H. Moffitt to K. Torrence regarding operational analysis of SBT Ruyan Atomizing Nicotine Inhaler (Sep. 27, 2004), https://www.industrydocuments.ucsf.edu/docs/fnpb0219.
Pilot Corp. Stores Offer Ruyan Smoking Alternatives in Knoxville, Tenn.-Area Convenience Stores; Ruyan Vegas(R) Disposable E-Cigar in Select Stores in December; Jazz Disposable E-Cigarette Will Premier in Next 30 Days, PR Newswire, Dec. 16, 2008.
Plaintiffs' Notice of Motion and Motion for Summary Judgment, *Apple Inc.* v. *Iancu,* No. 5:20-cv-06128-EJD (N.D. Cal. Nov. 23, 2020), ECF No. 65.
Plaintiffs' Opposition to Defendants' Partial Motion to Stay Plaintiffs' Claims Regarding U.S. Pat. No. 9,814,268 and U.S. Pat. No. 10,492,542, *RAI Strategic Holdings, Inc.* v. *Altria Client Services LLC,* No. 1:20-cv-00393-LO-TCB (E.D. Va. Dec. 2, 2020), ECF No. 405.
Press Release, Altria, FDA Authorizes Sale of IQOS Tobacco Heating System in the U.S. (Apr. 30, 2019) ("Altria Announcement").
Public Interest Comments of Congressman George Holding in *Certain Tobacco Heating Articles and Components Thereof,* No. 337-TA-3447 (U.S.I.T.C. Apr. 15, 2020).
Public Interest Comments of Dr. Nikan H. Khatibi, MD in *Certain Tobacco Heating Articles and Components Thereof,* No. 337-TA-3447 (U.S.I.T.C. Apr. 23, 2020).
Public Interest Comments of Nextera Healthcare in *Certain Tobacco Heating Articles and Components Thereof,* No. 337-TA-3447 (U.S. I.T.C. Apr. 23, 2020).
Public Interest Comments of Spark MD in *Certain Tobacco Heating Articles and Components Thereof,* No. 337-TA-3447 (U.S.I.T.C. Apr. 23, 2020).
Public Interest Comments of TechFreedom in *Certain Tobacco Heating Articles and Components Thereof,* No. 337-TA-3447 (U.S. I.T.C. Apr. 23, 2020).
Public Interest Comments of the Consumer Advocates for Smoke-free Alternatives Association in *Certain Tobacco Heating Articles and Components Thereof,* No. 337-TA-3447 (U.S.I.T.C. Apr. 23, 2020).
Public Interest Comments of the Progressive Policy Institute in *Certain Tobacco Heating Articles and Components Thereof,* No. 337-TA-3447 (U.S.I.T.C. Apr. 23, 2020).
Public Interest Comments of the Reason Foundation in *Certain Tobacco Heating Articles and Components Thereof,* No. 337-TA-3447 (U.S.I.T.C. Apr. 23, 2020).
Public Interest Comments of the Schizophrenia and Related Disorder Alliance of America in *Certain Tobacco Heating Articles and Components Thereof,* No. 337-TA-3447 (U.S.I.T.C. Apr. 23, 2020).
Public Interest Comments of the Smoke-Free Alternatives Trade Association in *Certain Tobacco Heating Articles and Components Thereof,* No. 337-TA-3447 (U.S.I.T.C. Apr. 23, 2020).
Public Version of Commission Investigative Staff's Pre-Hearing Brief filed in United States International Trade Commission Investigation 337-TA-1199 in the matter of Certain Tobacco Heating Articles and Components Thereof on Jan. 4, 2021.
Public Version of Commission Investigative Staff's Responsive Post-Hearing Brief in International Trade Commission Investigation No. 337-TA-1199 in the matter of *Certain Tobacco Heating Articles and Components Thereof* on Mar. 5, 2021.
Public Version of Commission Opinion in International Trade Commission Investigation No. 337-TA-1199 in the matter of *Certain Tobacco Heating Articles and Components Thereof* on Oct. 19, 2021.
Public Version of Complainant's Opening Post-Hearing Brief in International Trade Commission Investigation No. 337-TA-1199 in the matter of *Certain Tobacco Heating Articles and Components Thereof* on Mar. 31, 2021.
Public Version of Complainant's Responsive Post-Hearing Brief in International Trade Commission Investigation No. 337-TA-1199 in the matter of *Certain Tobacco Heating Articles and Components Thereof* on Mar. 31, 2021.
Public Version of Complainants' Pre-Hearing Brief filed in United States International Trade Commission Investigation 337-TA-1199 in the matter of Certain Tobacco Heating Articles and Components Thereof on Dec. 11, 2020. (Parts 1 & 2).
Public Version of Initial Determination on Violation of Section 337 and Recommended Determination on Remedy and Bond in International Trade Commission Investigation No. 337-TA-1199 in the matter of *Certain Tobacco Heating Articles and Components Thereof* on May 14, 2021.
Public Version of Representative Claim Chart of Domestic Industry of Claims 1-4 in U.S. Pat. No. 9,930,915 by the VUSE Solo Device from ITC Inv. No. 337-TA-1199 Nov. 25, 2020.
Public Version of Respondent's Joint Disclosure of Final Contentions in Response to Individual Interrogatory No. 12, in *Certain Tobacco Heating Articles and Components Thereof,* No. 337-TA-1199 (Sep. 18, 2020).
Public Version of Respondents' Notice of Prior Art filed in United States International Trade Commission Investigation 337-TA-1199 in the matter of Certain Tobacco Heating Articles and Components Thereof on Aug. 13, 2020.
Public Version of Respondents' Petition and Contingent Petition for Review of the Final Initial Determination in United States Interna-

(56) References Cited

OTHER PUBLICATIONS tional Trade Commission Investigation 337-TA-1199 in the matter of Certain Tobacco Heating Articles and Components Thereof on May 28, 2021.
Public Version of Respondents' Post-Hearing Initial Brief filed in United States International Trade Commission Investigation 337-TA-1199 in the matter of Certain Tobacco Heating Articles and Components Thereof on Feb. 12, 2021.
Public Version of Respondents' Post-Hearing Responsive Brief filed in United States International Trade Commission Investigation 337-TA-1199 in the matter of Certain Tobacco Heating Articles and Components Thereof on Mar. 31, 2021.
Public Version of Respondents' Prehearing Brief filed in United States International Trade Commission Investigation 337-TA-1199 in the matter of Certain Tobacco Heating Articles and Components Thereof on Dec. 11, 2020.
R.J. Reynolds Tobacco Co., *Chemical and Biological Studies on New Cigarette Prototypes that Heat Instead of Burn Tobacco,* Reynolds Tobacco Company Monograh, 1988, pp. 60-62, pp. 119-124.
R.R. Baker, *Temperature Distribution Inside a Burning Cigarette,* Nature, vol. 247, pp. 405-406, (1974).
Rebuttal Expert Report of Charles Clemens in *Certain Tobacco Heating Articles and Components Thereof,* No. 337-TA-1199 (U.S. I.T.C. Oct. 23, 2020).
Record of Oral Hearing held Oct. 27, 2021, in IPR2020-01094, Inter Partes Review of U.S. Pat. No. 9,930,915, Nov. 24, 2021.
Remote Deposition of Seetharama C. Deevi, Ph.D. in Inter Partes Review of U.S. Pat. No. 9,930,915, dated Aug. 20, 2021.
Remote Deposition of Seetharama C. Deevi, Ph.D. in Inter Partes Review of U.S. Pat. No. 9,930,915, dated Mar. 26, 2021.
Reply Support of Defendants' Partial Motion to Stay Plaintiffs' Claims Regarding U.S. Pat. No. 9,814,268 and U.S. Pat. No. 10,492,542, *RAI Strategic Holdings, Inc.* v. *Altria Client Services LLC,* No. 1:20-cv-00393- LO-TCB (E.D. Va. Dec. 3, 2020), ECF No. 422.
Respondents' Opening Claim Construction Brief in *Certain Tobacco Heating Articles and Components Thereof,* No. 337-TA-1199 (U.S. I.T.C. Aug. 21, 2020).
Respondents' Responsive Claim Construction Brief in *Certain Tobacco Heating Articles and Components Thereof,* No. 337-TA-1199 (U.S.I.T.C. Sep. 4, 2020).
Richard R. Baker, *Smoke Generation Inside a Burning Cigarette: Modifying Combustion to Develop Cigarettes That May be Less Hazardous to Health,* Progress in Energy and Combustion Science, vol. 32, pp. 373-385, (2006).
Robert W. Messler, Jr., Joining of Materials and Structures, Elsevier Butterworth-Heinemann 2004—Excerpt, 4 pgs.
Rohsenow, "Heat, Mass, And Momentum Transfer", copyright 1961 Prentice-Hall, 3 pgs.
Rule 16(b) Scheduling Order, *RAI Strategic Holdings, Inc.* v. *Altria Client Services LLC,* No. 1:20-cv-00393-LO-TCB (E.D. Va. Sep. 8, 2020), ECF No. 99.
Samejima, T., et al., "Moisture Sorption Isotherms of Various Tobaccos", 1978, *Agric. Biol. Chem.,* vol. 42(12), pp. 2285-2290.
Wiley Electrical and Electronics Engineering Dictionary (2004), p. 181.
Written Opinion of the International Searching Authority in International Application No. PCT/US2007/081461, mailed Apr. 18, 2009.
Yunus A. Cengel & Michael A. Boles, Thermodynamics: an Engineering Approach (5th ed. 2006) (excerpts) ("Thermodynamics"), 9 pgs.
Patent Owner Preliminary Response in post-grant review of U.S. Pat. No. 10,492,542 dated Oct. 16, 2020.
Petitioner's Reply to the Patent Owner Preliminary Response in post-grant review of U.S. Pat. No. 10,492,542 entered Nov. 10, 2020.
Patent Owner's Sur-Reply to Petitioner's Reply to Patent Owner's Preliminary Response in post-grant review of U.S. Pat. No. 10,492,542 dated Nov. 20, 2020.
Decision Granting Institution of Post-Grant Review in post-grant review of U.S. Pat. No. 10,492,542 entered Jan. 13, 2021.
Declaration of Charles E. Clemens in post-grant review of U.S. Pat. No. 10,492,542 dated Apr. 6, 2021.
Deposition of Dr. Seetharama C. Deevi taken by videoconference on Mar. 22, 2021 in post-grant review of U.S. Pat. No. 10,492,542.
Patent Owner Response to Petition for Post-Grant Review Pursuant to 37 C.F.R. § 42.220 in post-grant review of U.S. Pat. No. 10,492,542 dated Apr. 7, 2021.
Petitioner's Reply in post-grant review of U.S. Pat. No. 10,492,542 entered Jun. 30, 2021.
Videotaped Deposition of Dr. Seetharama C. Deevi, Ph.D. taken remotely via ZOOM on Jul. 30, 2021 in post-grant review of U.S. Pat. No. 10,492,542.
Notification of Receipt of POP Request in IPR2020-00919, Inter Partes Review of U.S. Pat. No. 9,901,123, Jul. 21, 2022.
POP Request in IPR2020-00919, Inter Partes Review of U.S. Pat. No. 9,901,123, Jul. 21, 2022.
POP Request Dismissed in IPR2020-00919, Inter Partes Review of U.S. Pat. No. 9,901,123, Jul. 26, 2022.
Panel Change Order Conduct of the Proceeding in IPR2020-00919, Inter Partes Review of U.S. Pat. No. 9,901,123, Sep. 13, 2022.
Decision Denying Petitioner's Request on Rehearing of Decision Denying Institution in IPR2020-00919, Inter Partes Review of U.S. Pat. No. 9,901,123, Oct. 13, 2022.
"How the eCigarette Works," Screenshots YouTube Video by esmokeinpeace, https://www.youtube.com/watch?v=eqz6TvAKcBQ, Mar. 1, 2009 "E10".
"How the eCigarette Works," Wayback Machine Screenshots YouTube Video by esmokeinpeace, https://web.archive.org/web/20140227122005/https:/www.youtube.com/watch?v=eqz6TvAKcBQ, Mar. 1, 2009 "E10"".
"How To Use An Electronic Cigarette," Screenshots YouTube Video by Vapin Lizards, https://www.youtube.com/watch?v=xPJxBRxLIfs, Nov. 15, 2013 "E15".
Annex to Notice of Opposition filed in corresponding European Patent Application No. 20156199.0, U.S. Pat. No. 3,669,682, dated Mar. 3, 2023, "Feature Analysis of Claim 1".
Notice of Opposition filed in corresponding European Patent Application No. 20156199.0, U.S. Pat. No. 3,669,682, dated Mar. 3, 2023.
Notice of Opposition filed in corresponding European Patent Application No. 20156199.0, U.S. Pat. No. 3,669,682, dated Mar. 8, 2023. (37 pgs).
Vape Ranks, "E-Cigarette Inventor Complains about Lack of Financial Rewards," Posted Oct. 14, 2013, Retrieved Feb. 20, 2023, "Hon Lik Article".
Notice of Opposition filed in corresponding European Patent Application No. 20156199.0, U.S. Pat. No. 3,669,682, dated Mar. 8, 2023. (47 pgs).
Letter Accompanying Notice of Opposition filed in corresponding European Patent Application No. 20156199.0, U.S. Pat. No. 3,669,682, dated Feb. 20, 2023.
Decision Denying Institution of Inter Partes Review in IPR2024-01280, *ECTO World, LLC and SV3, LLC,* v. *RAI Strategic Holdings, Inc.,* entered Mar. 6, 2025.
Decision Denying Institution of Inter Partes Review in PGR2024-00049, *ECTO World, LLC and SV3, LLC,* v. *RAI Strategic Holdings, Inc.,* entered Mar. 10, 2025.
Ex. 2010 from Patent Owner Preliminary Response in IPR2024-01406, Patari & Mahapatra, Liquid Wicking in a Paper Strip: An Experimental and Numerical Study, ACS Omega 5, 22931-22939 (2020).
Ex. 2010 from Patent Owner Preliminary Response, Respondents' Opening Claim Construction Brief from ITC Investigation No. 337-TA-1410.
Patent Owner Preliminary Response in IPR2024-01280, *ECTO World, LLC and SV3, LLC,* v. *RAI Strategic Holdings, Inc.,* dated Dec. 11, 2024.

(56) References Cited

OTHER PUBLICATIONS

Patent Owner Preliminary Response in IPR2024-01406, *Shenzhen Kangvape Technology Co., Ltd.,* v. *RAI Strategic Holdings, Inc.,* dated Dec. 30, 2024.
Patent Owner Preliminary Response in PGR2024-00049, *ECTO World, LLC and SV3, LLC,* v. *RAI Strategic Holdings, Inc.,* dated Dec. 11, 2024.
Petition for Inter Partes Review of U.S. Pat. No. 11,925,202 Pursuant to 35 U.S.C. §§ 311-319, 37 C.F.R. § 42, dated Sep. 6, 2024.
Public Version Order No. 28: Initial Determination Denying Motion for Temporary Relief in *Certain Disposable Vaporizer Devices,* Inv. No. 337-TA-1410 (USITC Nov. 19, 2024).
Respondents' Joint Disclosure of Contentions for Which they Bear the Burden in Response to Individual Interrogatories, Inv. No. 337-TA-1410, Oct. 2024.
Respondents' Notice of Prior Art in *Certain Disposable Vaporizer Devices,* Inv. No. 337-TA-1410, Dec. 16, 2024.
Definition of Wall, The Britannica Dictionary, 2024, [online] retrieved from the internet, [retrieved Jan. 4, 2025], <URL:https://www.britannica.com/dictionary/wall> (Year: 2025).
Declaration of Seetharama C. Deevi, Ph.D. in Support of Petition for Post-Grant Review of U.S. Pat. No. 11,925,202, dated Aug. 13, 2024 (PGR2024-00049 Exhibit No. 1003).
Declaration of Seetharama C. Deevi, Ph.D. in Support of Petition for Inter Partes Review of U.S. Pat. No. 11,925,202, dated Aug. 13, 2024 (IPR2024-01280 Exhibit No. 1003).
Final Written Decision in IPR2020-00921, Paper 32 (PTAB Jun. 30, 2022).
Kevin Hatch, et al., Preliminary Evaluation of a Commercially Available Electric Aerosol Inhaler from China (Sep. 14, 2006) ("Sep. 2006 Ruyan Product Evaluation"), available at https://www.industrydocuments.ucsf.edu/tobacco/docs/#id=jqyy0228.
P.M. Ling and S.A. Glantz, "Tobacco industry consumer research on socially acceptable cigarettes," Tobacco Control 14, e3 (2005) (http://www.tobaccocontrol.com/cgi/content/full/14/5/e3) ("Ling").
Patent Owner Response in IPR2020-01602, Paper 16 (PTAB Jul. 2, 2021).
Petition for Inter Partes Review of U.S. Pat. No. 11,925,202, Case IPR2024-01280, submitted Aug. 13, 2024.
Petition for Inter Partes Review of U.S. Pat. No. 11,925,202 Pursuant to 35 U.S.C. §§ 311-319, 37 C.F.R. § 42, submitted Sep. 6, 2024.
Petition for Post-Grant Review of U.S. Pat. No. 11,925,202, Case PGR2024-00049, Dated Aug. 13, 2024.
Petition in IPR2018-00627, Paper 2 (PTAB Mar. 1, 2018).
Petitioner ECTO World LLC's Power of Attorney in *ECTO World, LLC and SV3, LLC,* v. *RAI Strategic Holdings, Inc.,* IPR2024-01280, 3 pages, Aug. 13, 2024.
Petitioner SV3 LLC's Power of Attorney in *ECTO World, LLC and SV3, LLC,* v. *RAI Strategic Holdings, Inc.,* IPR2024-01280, 3 pages, Aug. 13, 2024.
Petitioner's Power of Attorney in Post Grant Proceedings Before the Patent Trial and Appeal Board in IPR2024-01406, 1 page, 2024.
Petitioner ECTO World LLC's Power of Attorney in *ECTO World, LLC and SV3, LLC,* v. *RAI Strategic Holdings, Inc.,* PGR2024-00049, 3 pages, Aug. 13, 2024.
Petitioner SV3 LLC's Power of Attorney in *ECTO World, LLC and SV3, LLC,* v. *RAI Strategic Holdings, Inc.,* PGR2024-00049, 3 pages, Aug. 13, 2024.
Respondents' Notice of Prior Art for Temporary Exclusion Order Proceedings, Inv. No. 337-TA-1410, Aug. 2024.
Complaint and Public Interest Statement in Certain Tobacco Heating Articles and Components Thereof, ITC Inv. No. 337-TA-1199, Apr. 9, 2020.
Curriculum Vitae of Dr. Deevi, Nov. 25, 2020.
Curriculum Vitae of Dr. Seetharama C. Deevi, from Inter Partes Review dated May 8, 2020.
Curriculum Vitae of Samir Nayfeh, Ph.D., Jun. 12. 2020.
Curriculum Vitae of Stewart Fox, Feb. 9, 2021.
Declaration of Dr. Deevi in Support of Petition for Inter Partes Review of '915 Patent ("Deevi Decl."), Nov. 25, 2020.
Declaration of Dr. Seetharama C. Deevi in Support of Petition for Inter Partes Review of '268 Patent, from Petition for Inter Partes Review dated May 8, 2020.
Declaration of Dr. Seetharama C. Deevi in Support of Petition for Inter Partes Review of '123 Patent, from Inter Partes Review dated May 8, 2020.
Declaration of Dr. Seetharama C. Deevi in Support of Petitions for PTAB Review of '542 Patent ("Deevi Decl."), dated Jun. 26, 2020.
Declaration of Samir Nayfeh, Ph.D. in Support of Petition for Inter Partes Review of '238 Patent ("Nayfeh Decl."), from Petition for Inter Partes Review dated Jun. 12, 2020.
Email exchange among Carolyn Carpenter, John Robinson et al. regarding electric cigarette, available at https://www.industrydocuments.ucsf.edu/docs/nsxy0228 dated Aug. 9, 2006.
File history for U.S. Pat. No. 9,814,268, from Petition for Inter Partes Review dated May 8, 2020.
File History regarding U.S. Pat. No. 10,588,355 ("'355 FH"), Jun. 26, 2020.
File History regarding U.S. Pat. No. 9,839,238, from Petitioner's Reply to Patent Owner Preliminary Response Nov. 25, 2020.
Honeywell datasheet for Pressure Sensors, 160PC Series ("Honeywell datasheet") Nov. 25, 2020.
Honeywell Microbridge Mass Airflow Sensor/Unamplified, AWM2000 Series, Nov. 25. 2020.
J.P. Hammond et al., Brazing Ceramic Oxides to Metals at Low Temperatures, Welding Research Supplement, 227-232-s (Oct. 1998) ("Hammond Brazing").
Mosdesign Semiconductor Corp. Datasheet for M1600 Led Drivers ("Mosdesign M1600 Datasheet"), 1 pg., dated Apr. 4, 2001.
Petition for Inter Partes Review of U.S. Pat. No. 10,492,542, dated Jun. 26, 2020.
Petition for Inter Partes Review of U.S. Pat. No. 9,839,238, dated Jun. 12, 2020.
Petition for Inter Partes Review of U.S. Pat. No. 9,930,915, dated Jun. 12, 2020.
Petition for Post-Grant Review of U.S. Pat. No. 10,492,542, dated Jun. 26, 2020.
Thermal Ink-Jet Print Cartridge Designer's Guide (2nd Edition Hewlett Packard) ("Jet Print Cartridge Designers Guide"), 12 pgs. Jan. 1988.
U.S. Appl. No. 60/722,036, filed May 8, 2020.
File History regarding U.S. Pat. No. 10,492,542 ("'542 FH"), Jun. 26, 2020.
File History for U.S. Pat. No. 9,930,915, Nov. 25, 2020.
File History for U.S. Pat. No. 9,901,123, from Inter Partes Review dated May 8, 2020.
'202 Patent Prosecution History, Aug. 13, 2024.
Curriculum Vitae of Dr. Seetharama Deevi, Jun. 26, 2020.
Declaration of Charles Clemens, *Philip Morris Products SA* v. *RAI Strategic Holdings, Inc.,* IPR2020-01602, EX2010, Dated Jul. 1, 2021.
Declaration of Dr. Robert Sturges, *RJ Reynolds Vapor Company et al.*v. *Fontem Holdings 1 BV et al.,* IPR2018-00627, EX1002, Feb. 27, 2018.
Declaration of Dr. Robert Sturges, *RJ Reynolds Vapor Company et al.* v. *Fontem Holdings 1 BV et al.,* IPR2018-00627, EX1002, Aug. 13, 2024.
Declaration of Dr. Robert Sturges, *RJ Reynolds Vapor Company* v. *Fontem Holdings 1 BV,* IPR2016-01270, EX1009, Aug. 13, 2024.
Declaration of Dr. Samir Nayfeh, Jun. 12, 2020.
Initial Determination on Violation of Section 337 And Recommended Determination on Remedy and Bond, *Certain Tobacco Heating Articles and Components Thereof,* Inv. No. 337-TA-1199 [Public Version], dated May 14, 2021.
Institution Decision, *Philip Morris Products SA* v. *RAI Strategic Holdings, Inc.,* IPR2020-01602, Paper 9, Dated Apr. 2, 2021.
Petition for Inter Partes Review, *RJ Reynolds Vapor Company et al.* v. *Fontem Holdings 1 BV et al.,* IPR2018-00627, Paper 2, Aug. 13, 2024.
Petition for Inter Partes Review, *RJ Reynolds Vapor Company* v. *Fontem Holdings 1 BV,* IPR2016-01527, Paper 1, Aug. 13, 2024.

(56) References Cited

OTHER PUBLICATIONS

Reynolds' Motion for Temporary Relief [Public Version], Certain Disposable Vaporizer Devices; Inv. No. 337-TA-1410, Aug. 13, 2024.
Ex. 2001 from Patent Owner Preliminary Response, Complaint from ITC Investigation No. 337-TA-1410, Dec. 11, 2024.
Ex. 2002 from Patent Owner Preliminary Response, Notice of Institution of ITC Investigation No. 337-TA-1410, Dec. 11, 2024.
Ex. 2003 from Patent Owner Preliminary Response, Initial Determination Denying TEO, ITC Investigation No. 337-TA-1410, Dec. 11, 2024.
Ex. 2007 from Patent Owner Preliminary Response, File History of U.S. Pat. No. 9,801,416, Dec. 11, 2024.
Ex. 2008 from Patent Owner Preliminary Response, File History of U.S. Pat. No. 10,231,488, Dec. 11, 2024.
Ex. 2009 from Patent Owner Preliminary Response, Complainants' Responsive Claim Construction Brief from ITC Investigation No. 337-TA-1410, Dec. 11, 2024.
Ex. 2011 from Patent Owner Preliminary Response, Reinskje Talhout et al., Cigarette Design Features: Effects on Emission Levels, User Perception, and Behavior, Tob Regul Sci. Author manuscript; available in PMC, Jan. 1, 2019 (dated Dec. 11, 2024).
Invalidity Claim Chart—Chinese Utility Model No. 2719043 ("Hon '043")—Appendix C, Oct. 11, 2024.
Invalidity Claim Chart—Derivation from Ruyan E-Cigar ("Ruyan E-Cigar")—Appendix D, Oct. 11, 2024.
Invalidity Claim Chart—International Patent Appl. Pub. No. 2000/028843 ("Pienemann")—Appendix B, Oct. 11, 2024.
Invalidity Claim Chart—Ruyan E-Cigar ("Ruyan E-Cigar") and U.S. Pat. No. 4,947,874 ("Brooks")—Appendix G, Oct. 11, 2024.
Invalidity Claim Chart—U.S. Patent Appl. Pub. No. 2005/0205084 ("Gupta")—Appendix J, Oct. 11, 2024.
Invalidity Claim Chart—U.S. Patent Appl. Pub. No. 2006/0016453 ("Kim")—Appendix A, Oct. 11, 2024.
Invalidity Claim Chart—U.S. Pat. No. 5,249,586 ("Morgan")—Appendix K. Oct. 11. 2024.
Invalidity Claim Chart—U.S. Pat. No. 6,155,268 ("Takeuchi")—Appendix H, Oct. 11, 2024.
Invalidity Claim Chart—WIPO PCT Appl. No. WO 2006/082571A1 ("Oglesby")—Appendix I, Oct. 11. 2024.
Invalidity Claim Chart—WIPO PCT Appl. No. WO2007/131450 ("Hon 2007")—Appendix E, Oct. 11, 2024.
Invalidity Claim Chart—WIPO PCT Appl. No. WO2008/108889 ("Robinson 2008")—Appendix F, Oct. 11, 2024.
Brief Communication with Letter from Opponent regarding Oral Proceedings on Oct. 15, 2024, in corresponding European Patent Application No. 20156199.0, Patent No. 3669682, dated Aug. 21, 2024.
Brief Communication regarding Interlocutory decision in Opposition proceedings with EPO form 2327, in corresponding European Patent Application No. 20156199.0, Patent No. 3669682, dated Jan. 3, 2025.
Grounds of Appeal filed on May 5, 2025, in Opposition Proceedings for corresponding European Patent Application No. 20156199.0, Patent No. 3669682.
Order No. 34: Construing Certain Terms Of The Asserted Claims Of The Patent At Issue from ITC Investigation No. 337-TA-1410, mailed Mar. 14, 2025.
Rebuttal Expert Report Of Ramon Alarcon Regarding Validity Of U.S. Pat. No. 11,925,202 from ITC Investigation No. 337-TA-1410, Dated Jan. 10, 2025. (Parts 1 & 2).
Report Of Doug Dean, PH.D. from ITC Investigation No. 337-TA-1410, dated Dec. 16, 2024. (Parts 1, 2, & 3).
Decision Granting Institution of Inter Partes Review in IPR2024-01406, Patent 11,925,202 B2, Entered Mar. 20, 2025.
Order Granting Director Review, Vacating the Decision Granting Institution, and Remanding to the Patent Trial and Appeal Board for Further Proceedings in IPR2024-01406, Patent 11,925,202 B2, Dated May 19, 2025.
Decision Denying Institution of Inter Partes Review on Remand in IPR2024-01406, Patent 11,925,202 B2, Dated Jun. 25, 2025.
Order Granting Director Review, Vacating the Decision Denying Institution, and Remanding to the Board for Further Proceedings in IPR2024-01280, Patent 11,925,202 B2, Dated May 19, 2025.
Decision Denying Institution of Inter Partes Review on Remand in IPR2024-01280, Dated Jun. 25, 2025.
Public Version—Final Initial Determination On Violation Of Section 337 from ITC Investigation No. 337-TA-1410, dated Aug. 29, 2025 (Parts 1 & 2).
Commission Opinion from ITC Investigation No. 337-TA-1410, dated Mar. 10, 2026.

TOBACCO-CONTAINING SMOKING ARTICLE

CROSS-REFERENCE TO RELATED APPLICATIONS

This application is a continuation of U.S. application Ser. No. 18/469,365; filed Sep. 18, 2023, which is a division of U.S. application Ser. No. 16/271,443; filed Feb. 8, 2019, issued on Oct. 17, 2023, as U.S. Pat. No. 11,785,978, which is a continuation of U.S. application Ser. No. 15/879,268; filed Jan. 24, 2018, issued on Mar. 19, 2019, as U.S. Pat. No. 10,231,488, which is a continuation of U.S. application Ser. No. 15/286,087; filed Oct. 5, 2016, issued on Feb. 27, 2018, as U.S. Pat. No. 9,901,123, which is a continuation of U.S. App. No. 14,527,287; filed Oct. 29, 2014, issued on Oct. 31, 2017, as U.S. Pat. No. 9,801,416, which is a continuation of U.S. application Ser. No. 13/297,983, filed Nov. 16, 2011, issued on Dec. 2, 2014, as U.S. Pat. No. 8,899,238, which is a continuation of U.S. application Ser. No. 12/763,890, filed Apr. 20, 2010 and issued on Dec. 20, 2011 as U.S. Pat. No. 8,079,371, which is a continuation of U.S. application Ser. No. 11/550,634, filed on Oct. 18, 2006 and issued on Jun. 1, 2010 as U.S. Pat. No. 7,726,320, which are each incorporated by reference herein in their entirety.

FIELD OF THE INVENTION

The present invention relates to tobacco products, such as tobacco-containing smoking articles.

BACKGROUND OF THE INVENTION

Popular smoking articles, such as cigarettes, have a substantially cylindrical rod shaped structure and include a charge, roll, or column of smokable material, such as shredded tobacco (e.g., in cut filler form), surrounded by a paper wrapper, thereby forming a so-called "smokable rod" or "tobacco rod." Normally, a cigarette has a cylindrical filter element aligned in an end-to-end relationship with the tobacco rod. Preferably, a filter element comprises plasticized cellulose acetate tow circumscribed by a paper material known as "plug wrap." Certain filter elements can incorporate polyhydric alcohols. See, for example, UK Pat. Spec. 755,475. Certain cigarettes incorporate a filter element having multiple segments, and one of those segments can comprise activated charcoal particles. See, for example, U.S. Pat. No. 5,360,023 to Blakley et al. and U.S. Pat. No. 6,537,186 to Veluz. Preferably, the filter element is attached to one end of the tobacco rod using a circumscribing wrapping material known as "tipping paper." It also has become desirable to perforate the tipping material and plug wrap, in order to provide dilution of drawn mainstream smoke with ambient air. Descriptions of cigarettes and the various components thereof are set forth in *Tobacco Production, Chemistry and Technology*, Davis et al. (Eds.) (1999). Traditionally, a cigarette of the most popular type is employed by a smoker by lighting one end thereof and burning the tobacco rod. The smoker then receives mainstream smoke produced by the burning tobacco into his/her mouth by drawing on the opposite end (e.g., the filter end) of the cigarette.

Through the years, various methods for altering the composition of mainstream tobacco smoke have been proposed. In PCT Appl. Pub. No. WO 02/37990 to Bereman, it has been suggested that metallic particles and/or carbonaceous particles can be incorporated into the smokable material of a cigarette in an attempt to reduce the amounts of certain compounds in the smoke produced by that cigarette. In US Patent Appl. Pub. No. 2005/0066986 to Nestor et al., it has been suggested that a smokable rod possessing tobacco wrapped in paper can incorporate tobacco filler combined with an aerosol-forming material, such as glycerin. U.S. Pat. No. 6,874,508 to Shafer et al. proposes a cigarette having a paper wrapped tobacco rod having a tip portion that is treated with an additive, such as potassium bicarbonate, sodium chloride or potassium phosphate.

Various tobacco substitute materials have been proposed, and substantial listings of various types of those materials can be found in U.S. Pat. No. 4,079,742 to Rainer et al. and U.S. Pat. No. 4,771,795 to White et al. Certain cigarette-type products that employ non-tobacco materials (e.g., dried vegetable leaves, such as lettuce leaves) as filler that is burned to produce smoke that resembles tobacco smoke have been marketed under the trade names "Cubebs," "Triumph," "Jazz," and "Bravo." See, for example, the types of materials described in U.S. Pat. No. 4,700,727 to Torigian. Furthermore, tobacco substitute materials having the trade names "Cytrel" and "NSM" were introduced in Europe during the 1970s. Representative types of proposed synthetic tobacco substitute materials, smokable materials incorporating tobacco and other components, and cigarettes incorporating those materials, are described in British Pat. No. 1,431,045; and U.S. Pat. No. 3,738,374 to Bennett; U.S. Pat. No. 3,844,294 to Webster; U.S. Pat. No. 3,878,850 to Gibson et al.; U.S. Pat. No. 3,931,824 to Miano et al.; U.S. Pat. No. 3,943,941 to Boyd et al.; U.S. Pat. No. 4,044,777 to Boyd et al.; U.S. Pat. No. 4,233,993 to Miano et al.; U.S. Pat. No. 4,286,604 to Ehretsmann et al.; U.S. Pat. No. 4,326,544 to Hardwick et al.; U.S. Pat. No. 4,920,990 to Lawrence et al.; U.S. Pat. No. 5,046,514 to Bolt; U.S. Pat. No. 5,074,321 to Gentry et al.; U.S. Pat. No. 5,092,353 to Montoya et al.; U.S. Pat. No. 5,778,899 to Saito et al.; U.S. Pat. No. 6,397,852 to McAdam; and U.S. Pat. No. 6,408,856 to McAdam. Furthermore, various types of highly processed smokable materials incorporating tobacco and other ingredients are set forth in U.S. Pat. No. 4,823,817 to Luke; U.S. Pat. No. 4,874,000 to Tamol et al.; U.S. Pat. No. 4,977,908 to Luke; U.S. Pat. No. 5,072,744 to Luke et al.; U.S. Pat. No. 5,829,453 to White et al.; and U.S. Pat. No. 6,182,670 to White et al.

Certain types of coaxial or concentric-type smoking articles have been proposed. There have been proposed cigarette-type smoking articles including tobacco smokable materials surrounding longitudinally extending cores of other materials. UK Pat. Appl. 2,070,409 proposes a smoking article having a rod of smoking material having at least one filament extending over at least a major portion of the length of the rod. U.S. Pat. No. 3,614,956 to Thornton proposes a smoking article having an annular outer portion made of tobacco smoking material and a central cylindrical core of absorbent material. U.S. Pat. No. 4,219,031 to Rainer et al. proposes a smoking article having a central core of carbonized fibers circumscribed by tobacco. U.S. Pat. No. 6,823,873 to Nichols et al. proposes a cigarette including an ignition element surrounded by tobacco, which is in turn surrounded by a composite outer wrapper. One type of cigarette-type smoking article has included a rod of tobacco smokable material surrounded a longitudinally extending annulus of some other material. For example, U.S. Pat. No. 5,105,838 to White et al. proposes a rod of smokable material, normally circumscribed by a layer of wrapping material, which is in turn circumscribed by an insulating material (e.g., glass filaments or fibers). PCT Appl. Pub. No.

WO 98/16125 to Snaidr et al. proposes a smoking device constructed from a very thin cigarette designed to fit into a tubular ceramic cartridge.

Numerous references have proposed various smoking articles of a type that generate flavored vapor, visible aerosol, or a mixture of flavored vapor and visible aerosol. Some of those proposed types of smoking articles include tubular sections or longitudinally extending air passageways. See, for example, those types of smoking articles described in U.S. Pat. No. 3,258,015 to Ellis et al.; U.S. Pat. No. 3,356,094 to Ellis et al.; U.S. Pat. No. 3,516,417 to Moses; U.S. Pat. No. 4,347,855 to Lanzellotti et al.; U.S. Pat. No. 4,340,072 to Bolt et al.; U.S. Pat. No. 4,391,285 to Burnett et al.; U.S. Pat. No. 4,917,121 to Richl et al.; U.S. Pat. No. 4,924,886 to Litzinger; and U.S. Pat. No. 5,060,676 to Hearn et al. Many of those types of smoking articles have employed a combustible fuel source that is burned to provide an aerosol and/or to heat an aerosol-forming material. Sec, for example, the background art cited in U.S. Pat. No. 4,714,082 to Banerjee et al. and U.S. Pat. No. 4,771,795 to White et al.; which are incorporated herein by reference. See, also, for example, those types of smoking articles described in U.S. Pat. No. 4,756,318 to Clearman et al.; U.S. Pat. No. 4,714,082 to Banerjee et al.; U.S. Pat. No. 4,771,795 to White et al.; U.S. Pat. No. 4,793,365 to Sensabaugh et al.; U.S. Pat. No. 4,917,128 to Clearman et al.; U.S. Pat. No. 4,961,438 to Korte; U.S. Pat. No. 4,966,171 to Serrano et al.; U.S. Pat. No. 4,969,476 to Bale et al.; U.S. Pat. No. 4,991,606 to Serrano et al.; U.S. Pat. No. 5,020,548 to Farrier et al.; U.S. Pat. No. 5,033,483 to Clearman et al.; U.S. Pat. No. 5,040,551 to Schlatter et al.; U.S. Pat. No. 5,050,621 to Creighton et al.; U.S. Pat. No. 5,065,776 to Lawson; U.S. Pat. No. 5,076,296 to Nystrom et al.; U.S. Pat. No. 5,076,297 to Farrier et al.; U.S. Pat. No. 5,099,861 to Clearman et al.; U.S. Pat. No. 5,105,835 to Drewett et al.; U.S. Pat. No. 5,105,837 to Barnes et al.; U.S. Pat. No. 5,115,820 to Hauser et al.; U.S. Pat. No. 5,148,821 to Best et al.; U.S. Pat. No. 5,159,940 to Hayward et al.; U.S. Pat. No. 5,178,167 to Riggs et al.; U.S. Pat. No. 5,183,062 to Clearman et al.; U.S. Pat. No. 5,211,684 to Shannon et al.; U.S. Pat. No. 5,240,014 to Deevi et al.; U.S. Pat. No. 5,240,016 to Nichols et al.; U.S. Pat. No. 5,345,955 to Clearman et al.; U.S. Pat. No. 5,551,451 to Riggs et al.; U.S. Pat. No. 5,595,577 to Bensalem et al.; U.S. Pat. No. 5,819,751 to Barnes et al.; U.S. Pat. No. 6,089,857 to Matsuura et al.; U.S. Pat. No. 6,095,152 to Beven et al; U.S. Pat. No. 6,578,584 Beven; and U.S. Pat. No. 6,730,832 to Dominguez; which are incorporated herein by reference. Furthermore, certain types of cigarettes that employ carbonaceous fuel elements have been commercially marketed under the brand names "Premier" and "Eclipse" by R. J. Reynolds Tobacco Company. See, for example, those types of cigarettes described in *Chemical and Biological Studies on New Cigarette Prototypes that Heat Instead of Burn Tobacco*, R. J. Reynolds Tobacco Company Monograph (1988) and *Inhalation Toxicology,* 12:5, p. 1-58 (2000).

Certain proposed cigarette-shaped tobacco products purportedly employ tobacco in a form that is not intended to be burned. See, for example, U.S. Pat. No. 4,836,225 to Sudoh; U.S. Pat. No. 4,972,855 to Kuriyama et al.; and U.S. Pat. No. 5,293,883 to Edwards; which are incorporated herein by reference. Yet other types of smoking articles, such as those types of smoking articles that generate flavored vapors by subjecting tobacco or processed tobaccos to heat produced from chemical or electrical heat sources, are described in U.S. Pat. No. 4,848,374 to Chard et al.; U.S. Pat. No. 4,947,874 to Brooks et al.; U.S. Pat. No. 5,060,671 to Counts et al.; U.S. Pat. No. 5,146,934 to Deevi et al.; U.S. Pat. No. 5,224,498 to Deevi; U.S. Pat. No. 5,285,798 to Banerjee et al.; U.S. Pat. No. 5,357,984 to Farrier et al.; U.S. Pat. No. 5,593,792 to Farrier et al.; U.S. Pat. No. 5,369,723 to Counts; U.S. Pat. No. 5,692,525 to Counts et al.; U.S. Pat. No. 5,865,185 to Collins et al.; U.S. Pat. No. 5,878,752 to Adams et al.; U.S. Pat. No. 5,880,439 to Deevi et al.; U.S. Pat. No. 5,915,387 to Baggett et al.; U.S. Pat. No. 5,934,289 to Watkins et al.; U.S. Pat. No. 6,033,623 to Deevi et al.; U.S. Pat. No. 6,053,176 to Adams et al.; U.S. Pat. No. 6,164,287 to White; U.S. Pat. No. 6,289,898 to Fournier et al.; U.S. Pat. No. 6,615,840 to Fournier et al.; and U.S. Patent Appl. Pub. Nos. 2003/0131859 to Li et al.; 2005/0016549 to Banerjee et al.; and 2006/0185687 to Hearn et al.; each of which is incorporated herein by reference. One type of smoking article that has employed electrical energy to produce heat has been commercially marketed by Philip Morris Inc. under the brand name "Accord."

Certain attempts have been made to deliver vapors, sprays or aerosols, such as those possessing or incorporating flavors and/or nicotine. See, for example, the types of devices set forth in U.S. Pat. No. 4,190,046 to Virag; U.S. Pat. No. 4,284,089 to Ray; U.S. Pat. No. 4,635,651 to Jacobs; U.S. Pat. No. 4,735,217 to Gerth et al.; U.S. Pat. No. 4,800,903 to Ray et al.; U.S. Pat. No. 5,388,574 to Ingebrethsen et al.; U.S. Pat. No. 5,799,663 to Gross et al.; U.S. Pat. No. 6,532,965 to Abhulimen et al.; and U.S. Pat. No. 6,598,607 to Adiga et al; and EP 1,618,803 to Hon; which are incorporated herein by reference. See also, U.S. Pat. No. 7,117,867 to Cox et al. and the devices set forth on the website, www.e-cig.com, which are incorporated herein by reference.

Smoking articles that employ tobacco substitute materials and smoking articles that employ sources of heat other than burning tobacco cut filler to produce tobacco-flavored vapors or tobacco-flavored visible aerosols have not received widespread commercial success. Thus, it would be highly desirable to provide a smoking article that provides a smoker with an ability to enjoy using tobacco without the necessity of burning any significant amount of tobacco. In particular, it would be highly desirable to provide a tobacco-containing smoking article, such as an article having the general appearance of a cigarette, cigar, or pipe, that possesses the ability to provide to a smoker many of the benefits and advantages of conventional tobacco smoking without necessarily delivering considerable quantities of incomplete combustion and pyrolysis products.

SUMMARY OF THE INVENTION

The present invention relates to smoking articles for providing tobacco enjoyment, as well as manners and methods for providing tobacco enjoyment using such smoking articles. That is, the present invention relates to articles that produce aerosols incorporating components derived from, or provided by, tobacco. Preferred articles produce aerosols that are not necessarily produced as a result of burning of tobacco, but rather, produce an aerosol incorporating components derived from, or provided by, tobacco as a result of the application of heat upon tobacco or materials that are in contact with tobacco. Preferred articles produce visible aerosols that are "smoke-like" in nature, and exhibit many of the sensory characteristics associated with those types of smoking articles that burn tobacco. As a result, the present invention relates to tobacco smoking articles that produce aerosols without experiencing any necessary burning of tobacco or other component materials during periods in which the articles are used. Thus, the present invention relates to smoking articles, and in particular, to smoking articles that incorporates tobacco in some form. Of particular interest is generally rod-shaped smoking articles (e.g., a cigarette, a cigarillo, or a cigar), or smoking articles having shapes comparable to other traditional types of smoking products (e.g., pipes).

A preferred smoking article of the present invention, when smoked, is capable of providing mainstream aerosol that may be characterized as being flavorful and satisfying. Highly preferred cigarettes provide certain of the flavors, sensations and satisfaction of popular cigarettes that burn tobacco cut filler, because those preferred cigarettes generate mainstream aerosol, at least in part, by the action of heat upon some form of tobacco.

In one embodiment, the present invention relates to a cigarette that is smoked by coupling that cigarette to an electrically powered aerosol generating device that acts as a holder for that cigarette. The cigarette possesses at least one form of tobacco, and that tobacco is wrapped in a paper wrapper. If desired, various forms of tobacco, or various forms of tobacco containing compositions, can be positioned at specific locations within the cigarette. The cigarette also incorporates aerosol-forming material, and that aerosol-forming material can be an ingredient that is employed in addition to the tobacco. The cigarette may also possess a mouth-end piece that is used by the smoker to inhale components of tobacco, components derived from tobacco, and other components, preferably in the form of a visible aerosol, generated at least in part by the action of heat upon components of that cigarette. A representative device possesses a source of electrical power (e.g., a battery), a controller mechanism including a sensor that is capable of selectively powering certain components of the device (e.g., electrical resistance heating elements) at least during periods of draw, and at least one heating device (e.g., an electrical resistance heating unit) for forming a thermally generated aerosol that incorporates components of tobacco. During use, the cigarette is positioned within the outer housing of the smoking article, and after use, the used cigarette is removed from the smoking article. When desired, another cigarette is positioned within the device for further use.

In another embodiment, the present invention relates to a smoking article that is smoked by incorporating that tobacco within an electrically-powered, aerosol-generating device. At least one form of tobacco can be positioned at one or more specific locations within the cigarette. Aerosol-forming material is employed in addition to the tobacco. A mouth-end piece is used by the smoker to inhale components of tobacco that are generated by the action of heat upon components of that smoking article. A representative smoking article possesses a source of electrical power (e.g., a battery), a controller mechanism including a sensor that is capable of selectively powering certain components of the device (e.g., electrical resistance heating elements) at least during periods of draw, and at least one heating device (e.g., an electrical resistance heating unit) for forming a thermally generated aerosol that incorporates components of tobacco. During use, a cartridge containing some form of tobacco is positioned within the smoking article, and after use, the used cartridge is removed from the outer housing of the device. When desired, another cartridge is positioned within the device for further use.

In one preferred embodiment, a tobacco-containing, electrically-powered smoking article is provided, the smoking article comprising:

(a) an outer housing having a mouth-end and an end distal to the mouth-end, wherein the mouth-end comprises an opening adapted for egress of an aerosol generated within the smoking article and the distal end comprises an opening adapted for intake of air into the smoking article;

(b) an electrical power source within the outer housing and operatively positioned downstream of the opening in the distal end of the outer housing such that air entering the smoking article passes the electrical power source;

(c) a first electrical resistance heating element within the outer housing, powered by said electrical power source, and operatively positioned for heating air drawn through the opening in the distal end of the outer housing;

(d) a tobacco material positioned within the outer housing;

(e) an aerosol-forming material positioned within the outer housing in fluid communication with said tobacco material such that air can be drawn through both the tobacco material and the aerosol-forming material;

(f) a second electrical resistance heating element within the outer housing, powered by said electrical power source, and operatively positioned for heating the aerosol-forming material and tobacco material; and (g) a puff-actuated controller adapted for regulating current flow through at least one of said first and second electrical resistance heating elements during draw, the controller comprising a sensor adapted for sensing draw by the user on the smoking article.

The aerosol-forming material and tobacco can be positioned within a cartridge within the outer housing, the cartridge having an opening facing the second electrical resistance heating element such that aerosol generated within the cartridge initially flows in the direction of the second electrical resistance heating element. The cartridge containing the tobacco material and the aerosol-forming material can be positioned between the second resistance heating element and the mouth-end of the outer housing, and the aerosol generated in the cartridge would initially flow in the direction of the second electrical resistance heating element and then flow towards the mouth-end of the outer housing.

In one further embodiment, the tobacco material is in the form of a tobacco rod circumscribed by a wrapping material and positioned between the second resistance heating element and the mouth-end of the outer housing. A cartridge comprising an aerosol-generating material circumscribed by a wrapping material can be positioned between the tobacco rod and the second resistance heating element. Preferably, a filter element is attached to the end of the tobacco rod closest to the mouth-end of the outer housing.

The smoking article can further include, in certain embodiments, a third resistance heating element within the outer housing, powered by the electrical power source, and operatively positioned to heat the tobacco rod. The third heating element can be, for example, a tubular heating element circumscribing all or a portion of the tobacco rod. When a third heating element is present, current through this heating element can also be selectively controlled and regulated by the puff-actuated controller.

In yet another preferred embodiment, a tobacco-containing, electrically-powered smoking article is provided which comprises:

(a) an outer housing having a mouth-end and an end distal to the mouth-end, wherein the mouth-end comprises an opening adapted for egress of an aerosol generated within the smoking article and the distal end comprises an opening adapted for intake of air into the smoking article;

(b) an electrical power source within the outer housing and operatively positioned downstream of the opening in the distal end of the outer housing such that air entering the smoking article passes the electrical power source;

(c) a first electrical resistance heating element within the outer housing, powered by said electrical power source, and operatively positioned for heating air drawn through the opening in the distal end of the outer housing;

(d) a cigarette rod (which is preferably removable so that the rod can be replaced within the smoking article) within the outer housing and comprising a tobacco rod circumscribed by a wrapping paper and an adjacent filter element, the cigarette rod being positioned downstream of the second resistance heating element;

(e) an aerosol-forming material positioned within the outer housing in fluid communication with said cigarette rod such that air can be drawn through both the cigarette rod and the aerosol-forming material;

(f) a second electrical resistance heating element within the outer housing, powered by said electrical power source, and operatively positioned for heating the aerosol-forming material and the tobacco rod; and (g) a puff-actuated controller adapted for regulating current flow through at least one of said first and second electrical resistance heating elements during draw, the controller comprising a sensor adapted for sensing draw by the user on the smoking article.

The aerosol-generating material may be in intimate contact with the tobacco in the tobacco rod, or the smoking article may further include a cartridge comprising the aerosol-generating material circumscribed by a wrapping material, the cartridge positioned between the tobacco rod and the second resistance heating element. In this embodiment also, the device may further include a third resistance heating element within the outer housing, powered by said electrical power source, and operatively positioned to heat the tobacco rod.

In a still further embodiment, the invention provides a tobacco-containing, electrically-powered smoking article comprising:

(a) an outer housing having a mouth-end and an end distal to the mouth-end, wherein the mouth-end comprises an opening adapted for egress of an aerosol generated within the smoking article and the distal end comprises an opening adapted for intake of air into the smoking article;

(b) a mouthpiece through which air can be drawn from the mouth-end of the outer housing, the mouthpiece being removably attached to the outer housing;

(c) an electrical power source within the outer housing and operatively positioned downstream of the opening in the distal end of the outer housing such that air entering the smoking article passes the electrical power source;

(d) a first electrical resistance heating element within the outer housing, powered by said electrical power source, and operatively positioned for heating air drawn through the opening in the distal end of the outer housing;

(e) a removable carrier device within the outer housing comprising a tobacco material and an aerosol-forming material in fluid communication with the tobacco material such that air can be drawn through both the tobacco material and the aerosol-forming material;

(f) a second electrical resistance heating element within the outer housing, powered by said electrical power source, and operatively positioned for heating the aerosol-forming material and the tobacco material; and (g) a puff-actuated controller adapted for regulating current flow through at least one of said first and second electrical resistance heating elements during draw, the controller comprising a sensor adapted for sensing draw by the user on the smoking article.

An exemplary removable carrier device is a cigarette rod as described above, the cigarette comprising a tobacco rod circumscribed by a wrapping paper and an adjacent filter element, the cigarette rod being positioned between the second resistance heating element and the removable mouthpiece. Another example of a removable carrier device is a removable cartridge enclosing the aerosol-forming material and tobacco material as described above, the cartridge having an opening facing the second electrical resistance heating element such that aerosol generated within the cartridge initially flows in the direction of the second electrical resistance heating element. The removable carrier device can be heated by a third resistance heating element within the outer housing, the third heating element being powered by the electrical power source.

In any of the above embodiments, at least a portion of the tobacco in the tobacco rod can be in the form of tobacco cut filler, and the cut filler can be in intimate contact with the aerosol-forming material. In certain embodiments, at least a portion of the tobacco in the tobacco rod is in the form of an extract. In any embodiment, at least a portion of the tobacco in the tobacco rod and the aerosol-forming material can be in the form of an intimate mixture, or the two components can be separately-located within the smoking article, such as in separate, adjacent regions in the cigarette rod or in a cartridge. Exemplary aerosol-forming materials include glycerin, propylene glycol, and mixtures thereof.

BRIEF DESCRIPTION OF THE DRAWINGS

In order to assist the understanding of embodiments of the invention, reference will now be made to the appended drawings, which are not necessarily drawn to scale. The drawings are exemplary only, and should not be construed as limiting the invention.

DETAILED DESCRIPTION OF THE PREFERRED EMBODIMENTS

Figure 1:
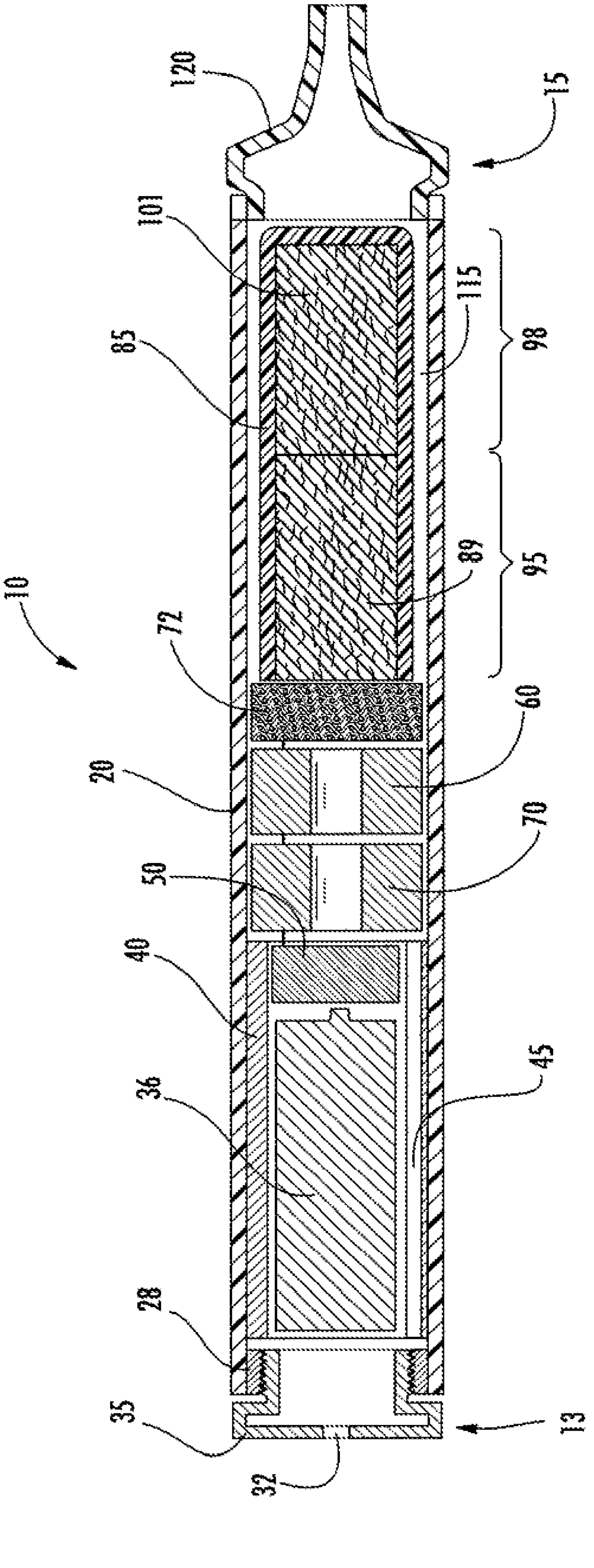
FIG. 1 through FIG. 3 depict longitudinal cross-sectional views of various embodiments of an electrically powered, tobacco-containing smoking article.

The present inventions now will be described more fully hereinafter with reference to the accompanying drawings. The invention may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms “a,” “an,” and “the” include plural referents unless the context clearly dictates otherwise.

A smoking article of the present invention incorporates tobacco. The type of tobacco can vary. One type of tobacco can be employed, or combinations or blends of various types of tobacco can be employed. Furthermore, different types of tobaccos, or different blends of tobaccos, can be employed at different locations within the smoking article.

The tobacco that is employed can include, or can be derived from, tobaccos such as flue-cured tobacco, burley tobacco, Oriental tobacco, Maryland tobacco, dark tobacco, dark-fired tobacco and *Rustica* tobacco, as well as other rare or specialty tobaccos, or blends thereof. See, also, for example, the types of tobaccos set forth in U.S. Pat. No. 6,730,832 to Dominguez et al.; and U.S. Pat. No. 7,025,066 to Lawson et al.; and U.S. Pat. Appl. Ser. No. 60/818,198, filed Jun. 30, 2006, to Stebbins et al.; each of which is incorporated herein by reference. Descriptions of various types of tobaccos, growing practices, harvesting practices and curing practices are set for in *Tobacco Production, Chemistry and Technology*, Davis et al. (Eds.) (1999). Most preferably, the tobacco that is employed has been appropriately cured and aged. Especially preferred techniques and conditions for curing flue-cured tobacco are set forth in Nestor et al., Beitrage Tabakforsch. Int., 20 (2003) 467-475 and U.S. Pat. No. 6,895,974 to Peele, which are incorporated herein by reference. Representative techniques and conditions for air curing tobacco are set forth in Roton et al., Beitrage Tabakforsch. Int., 21 (2005) 305-320 and Staaf et al., Beitrage Tabakforsch. Int., 21 (2005) 321-330, which are incorporated herein by reference.

The tobacco that is incorporated within the smoking article can be employed in various forms; and combinations of various forms of tobacco can be employed, or different forms of tobacco can be employed at different locations within the smoking article. For example, the tobacco can be employed in the form of cut or shredded pieces of lamina or stem; in a processed form (e.g., reconstituted tobacco sheet, such as pieces of reconstituted tobacco sheet shredded into a cut filer form; films incorporating tobacco components; extruded tobacco parts or pieces; expanded tobacco lamina, such as cut filler that has been volume expanded; pieces of processed tobacco stems comparable to cut filler in size and general appearance; granulated tobacco; foamed tobacco materials; compressed or pelletized tobacco; or the like); as pieces of finely divided tobacco (e.g., tobacco dust, tobacco powder, agglomerated tobacco powders, or the like); or in the form of a tobacco extract. See, for example, U.S. patent application Ser. No. 11/194,215 filed Aug. 1, 2005, to Cantrell et al. and Ser. No. 11/377,630 filed Mar. 16, 2006 to Crooks et al.; which are incorporated herein by reference.

The smoking article can employ tobacco in the form of lamina and/or stem. As such, the tobacco can be used in forms, and in manners, that are virtually identical in many regards to those traditionally used for the manufacture of tobacco products, such as cigarettes. Traditionally, cut or shredded pieces of tobacco lamina and stem have been employed as so-called "cut filler" for cigarette manufacture. Pieces of water extracted stems also can be employed. As such, the tobacco in such a form introduces mass and bulk within the smoking article. Manners and methods for curing, de-stemming, aging, moistening, cutting, reordering and handling tobacco that is employed as cut filler will be apparent to those skilled in the art of tobacco product manufacture.

Processed tobaccos that can be incorporated within the smoking article can vary. Exemplary manners and methods for providing reconstituted tobacco sheet, including casting and paper-making techniques, are set forth in U.S. Pat. No. 4,674,519 to Keritsis et al.; U.S. Pat. No. 4,941,484 to Clapp et al.; U.S. Pat. No. 4,987,906 to Young et al.; U.S. Pat. No. 4,972,854 to Kiernan et al.; U.S. Pat. No. 5,099,864 to Young et al.; U.S. Pat. No. 5,143,097 to Sohn et al.; U.S. Pat. No. 5,159,942 to Brinkley et al.; U.S. Pat. No. 5,322,076 to Brinkley et al.; U.S. Pat. No. 5,339,838 to Young et al.; U.S. Pat. No. 5,377,698 to Litzinger et al.; U.S. Pat. No. 5,501,237 to Young; and U.S. Pat. No. 6,216,707 to Kumar; each of which is incorporated herein by reference. Exemplary manners and methods for providing extruded forms of processed tobaccos are set forth in U.S. Pat. No. 4,821,749 to Toft et al.; U.S. Pat. No. 4,880,018 to Graves, Jr. et al.; U.S. Pat. No. 5,072,744 to Luke et al.; U.S. Pat. No. 4,874,000 to Tamol et al.; U.S. Pat. No. 5,551,450 to Hemsley; U.S. Pat. No. 5,649,552 to Cho et al.; U.S. Pat. No. 5,829,453 to White; U.S. Pat. No. 6,125,855 to Nevett et al.; and U.S. Pat. No. 6,182,670 to White; each of which is incorporated herein by reference. Extruded tobacco materials can have the forms of cylinders, strands, discs, or the like. Exemplary expanded tobaccos (e.g., puffed tobaccos) can be provided using the types of techniques set forth in US Pat. No. Re 32,013 to de la Burde et al.; U.S. Pat. No. 3,771,533 to Armstrong et al.; U.S. Pat. No. 4,577,646 to Ziehn; U.S. Pat. No. 4,962,773 to White; U.S. Pat. No. 5,095,922 to Johnson et al.; U.S. Pat. No. 5,143,096 to Steinberg; U.S. Pat. No. 5,172,707 to Zambelli; U.S. Pat. No. 5,249,588 to Brown et al.; U.S. Pat. No. 5,687,748 to Conrad; and U.S. Pat. No. 5,908,032 to Poindexter; and US Pat. Pub. 2004/0182404 to Poindexter et al.; each of which is incorporated herein by reference. One particularly preferred type of expanded tobacco is dry ice expanded tobacco (DIET). Exemplary forms of processed tobacco stems include cut-rolled stems, cut-rolled-expanded stems, cut-puffed stems and shredded-steam expanded stems. Exemplary manners and methods for providing processed tobacco stems are set forth in U.S. Pat. No. 4,195,646 to Kite; U.S. Pat. No. 5,873,372 to Honeycutt et al.; each of which is incorporated herein by reference. Manners and methods for employing tobacco dust are set forth in U.S. Pat. No. 4,341,228 to Keritsis et al.; U.S. Pat. No. 4,611,608 to Vos et al.; U.S. Pat. No. 4,706,692 to Gellatly; and U.S. Pat. No. 5,724,998 to Gellatly et al.; each of which is incorporated herein by reference. Yet other types of processed tobaccos are of the type set forth in US Pat. Pub. No. 2006/0162733 to McGrath et al.

The tobacco can be used in a blended form. Typically, the blends of various types and forms of tobaccos are provided in a blended cut filler form. For example, certain popular tobacco blends for cigarette manufacture, commonly referred to as "American blends," comprise mixtures of cut or shredded pieces of flue-cured tobacco, burley tobacco and Oriental tobacco; and such blends, in many cases, also contain pieces of processed tobaccos, such as processed tobacco stems, volume expanded tobaccos and/or reconstituted tobaccos. The precise amount of each type or form of tobacco within a tobacco blend used for the manufacture of a particular smoking article can vary, and is a manner of design choice, depending upon factors such as the sensory characteristics (e.g., flavor and aroma) that are desired. See, for example, the types of tobacco blends described in *Tobacco Encyclopedia*, Voges (Ed.) p. 44-45 (1984), Browne, *The Design of Cigarettes,* 3rd Ed., p. 43 (1990) and *Tobacco Production, Chemistry and Technology*, Davis et al. (Eds.) p. 346 (1999). See, also, the representative types of tobacco blends set forth in U.S. Pat. No. 4,836,224 to Lawson et al.; U.S. Pat. No. 4,924,888 to Perfetti et al.; U.S. Pat. No. 5,056,537 to Brown et al.; and U.S. Pat. No. 5,220,930 to Gentry; U.S. Patent Appl. Pub. Nos. 2004/0255965 to Perfetti et al.; and 2005/0066986 to Nestor et al.;

PCT Appl. Pub. No. WO 02/37990 to Bereman; and Bombick et al., *Fund. Appl. Toxicol.,* 39, p. 11-17 (1997); each of which is incorporated herein by reference.

Certain processed tobaccos can incorporate ingredients other than tobacco. However, it is preferred that processed tobaccos be composed predominantly of tobacco of some form, based on the dry weights of those processed tobaccos. That is, the majority of the dry weight of those processed tobaccos, and the majority of the weight of a mixture incorporating those processed tobaccos (including a blend of materials, or materials having additives applied thereto or otherwise incorporated therein), are provided by tobacco of some form. For example, those materials can be processed tobaccos that incorporate minor amounts of non-tobacco filler materials (e.g., calcium carbonate particles, spongy or absorbent materials, carbonaceous materials including carbon particles and graphite fibers, grains or wood pulp) and/or binding agents (e.g., guar gum, sodium alginate or ammonium alginate); and/or a blend of those materials can incorporate tobacco substitutes or extenders. Exemplary types of tobacco substitutes or extenders are set forth in U.S. patent application Ser. No. 11/489,334, filed Jul. 19, 2006, to Fagg et al., which is incorporated herein by reference. The foregoing materials, and blends incorporating those materials, frequently include greater than about 70 percent tobacco, often are greater than about 80 percent tobacco, and generally are greater than about 90 percent tobacco, on a dry weight basis, based on the combined weights of the tobacco, non-tobacco filler material, and non-tobacco substitute or extender. However, those processed tobaccos also can be made of virtually all tobacco, and not incorporate any non-tobacco fillers, substitutes or extenders.

The tobacco can be treated with tobacco additives of the type that are traditionally used for the manufacture of tobacco products. Those additives can include the types of materials used to enhance the flavor and aroma of tobaccos used for the production of cigars, cigarettes, pipes, and the like. For example, those additives can include various cigarette casing and/or top dressing components. See, for example, U.S. Pat. No. 3,419,015 to Wochnowski; U.S. Pat. No. 4,054,145 to Berndt et al.; U.S. Pat. No. 4,887,619 to Burcham, Jr. et al.; U.S. Pat. No. 5,022,416 to Watson; U.S. Pat. No. 5,103,842 to Strang et al.; and U.S. Pat. No. 5,711,320 to Martin. Preferred casing materials include water, sugars and syrups (e.g., sucrose, glucose and high fructose corn syrup), humectants (e.g. glycerin or propylene glycol), and flavoring agents (e.g., cocoa and licorice). Those added components also include top dressing materials (e.g., flavoring materials, such as menthol). See, for example, U.S. Pat. No. 4,449,541 to Mays et al. Additives also can be added to the tobacco using the types of equipment described in U.S. Pat. No. 4,995,405 to Lettau, or that are available as Menthol Application System MAS from Kohl Maschinenbau GmbH. The selection of particular casing and top dressing components is dependent upon factors such as the sensory characteristics that are desired, and the selection and use of those components will be readily apparent to those skilled in the art of cigarette design and manufacture. Sec, Gutcho, *Tobacco Flavoring Substances and Methods*, Noyes Data Corp. (1972) and Leffingwell et al., *Tobacco Flavoring for Smoking Products* (1972). The tobacco also may be treated, for example, with ammonia or ammonium hydroxide or otherwise treated to incorporate ammonia (e.g., by addition of ammonia salts such as, for example, diammonium phosphate). Preferably, the amount of ammonia optionally incorporated into the smokable tobacco is less than about 5 percent, and generally about 1 to about 3 percent, based on the dry weight of the tobacco.

Tobacco can be incorporated with the smoking article in a form other than cut filler form. For example, tobacco leaf and/or reconstituted tobacco sheet can be used as a wrapper for a tobacco-containing component having the form of a cigar or an inner wrapper of a double wrapped cigarette rod. Alternatively, processed tobaccos, such as certain types of reconstituted tobaccos, can be employed as longitudinally extending strands. See, for example, the type of configuration set forth in U.S. Pat. No. 5,025,814 to Raker, which is incorporated herein by reference. In addition, certain types of reconstituted tobacco sheets can be formed, rolled or gathered into a desired configuration. In addition, molded, compressed or extruded segments or pieces of tobacco-containing materials that are formed into desired shapes (e.g., strands, tubes, cylinders, pellets, or the like) can be incorporated within the aerosol delivery article. See, for example, U.S. Pat. No. 4,836,225 to Sudoh; U.S. Pat. No. 4,893,639 to White; U.S. Pat. No. 4,972,855 to Kuriyama et al.; and U.S. Pat. No. 5,293,883 to Edwards; each of which is incorporated herein by reference. If desired, finely milled tobacco or tobacco dust can be incorporated within other types of processed tobaccos, such as extrudate formulations, reconstituted tobacco sheets, or the like. Furthermore, finely milled tobacco or tobacco dust can be contained on substrates, such as membranes or screens. If desired, at least a portion of the tobacco can be heat treated prior to use within the smoking article (e.g., have the form of high temperature dried, toasted, pre-pyrolyzed, condensed volatiles collected after tobacco is heated, condensed tobacco smoke components, or the like).

At least a portion of the tobacco incorporated with the smoking article can be provided in the form of a tobacco extract. As used herein, the term “tobacco extract” means components separated from, removed from, or derived from, tobacco using tobacco extraction processing conditions and techniques. Typically, tobacco extracts are obtained using solvents, such as solvents having an aqueous nature (e.g., water) or organic solvents (e.g., alcohols, such as ethanol or alkanes, such as hexane). As such, extracted tobacco components are removed from tobacco and separated from the unextracted tobacco components; and for extracted tobacco components that are present within a solvent, (i) the solvent can be removed from the extracted tobacco components, or (ii) the mixture of extracted tobacco components and solvent can be used as such. For example, tobacco can be subjected to extraction conditions using water as a solvent; the resulting aqueous extract of tobacco then is separated from the water insoluble pulp; and then (i) the mixture of aqueous extract of tobacco within water can be used as such, or (ii) substantial amounts of the water can be removed from extracted tobacco components (e.g., using spray drying or freeze drying techniques) in order to provide a tobacco extract in powder form. Preferred tobacco extracts incorporate numerous components that are separated from, removed from, or derived from, tobacco; and are not obtained using tobacco extraction processes conditions that are highly selective to a single component (e.g., preferred extracts are not high nicotine content extracts, or extracts that can be characterized as relatively pure nicotine compositions). As such, exemplary preferred tobacco extracts possess less than 45 percent nicotine, often less than 35 percent nicotine, and frequently less than 25 percent nicotine, on the basis of the total extract weight with solvent removed (e.g., on a dry weight basis when the solvent is water). In addition, highly preferred tobacco extracts are highly aromatic and flavorful, and hence introduce desirable sensory characteristics to the aerosol produced by the smoking articles incorporating those extracts. Exemplary types of tobacco extracts, tobacco essences, solvents, tobacco extraction processing conditions and techniques, and tobacco extract collection and isolation procedures, are set forth in Australia Pat. No. 276,250 to Schachner; U.S. Pat. No. 2,805,669 to Meriro; U.S. Pat. No. 3,316,919 to Green et al.; U.S. Pat. No. 3,398,754 to Tughan; U.S. Pat. No. 3,424,171 to Rooker; U.S. Pat. No. 3,476,118 to Luttich; U.S. Pat. No. 4,150,677 to Osborne; U.S. Pat. No. 4,131,117 to Kite; U.S. Pat. No. 4,506,682 to Muller; U.S. Pat. No. 4,986,286 to Roberts et al.; U.S. Pat. No. 5,005,593 to Fagg; U.S. Pat. No. 5,065,775 to Fagg; U.S. Pat. No. 5,060,669 to White et al.; U.S. Pat. No. 5,074,319 to White et al.; U.S. Pat. No. 5,099,862 to White et al.; U.S. Pat. No. 5,121,757 to White et al.; U.S. Pat. No. 5,131,415 to Munoz et al.; U.S. Pat. No. 5,230,354 to Smith et al.; U.S. Pat. No. 5,235,992 to Sensabaugh; U.S. Pat. No. 5,243,999 to Smith; U.S. Pat. No. 5,301,694 to Raymond; U.S. Pat. No. 5,318,050 to Gonzalez-Parra et al.; U.S. Pat. No. 5,435,325 to Clapp et al.; and U.S. Pat. No. 5,445,169 to Brinkley et al.; each of which is incorporated herein by reference.

Tobacco extracts typically are carried by a substrate, or are otherwise contained within a carrier or material. The substrate for the tobacco extract can be provided by generally solid substances, such as alumina beads, pieces of carbonaceous materials, paper or paper-type materials (e.g., shredded or gathered pieces of porous paper, papers incorporating tobacco materials such as tobacco stems or stalks, papers incorporating pieces of absorbent carbon particles, or the like), pieces of tobacco lamina and/or stem, pieces of processed tobacco, synthetic fibers, or the like. Alternatively, the tobacco extract can be mixed with generally liquid or fluid substances, such as solvents, aerosol-forming materials, flavor carrying agents, and the like. Mixtures of tobacco extracts and generally liquid or fluid substances, in turn, can be carried by generally solid substrate materials or can be contained within suitable containers, vials, cartridges, or the like.

Various manners and methods for incorporating tobacco into smoking articles, and particularly smoking articles that are designed so as to not purposefully burn virtually all of the tobacco within those smoking articles, are set forth in U.S. Pat. No. 4,947,874 to Brooks et al.; U.S. Patent Application Pub. No. 2005/0016549 to Banerjee et al.; and U.S. patent application Ser. No. 11/194,215 filed Aug. 1, 2005, to Cantrell et al. and Ser. No. 11/377,630 filed Mar. 16, 2006 to Crooks et al.; which are incorporated herein by reference. In addition, tobacco has been incorporated with cigarettes that have been marketed commercially under the brand names "Premier" and "Eclipse" by R. J. Reynolds Tobacco Company. See, for example, those types of cigarettes described in *Chemical and Biological Studies on New Cigarette Prototypes that Heat Instead of Burn Tobacco*, R. J. Reynolds Tobacco Company Monograph (1988) and *Inhalation Toxicology,* 12:5, p. 1-58 (2000). Tobacco also has been incorporated within a smoking article that has been marketed commercially by Philip Morris Inc. under the brand name "Accord."

The smoking article of the present invention further includes an aerosol-generating material, which can be in intimate contact with the tobacco material (e.g., in the form of an intimate mixture), or can be carried by a non-tobacco substrate and segregated from the tobacco in the smoking article (e.g., positioned in an adjacent region of the device). The aerosol-generating material is positioned in fluid communication with the tobacco material such that air can be drawing through both the tobacco and the aerosol-generating material, thereby generating an aerosol that includes volatilized portions of the aerosol-generating material and volatilized components derived from the tobacco. The aerosol-forming material can vary, and mixtures of various aerosol-forming materials can be used. Representative types of aerosol-forming materials are set forth in U.S. Pat. No. 4,793,365 to Sensabaugh, Jr. et al.; and U.S. Pat. No. 5,101,839 to Jakob et al.; PCT Appl. Pub. No. WO 98/57556 to Biggs et al.; EPO 1,618,803 to Hon; and *Chemical and Biological Studies on New Cigarette Prototypes that Heat Instead of Burn Tobacco*, R. J. Reynolds Tobacco Company Monograph (1988); which are incorporated herein by reference.

A preferred aerosol-forming material produces a visible aerosol upon the application of sufficient heat thereto, or otherwise through the action of aerosol forming conditions using components of the smoking article. A highly preferred aerosol-forming material produces an aerosol that can be considered to be "smoke-like." A preferred aerosol-forming material is chemically simple, relative to the chemical nature of the smoke produced by burning tobacco. A preferred aerosol-forming material is a polyol; and exemplary preferred aerosol-forming materials include glycerin, propylene glycol, and mixtures thereof. If desired, aerosol-forming materials can be combined with other liquid materials, such as water. For example, aerosol-forming material formulations can incorporate mixtures of glycerin and water, or mixtures of propylene glycol and water. Exemplary aerosol-forming materials also include those types of materials incorporated within devices available through Atlanta Imports Inc., Acworth, Georgia, USA., as an electronic cigar having the brand name E-CIG, which can be employed using associated Smoking Cartridges Type C1a, C2a, C3a, C4a, C1b, C2b, C3b and C4b; and as Ruyan Atomizing Electronic Pipe and Ruyan Atomizing Electronic Cigarette from Ruyan SBT Technology and Development Co., Ltd., Beijing, China.

The aerosol-forming material can be maintained within the smoking article in a variety of ways. For example, the aerosol-forming material can be contained within a container in liquid form, or soaked within absorbent fibrous materials or sponge-like materials. Exemplary absorbent materials can be composed of synthetic polymeric materials, such as fibers of polyethylene terephthalate. Alternatively, the aerosol-forming material can be incorporated within, or carried by, a material that acts as a substrate. For example, the substrate can be, at least in part, a material that incorporates tobacco. Exemplary substrate materials, and exemplary formulations incorporating aerosol-forming materials, are set forth in U.S. Pat. No. 4,793,365 to Sensabaugh et al.; U.S. Pat. No. 4,893,639 to White; U.S. Pat. No. 5,099,861 to Clearman et al.; U.S. Pat. No. 5,101,839 to Jakob et al.; U.S. Pat. No. 5,105,836 to Gentry et al.; U.S. Pat. No. 5,159,942 to Brinkley et al.; U.S. Pat. No. 5,203,355 to Clearman et al.; U.S. Pat. No. 5,271,419 to Arzonico et al.; U.S. Pat. No. 5,327,917 to Lekwauwa et al.; U.S. Pat. No. 5,396,911 to Casey, III et al.; U.S. Pat. No. 5,533,530 to Young et al.; U.S. Pat. No. 5,588,446 to Clearman; U.S. Pat. No. 5,598,868 to Jakob et al.; and U.S. Pat. No. 5,715,844 to Young et al.; and U.S. Patent Application Pub. No. 2005/0066986 to Nestor et al.; which are incorporated herein by reference. See, also, *Chemical and Biological Studies on New Cigarette Prototypes that Heat Instead of Burn Tobacco*, R. J. Reynolds Tobacco Company Monograph (1988). Exemplary substrate materials have been incorporated within the types of cigarettes commercially marketed under the trade names "Premier" and "Eclipse" by R. J. Reynolds Tobacco Company.

The substrate material can incorporate tobacco of some form, normally is composed predominantly of tobacco, and can be provided by virtually all tobacco material. The form of the substrate material can vary; but most preferably that material is employed in an essentially traditional cigarette, cigar or pipe filler form (e.g., as cut filler). The substrate material can be otherwise formed into desired configurations. The substrate material can be used in the form of a gathered web or sheet, using the types of techniques generally set forth in U.S. Pat. No. 4,807,809 to Pryor et al. The substrate material can be used into the form of a web or sheet that is shredded into a plurality of longitudinally extending strands, using the types of techniques generally set forth in U.S. Pat. No. 5,025,814 to Raker. The substrate material can have the form of a loosely rolled sheet, such that a spiral type of air passageway extends longitudinally through the aerosol-generation segment. Representative types of tobacco containing substrate materials can be manufactured from mixtures of tobacco types; or from one predominant type of tobacco (e.g., a cast sheet-type or paper-type reconstituted tobacco composed primarily of burley tobacco, or a cast sheet-type or paper-type reconstituted tobacco composed primarily of Oriental tobacco).

The substrate material also can be treated with tobacco additives of the type that are traditionally used for the manufacture of cigarettes, such as casing and/or top dressing components. The substrate material optionally can be ammoniated (e.g., by treatment with anhydrous ammonia, aqueous ammonium hydroxide, or ammonium salts such as diammonium phosphate). Alternatively those materials can be absent, or virtually absent, of any type of added ammonia (e.g., whether by treatment with anhydrous ammonia, aqueous ammonium hydroxide, or ammonium salts such as diammonium phosphate). Those materials also can be treated with other additives, such as potassium carbonate or sodium bicarbonate. Other materials, such as catalytic agents, nanoparticle compositions, and the like, also can be incorporated within any of the smokable materials of the smokable rod. See, for example, the types of components set forth in US Pat. Publication 2004/0173229 to Crooks et al. Preferably, the material is not treated with more that about 10 percent of any of those types of additive agents other than aerosol-forming materials, based on the dry weight of tobacco material within that substrate material.

The manner by which the aerosol-forming material is contacted with the substrate material (e.g., the tobacco) can vary. The aerosol-forming material can be applied to a formed tobacco material, or can be incorporated into processed tobaccos during manufacture of those tobaccos. The aerosol-forming material can be dissolved or dispersed in an aqueous liquid, or other suitable solvent or liquid carrier, and sprayed onto that substrate material. See, for example, U.S. Patent Appl. Pub. No. 2005/0066986 to Nestor et al. The amount of aerosol-forming material employed relative to the dry weight of substrate material can vary. Materials including exceedingly high levels of aerosol-forming material can be difficult to process into cigarette rods using conventional types of automated cigarette manufacturing equipment.

Cast sheet types of processed tobaccos preferably can incorporate relatively high levels aerosol-forming material. Reconstituted tobaccos manufactured using paper-making types of processes preferably can incorporate moderate levels of aerosol-forming material. Tobacco lamina strip and tobacco cut fuller can incorporate lower amounts of aerosol-forming material. For processed materials, such as cast sheet materials and paper-type reconstituted tobaccos, tobacco pulp materials that are extracted with aqueous liquids can be used as components thereof. The removal of some fraction or essentially all of the water soluble components of tobacco can assist in providing a processed material that is capable of acting as an effective substrate for higher levels of aerosol-forming material. In addition, dusting processed tobaccos with dry tobacco powders can assist in providing processed materials having relatively high levels of glycerin while not demonstrating overly tacky or sticky characteristics. Alternatively, relatively high levels of aerosol-forming materials can be applied to, or incorporated within, tobacco substrate materials; and those resulting materials can be considered to be somewhat moist, wet, tacky, sticky or gooey in nature.

Cast sheet processes tobaccos, and particularly cast sheet tobaccos incorporating certain amounts of tobacco pulp that have been extracted with water, often can comprise up to about 65 percent, often up to about 60 percent, and frequently up to about 55 percent, aerosol-forming material, based on the dry weight of the tobacco and aerosol-forming material in the processed material so produced. Paper-type reconstituted tobaccos, and particularly those forms of tobacco incorporating certain amounts of tobacco pulp materials that have been extracted with water, and not reapplying some or all of the water soluble extract components back to that pulp, often can comprise up to about 55 percent, often up to about 50 percent, and frequently up to about 45 percent, aerosol-forming material, based on the dry weight of the tobacco and aerosol-forming material in the material so produced. A tobacco material produced by spraying tobacco strip or cut filler with aerosol-forming material often does not comprise more than about 20 percent, and frequently does not comprise more than about 15 percent, aerosol-forming material, based on the dry weight of the tobacco and aerosol-forming material of the material so produced. Materials having relatively high loading levels of aerosol-forming material can be dried (e.g., by being subjected to a flow of hot air) to a moisture content of about 4 percent to about 5 percent, by weight; the dried material then can be processed to form the components of the designed configuration; and then those components can be re-equilibrated to a moisture content of about 12 to about 13 weight percent. Alternatively, those materials can be used in a somewhat moist or wet form.

Other types of materials incorporating relatively high levels of aerosol-forming material can be incorporated in the smoking article. Formed, encapsulated or microencapsulated materials can be employed. Such types of materials preferably include primarily of aerosol-forming material, and those materials most preferably incorporate some amount and form of tobacco. An example of such a type of material is a film produced by casting and drying an aqueous solution of about 65 to about 70 weight parts glycerin, and about 25 to about 30 weight parts binder (e.g., citrus pectin, ammonium alginate, sodium alginate or guar gum), and about 5 weight parts flavoring agent (e.g., vanillin, coffee, tea, cocoa and/or fruit flavor concentrates); and then surface-coating that film with about 2 to about 10 weight parts of a finely divided powder that is provided by milling tobacco lamina.

The amount of aerosol-forming material that is used within the smoking article is such that the cigarette exhibits acceptable sensory and organoleptic properties, and desirable performance characteristics. For example, it is highly preferred that sufficient aerosol-forming material, such as glycerin and/or propylene glycol, be employed in order to provide for the generation of a visible mainstream aerosol that in many regards resembles the appearance of tobacco smoke. Typically, the amount of aerosol-generating material incorporated into the smoking article is in the range of less than about 1.5 g, often less than about 1 g, and sometimes less than about 0.5 g. The amount of aerosol-forming material is dependent upon factors such as the number of puffs desired per tobacco-containing cartridge or cigarette incorporated within the smoking article. The amount of aerosol-forming material also can be dependent upon factors such as the position or location of that material relative to the heat-producing components of the smoking article, the ability of that material to wick or transfer to heating regions within the smoking article, the desired concentration of that material in the aerosol generated by the smoking article, and the like.

It is desirable for the aerosol-generating composition not to introduce significant degrees of unacceptable off-taste, filmy mouth-feel, or an overall sensory experience that is significantly different from that of a traditional type of cigarette that generates mainstream smoke by burning tobacco cut filler. The selection of the particular aerosol-generating material and substrate material, the amounts of those components used, and the types of tobacco material used, can be altered in order to control the overall chemical composition of the mainstream aerosol produced by the cigarette.

Other types of flavoring agents, or materials that alter the sensory or organoleptic character or nature of the mainstream aerosol of the smoking article, can be employed. Such flavoring agents can be provided from sources other than tobacco, can be natural or artificial in nature, and can be employed as concentrates or flavor packages. Of particular interest are flavoring agents that are applied to, or incorporated within, those regions of the smoking article where aerosol is generated. Exemplary flavoring agents include vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice; and flavorings and flavor packages of the type and character traditionally used for the flavoring of cigarette, cigar and pipe tobaccos. Syrups, such as high fructose corn syrup, also can be employed. Flavoring agents also can include acidic or basic characteristics (e.g., organic acids, such as levulinic acid). Preferably, such flavoring agents constitute less than about 10 percent, and often less than about 5 percent of the total weight of tobacco, on a dry weight basis. The flavoring agents can be added to the tobacco material or to the aerosol-generating material or both.

The amount of tobacco incorporated within each smoking article can vary. For certain embodiments, the amount of tobacco cut filler incorporated within each smoking article is at least about 20 mg, generally at least about 50 mg, often at least about 75 mg, and frequently at least 100 mg, on a dry weight basis. For certain embodiments, the amount of tobacco cut filler incorporated within each smoking article does not exceed about 400 mg, generally does not exceed about 350 mg, often does not exceed about 300 mg, and frequently does not exceed about 250 mg, on a dry weight basis. For segments or sections incorporating tobacco cut filler or processed tobacco in cut filler form, the packing density of the material within those segments or sections typically is less than about 400 mg/cm$^3$, and generally is less than about 350 mg/cm$^3$; while the packing density of the material within those segments or sections can exceed about 100 mg/cm$^3$, and often can exceed about 150 mg/cm$^3$. Preferably, each such segment or section is composed entirely of tobacco and/or processed tobacco. Alternatively, each such segment or section can be composed of tobacco and/or processed tobacco mixed or blended with a non-tobacco substrate material. In either case, the tobacco material, and optional non-tobacco substrate material, can act as a substrate for aerosol-forming materials, flavoring agents, and the like.

The moisture content of the tobacco that is used within the smoking article can vary. Typically, the moisture content of the tobacco exceeds about 12 weight percent, and often can exceed about 15 weight percent. In certain circumstances, moist tobacco can be employed; and that tobacco can have a moisture content in excess of about 20 weight percent, often in excess of about 30 weight percent, and even in excess of about 40 weight percent.

Certain embodiments of the smoking article of the invention incorporate a cigarette rod as a necessary component. That is, the smoking article of the invention can incorporate a tobacco rod wrapped in paper or other wrapping material. The wrapping material used as a wrapper for containing the tobacco, and hence used for cigarette manufacture, can vary. Exemplary types of wrapping materials are set forth in U.S. Pat. No. 4,938,238 to Barnes et al. and U.S. Pat. No. 5,105,837 to Barnes et al. Wrapping materials, such as those set forth in U.S. Patent Appl. Pub. No. 2005/0005947 to Hampl, Jr. et al. and PCT Appl. Pub. No. WO 2005/039326 to Rasouli et al., can be employed as inner wrapping materials of a so-called "double wrap" configuration. An exemplary type of heat conductive wrapping material is set forth in U.S. Pat. No. 5,551,451 to Riggs et al.; and other suitable wrapping materials are set forth in U.S. Pat. No. 5,065,776 to Lawson et al. and U.S. Pat. No. 6,367,481 to Nichols et al.; each of which is incorporated herein by reference. Exemplary wrapping materials, such as laminates of paper and metal foil, and papers used as the outer circumscribing wrapper of the heat generation segment, have been incorporated within the types of cigarettes commercially marketed under the trade names "Premier" and "Eclipse" by R. J. Reynolds Tobacco Company. Other representative wrapping materials, and processed wrapping materials, suitable for use for cigarette manufacture are set forth in U.S. Pat. No. 5,220,930 to Gentry; U.S. Pat. No. 6,976,493 to Chapman et al.; and U.S. Pat. No. 7,047,982 to Seymour et al.; and U.S. patent application Ser. No. 11/377,630 filed Mar. 16, 2006 to Crooks et al.; each of which is incorporated herein by reference. Paper materials can be composed of materials, or treated with films, in order to provide resilience, particularly when the paper material is used to contain tobacco materials that are substrates for relatively high amounts of liquid materials (e.g., aerosol-forming materials). For example, such papers can be treated with coatings of nitrocellulose or ethylcellulose. Alternatively, paper materials can be highly absorbent in nature, and can act as substrates for liquid materials (e.g., aerosol-forming materials, liquid flavoring agents, or mixture of aerosol-forming materials and tobacco extracts).

The tobacco can be wrapped in at least one layer of tobacco lamina and/or reconstituted tobacco sheet. As such, the tobacco that is incorporated within the smoking article is configured in a type of form characteristic of a cigar. Outer wrappers for cigar type tobacco segments or sections can act as substrates for liquid materials (e.g., aerosol-forming materials, liquid flavoring agents, tobacco extracts, or mixtures thereof).

The tobacco can be wrapped in moisture permeable and air permeable pouches, sachets, packets, or the like. For example, finely divided tobacco pieces can be sealed in mesh-type pouches. Suitable pouches are of the type traditionally used for containment of certain types of smokeless tobacco products. See, for example, the types of pouches and types of contents of those pouches that are set forth in U.S. patent application Ser. No. 11/233,399, filed Sep. 22, 2005, to Holton et al.; Ser. No. 11/351,919, filed Feb. 10, 2006, to Holton et al.; and Ser. No. 11/461,633, filed Aug. 1, 2006, to Mua et al.; which are incorporated herein by reference. Such pouches and the contents thereof can act as substrates for significant amounts of aerosol-forming materials, flavoring agents and tobacco extracts. For example, relatively high levels of liquid materials can be applied to, or incorporated within, those substrates; and those resulting materials can be considered to be moist, wet, tacky, sticky or gooey in nature. If desired, those substrates can be soaked in liquid mixtures of aerosol-forming material and other components that provide tobacco flavor characteristics to the aerosol produced by the smoking article. The number of such types of pouches that are incorporated within a representative smoking article can vary, and typically can range, for example, from 1 to about 5.

The smoking article typically possesses a mouth-end piece. Representative types of filter elements, such as those employed for cigarettes, including segmented cigarette filter elements, are set forth in U.S. patent application Ser. No. 11/461,941, filed Aug. 2, 2006, to Nelson et al., which is incorporated herein by reference. Mouth-end pieces also can be fashioned into desired shapes using plastic materials such as nylon, polypropylene, polystyrene, poly(butadiene/styrene/acrylonitrile), or the like.

Representative smoking articles can possesses certain components comparable to, and operate in a manner generally comparable to, that type of device set forth in EPO 1,618,803 to Hon. Representative smoking articles, and exemplary components thereof, also can be provided using components of those nicotine aerosol delivery systems available through Atlanta Imports Inc., Acworth, Georgia, USA., as an electronic cigar having the brand name E-CIG, which can be employed using associated Smoking Cartridges Type C1a, C2a, C3a, C4a, C1b, C2b, C3b and C4b. Exemplary components for representative smoking articles also have been available components of those devices available as Ruyan Atomizing Electronic Pipe and Ruyan Atomizing Electronic Cigarette from Ruyan SBT Technology and Development Co., Ltd., Beijing, China.

Aspects and embodiments of the present invention relating to various smoking articles now are described with reference to the illustrations contained in FIGS. 1-3. Referring to FIG. 1, an embodiment of a representative smoking article 10 is shown. The smoking article 10 has an overall shape that is generally rod-like or tubular in nature, generally akin to a cigarette-type or cigar-type smoking article. The smoking article 10 includes a distal end 13 and a mouth-end 15.

The smoking article 10 possesses an outer container or housing 20. Although the dimensions and shape of the outer container 20 can vary, a representative outer housing is generally tubular in shape (e.g., having an overall length of about 11 cm and an outer diameter of about 1.5 cm). The outer housing 20 can be provided using a variety of materials. For example, the outer housing 20 can be provided from metal (e.g., aluminum or stainless steel), heat-resistant plastic (e.g., polycarbonate), treated paperboard material, or the like. If desired, the outer housing can possess an aesthetically pleasing cover (not shown). A representative outer housing can be of the type possessed by the Ruyan Atomizing Electronic Cigarette available from Ruyan SBT Technology and Development Co., Ltd. As shown, the outer housing 20 includes a mouth-end 15 and an end 13 distal to the mouth-end, wherein the mouth-end comprises an opening adapted for egress of an aerosol generated within the smoking article and the distal end comprises an opening adapted for intake of air into the smoking article 10.

The distal end 13 of the outer container 20 of the smoking article 10 can possess an end cover or cap 35. The end cover or cap 35 can be maintained in place by friction fit, a threaded screw mechanism that cooperates with a complementing threaded mechanism 28 that is secured to the distal region of the outer container, or the like. The end cover 35 can act to assist in maintaining various components of the smoking article contained within the outer container. The end cover preferably possesses at least one air passageway 32 to allow drawn air to enter the inner region of the outer container 20. A representative end cover or cap 35 can be of the type possessed by the Ruyan Atomizing Electronic Cigarette available from Ruyan SBT Technology and Development Co., Ltd.

Within the outer container 20 is located an electric power source 36, such as at least one battery. The battery typically is maintained in place by a generally tubular battery holder 40 that is positioned and secured in place within the outer container 20. Typically, at least one longitudinally extending air passageway 45 allows for drawn air to pass by the battery towards the mouth-end 15 of the smoking article 10. As shown, the passageway 45 can be created by incorporation of one or more grooves in the battery holder 40 or, alternatively, by incorporating ribs (not shown) extending into the interior of the battery holder in order to prevent the power source 36 from entering the passageway. The battery holder 40 also can act as a container for relevant electrical wiring (not shown) that passes from the battery to downstream regions of the smoking article 10. Representative types of power sources, and representative arrangements thereof within the outer container, are of the type incorporated within a device available as Ruyan Atomizing Electronic Cigarette from Ruyan SBT Technology and Development Co., Ltd. If desired, higher power electrical power sources can be employed.

The smoking article 10 incorporates various electrically powered control components 50. For a representative embodiment, the control components 50 are positioned within the tubular battery holder 40 in a region downstream from the battery 36. Typically, the electrically-powered control components 50 include microchips that provide control of time of operation, control of current, control of electrical resistance heat generation, and the like. Exemplary circuits that can be included in the controller 50 are set forth in FIGS. 4-5. The electrically-powered components 50 are powered by the battery 36. Representative types of electronic control components are of the type can be of the type possessed by the Ruyan Atomizing Electronic Cigarette available from Ruyan SBT Technology and Development Co., Ltd. Sec, also, the types of electronic systems set forth in U.S. Pat. No. 4,947,874 to Brooks et al.

The representative smoking article 10 incorporates suitably adapted sensing mechanism 60 in order to provide for operation of the electrically powered components during desired periods of time. Representative types of sensing mechanism components are incorporated within a device available as Ruyan Atomizing Electronic Cigarette from Ruyan SBT Technology and Development Co., Ltd. See, also, those types of airflow sensing mechanisms proposed in EPO 1,618,803 to Hon; and U.S. Pat. No. 4,735,217 to Gerth et al.; U.S. Pat. No. 4,947,874 to Brooks et al.; and U.S. Pat. No. 5,388,574 to Ingebrethsen. The sensing mechanism 60 also can be powered by the battery 36. Typically, the sensing mechanism components 60 are positioned within the outer container 20 in a location downstream from the electrically powered control components 50. The sensor 60, in concert with certain control circuitry within the controller 50, is preferably part of a puff-actuated controller adapted for regulating current flow through one or more of the resistance heating elements discussed below. The sensor 60 is preferably adapted for sensing draw (i.e., intake of air from the smoking article) by the user of the smoking article. Representative types of draw sensors are set forth in U.S. Pat. No. 4,947,874 to Brooks et al., wherein pressure sensitive switches are discussed, such as pressure sensitive differential switches available from Micro Pneumatic Logic, Inc. of Ft. Lauderdale, Florida, pressure sensitive transducers, airflow-deflected vanes with motion sensors, and the like. See also, U.S. Pat. No. 7,117,867 to Cox et al. The sensor 60 is configured to allow airflow through or around the sensor. In the embodiment shown, the sensor 60 is configured in an annular shape with a passageway through the center thereof. Other configurations are also possible, such as configurations with multiple passageways through or around the sensor 60.

The representative smoking article 10 also incorporates at least one electrical resistance heating element 70, 72. An optional first resistance heating element 70 can be located upstream from the sensing mechanism 60, and as such, can act to heat drawn air passing through the smoking article from the distal end 13 of the outer housing 20. A second resistance heating element 72 can be located downstream from the sensing mechanism 60. The resistance heating elements 70, 72 also can be powered by the battery 36, and control of the operation of those heating elements can be controlled by the electrically powered control components 50. The heating elements 70, 72 are configured to allow airflow therethrough. The heating element 70 upstream of the sensor 60 is configured in the same manner as the sensor (i.e., in an annular shape); however, other configurations are possible as noted above.

Typically, the second resistance element 72 can be formed from relatively high surface area absorbent or wicking-type materials, such as graphite yarn, high surface area metallic cloth or screen, or the like. Resistance elements of such type are useful for supporting or holding sufficient aerosol-forming material for aerosol generation, as well as for wicking additional aerosol-forming material for aerosol generation during subsequent puffs. Alternatively, the second resistance element 72 can be employed in close proximity to an absorbent wicking material such that aerosol-forming material can be wicked or otherwise transferred so as to contact the second resistance element or contact an area in close proximity to the second resistance element (e.g., a region that is exposed to a the heat produced by the second resistance element). Representative types of resistance heating elements are incorporated within a device available as Ruyan Atomizing Electronic Cigarette from Ruyan SBT Technology and Development Co., Ltd. If desired, each of the heating elements 70, 72 can be arranged to have current pass therethrough (and hence provide heat) in response to a signal provided by a puff-actuated controller that regulates current through one or more of the heating elements in response to signals from the sensor 60. For example, each heating element 70, 72 can be turned "on" and "off" in response to a signal provided in response to the sensing mechanism 60 and related control circuitry. Alternatively, current flow through the first heating element 70 can be controlled during periods of normal use of the smoking article 10, and current flow through the second heating element 72 can be controlled only during periods of draw (i.e., the second heating element will be energized when the sensor 60 detects draw by the user).

The representative smoking article 10 of FIG. 1 incorporates a cartridge 85. The cartridge can be manufactured from a variety of materials, such as metal (e.g., aluminum or stainless steel), paper (e.g., paperboard or paper coated with a hydrophobic film or coating), plastic (e.g., polyester, polypropylene, nylon, polycarbonate, or the like). The cartridge 85 contains tobacco 89 in some form. The cartridge 85 also most preferably contains aerosol-forming material. The tobacco 89 and the aerosol-forming material can be in the form of an intimate mixture or provided in separate regions of the cartridge 85. Representative types of cartridges are of the type incorporated within a device available as Ruyan Atomizing Electronic Cigarette from Ruyan SBT Technology and Development Co., Ltd. can be modified by adding tobacco extract thereto, or by removing at least a portion of the substrate and nicotine-containing material incorporated therein and replacing that removed portion with a tobacco composition. For example, for the embodiment shown in FIG. 1, the cartridge 85 can contain an upstream segment 95 composed of tobacco filler or processed tobacco filler material 89 incorporating aerosol-forming material, and a downstream segment 98 composed of a substrate 101, such as fibers of polyethylene terephthalate carrying flavors and/or aerosol-forming material. The representative smoking article 10 is assembled such that a certain amount of aerosol-forming material and tobacco components can be wicked or otherwise transferred to heating element 72 or the region in close proximity to the heating element. Optionally, as shown, the extreme mouth end region of the cartridge 85 is sealed, and as such, tobacco components and aerosol-forming material have a tendency to travel upstream towards the resistance heater 72. Typically, at least one air passageway 115 extends longitudinally between the inner surface of the outer container 20 and the outer surface of the cartridge 85. This air passageway 115 can be created using the same techniques noted above in connection with the passageway 45 in the batter holder 40.

A representative cartridge 85 is provided by modifying the components of a cartridge employed in a device available as Ruyan Atomizing Electronic Cigarette from Ruyan SBT Technology and Development Co., Ltd. For example, the section or segment of the fibrous substrate and aerosol-forming material is removed from that cartridge and discarded, and that portion is replaced by a section or segment composed of tobacco cut filler saturated with a mixture of glycerin and spray dried tobacco extract. As another example, a web of reconstituted tobacco sheet that is gathered so as to possess a plurality of longitudinally extending passageways can be treated with a mixture of propylene glycol, flavoring agent and tobacco extract. As still another example, the whole section or segment of the fibrous substrate and aerosol-forming material is removed from that cartridge and discarded, and all of that material is replaced by a section or segment composed of aqueous extracted tobacco cut filler pulp saturated or nearly saturated with a mixture of glycerin, flavoring agent and spray dried tobacco extract. As a further example, the fibrous substrate and aerosol-forming material can be positioned in the upstream end of the cartridge, and the downstream end of the cartridge can be provided by a plurality of formed tobacco pieces or pellets that act as a substrate for aerosol-forming material and flavoring agent.

The amount of aerosol-forming material, tobacco extract, flavoring agent, and the like that is carried by the substrate can vary; and the weight of those ingredients typically can be as much as at least equal to, often can be at least about twice that, and frequently can be at least about three times that, of the dry weight of the substrate. As such, the cartridge can be adapted to provide components, of types and in amounts, sufficient to provide aerosols demonstrating acceptable visual characteristics, acceptable mouthfeel and other organoleptic effects, acceptable tobacco flavor, and the like.

In a further embodiment, tobacco can be incorporated within a cartridge 85 having the ability to act as a type of liquid storage container of the smoking article. For example, powdered spray dried tobacco extract can be incorporated within the liquid storage container 85, or liquid tobacco extracts or essences can be combined within components contained within the liquid storage container (e.g., aerosol-forming materials) so as to be intimately combined with those components. In another embodiment, pieces of tobacco lamina, stems, or processed tobacco can be incorporated within the liquid storage container 85. For example, pieces of tobacco lamina cut filler, tobacco dust, or pieces of reconstituted tobacco sheet, can be incorporated within the liquid storage container. As such, the tobacco can be mixed with, or be part of, the aerosol-forming mixture within the cartridge 85. Most preferably, essentially pure nicotine, extracts composed predominantly of nicotine, or formulations composed predominantly of nicotine, are not incorporated within the liquid storage container 85 or elsewhere within the smoking article.

In another embodiment, the tobacco can be located within the smoking article 10 in a region that is physically separate from the cartridge 85. For example, the tobacco can be positioned so as to abut the cartridge 85, or positioned in a spaced apart relationship relative to the cartridge. As such, the tobacco is not mixed with the aerosol-forming mixture within the cartridge 85. In one embodiment, a charge or roll of tobacco cut filler wrapped in paper (e.g., so as to provide a generally cylindrical charge of tobacco) can be positioned either upstream or downstream from the cartridge 85. In another embodiment, tobacco-containing reconstituted tobacco sheet (e.g., a formed cast sheet or reconstituted tobacco paper) can be used as wrapping materials of various components (e.g., including the cartridge 85) within the smoking article 10. In another embodiment, tobacco cut filler can surround the cartridge 85 or other components located within the smoking article 10. In another embodiment, tobacco extract can be carried by a substrate or positioned within a cartridge that is located within the smoking article 10 physically separate from the aforementioned cartridge 85 that contains the aerosol-forming material.

The number of puffs during the use of a single cartridge 85 can vary, depending upon factors such as the amount of aerosol-forming material, tobacco, and other associated components that is employed, the form of those components, the positioning of those components within the smoking article 10 relative to the resistance heating elements, and the like. The amount of those components can be sufficient to provide, for example, about 10 to about 15 puffs per cartridge, when that cartridge is employed within a smoking article and smoked under FTC smoking conditions. However, amount of those components can be sufficient to provide, for example, greater than about 200 puffs per cartridge, often greater than about 400 puffs per cartridge, and frequently greater than about 600 puffs per cartridge, when that cartridge is employed within a smoking article and smoked under FTC smoking conditions. For smoking articles employing cartridges containing sufficient components to provide a relatively large number of puffs, those smoking articles can be employed in conjunction with removable caps, or other suitable sealing means, in order that the smoking article can be sealed during periods of non-use. The smoking article 10 can be configured such that the cartridge 85 can be removed from the smoking article and replaced as needed.

The smoking article 10, at its mouth-end 15, possesses a mouth-end piece 120. The mouth-end piece 120, which is typically removable, can be maintained in place by friction fit, a threaded screw mechanism that cooperates with a complementing threaded mechanism that is secured to the outer container, or the like. A representative mouth-end piece can be of the type incorporated within a device available as Ruyan Atomizing Electronic Cigarette from Ruyan SBT Technology and Development Co., Ltd. Alternatively, the mouth-end piece 120 can have the form of other types of holders that have been proposed for use with smoking articles. See, also, for example, the types of mouth-end pieces and cigarette-type filter elements set forth in U.S. patent application Ser. No. 11/377,630 filed Mar. 16, 2006 to Crooks et al.

During use, the mouth-end 15 of the smoking article 10 is placed in the lips of the smoker. Air is drawn through the air passageways or openings 32 in the cap 35 located at the distal end 13 of the smoking article, and into the outer container 20. Drawn air passes through air passageway 45 that extends along the length of the power source 36 and the electronic control components 50, through an air passageway area within the first heating element 70, through the air flow sensing region 60, past or through the second heating element 72, through air passageway 115 that extends along the length of the cartridge 85, and into the mouth-end piece 120. Typically, resistance heating elements provide surface region temperatures, and hence the ability to heat aerosol-forming materials and tobacco materials in surrounding regions in the vicinity of those heating elements. Typically, during relevant periods of use, those heating elements can provide surface region temperatures of at least about 200° C., and often at least about 300° ° C. Typically, those temperatures do not exceed about 600° C., often do not exceed about 500° C., and frequently do not exceed about 400° C. Aerosol that is formed by the action of drawn air passing heated tobacco components and aerosol-forming material in the region occupied by the second heating element 72 is drawn through the mouth-end piece 120, and into the mouth of the smoker. That is, when used, the smoking article 10 yields visible mainstream aerosol that preferably resembles the mainstream tobacco smoke of traditional cigarettes that burn tobacco cut filler. The aerosol may also contain flavors and other components provided by, or derived from, tobacco.

Figure 2:
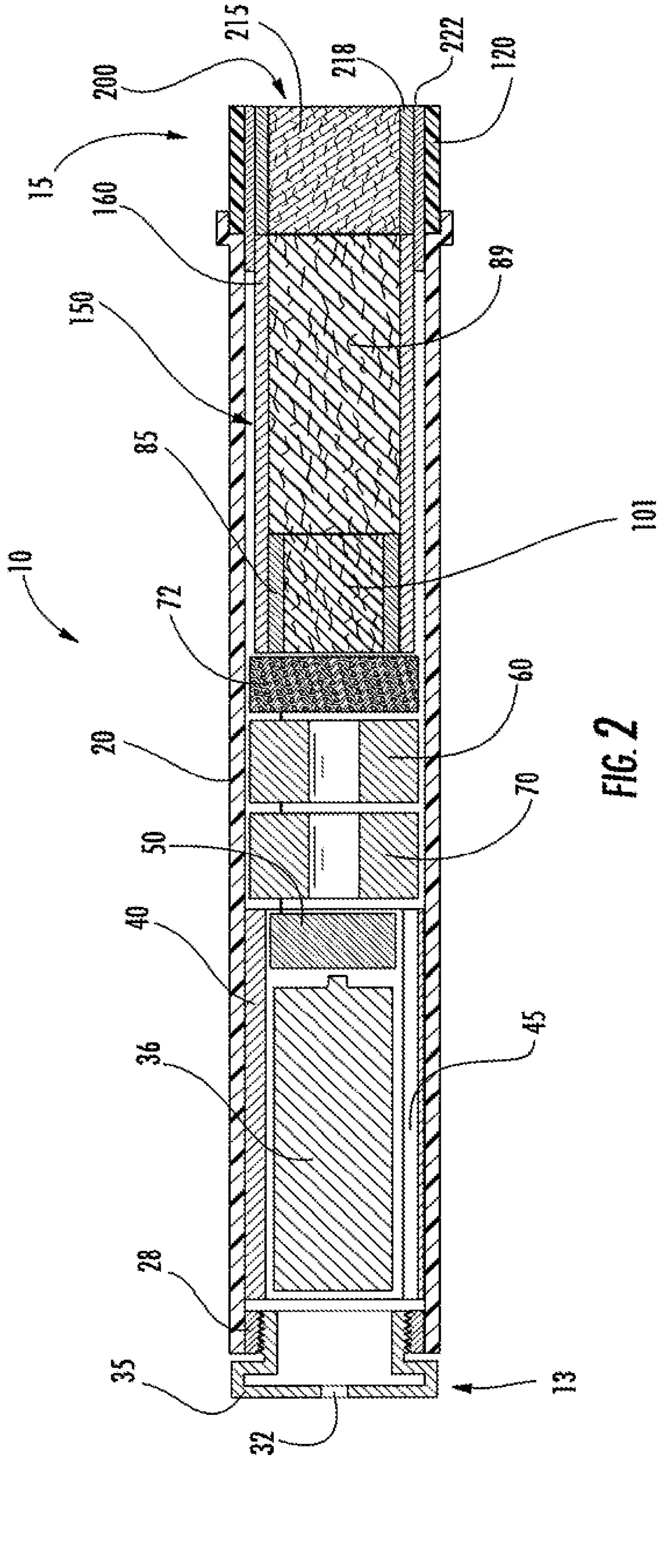

Referring to FIG. 2, another embodiment of a representative smoking article 10 is shown. The smoking article 10 has a rod-like shape, and includes a distal end 13 and a mouth-end 15. The smoking article 10 possesses certain components comparable to, and in certain regards operates in a manner generally comparable to, that smoking article described previously with reference to FIG. 1. However, the smoking article is adapted to incorporate a cigarette 150.

An exemplary type of cigarette 150 possesses a charge or roll of tobacco 89 (e.g., tobacco cut filler or processed tobacco material) wrapped in wrapping material 160 (e.g., paper). The length of the resulting tobacco rod can vary; with a typical tobacco rod having a length of at least about 30 mm, often at least about 40 mm, while a typical tobacco rod has a length that does not exceed about 60 mm, and often does not exceed about 50 mm. The circumference of the tobacco rod can vary; with a typical tobacco rod having a circumference of about 20 mm to about 35 mm, and often about 25 mm to about 30 mm. Depending upon factors such as the ingredients incorporated within the cigarette 150, the number of puffs of aerosol per cigarette than are expected, the configuration of the holder into which the cigarette is inserted, the amount of heat generated by the resistance heating element, and the like, the physical dimensions of the cigarette can be smaller than those of conventional, commercially available cigarettes that burn tobacco.

Typically, the wrapping material 160 is wrapped around the tobacco 89 so as to form a generally cylindrical rod-shaped cigarette rod or tobacco rod. That is, the wrapping material 160 is formed into a generally tubular shape, and the tobacco is positioned within the hollow region within that tube. Preferably, the wrapping material 160 is formed such that each end of the tobacco rod is open to expose the tobacco contained therein, and to allow the passage of drawn air therethrough.

The wrapping material 160 can vary. The wrapping material 160 can be a paper wrapping material of the type traditionally used for cigarette manufacture. The wrapping material 160 also can be composed of a laminate of metallic foil and paper, and as such, heat generated by the second heating element can heat the metallic foil of the laminate and hence heat the tobacco contained within that laminate. See, for example, the types of wrapping materials, wrapping material laminates and wrapping material configurations set forth U.S. patent application Ser. No. 11/377,630 filed Mar. 16, 2006 to Crooks et al.

For the embodiment shown, the cigarette 150 possesses a type of cartridge 85 at its distal end within the wrapping material 160 and in fluid communication with the tobacco rod. That optional cartridge 85 contains an aerosol-generating material composition 101 therein. The components of the composition 101 can include a substrate material (e.g., polyethylene terephthalate fibers) that can be mixed or blended with tobacco filler. Typically, the substrate materials act as carriers for tobacco components and other aerosol-forming materials that can be delivered to the mouth of the smoker. The cartridge 85 can have a generally tubular shape with open ends such that air may flow therethrough. Cartridges can be manufactured from a variety of materials, such as paper or plastic, or heat conductive materials (e.g., metal foil, metal mesh or screen, ceramic non-woven web, or the like). Typically, when present, the length of the cartridge 85 does not exceed about 30 mm, and often does not exceed about 20 mm. Typically, when present, the cartridge 85 has a length of at least about 5 mm, and often at least about 10 mm. Optionally, an air passageway or gap (not shown) can exist downstream from the cartridge 85, or the cartridge 85 can abut the tobacco rod as shown in FIG. 2 such that some migration of material between the tobacco rod and the cartridge is possible. Such an air passageway, when present, typically has a length of up to about 10 mm.

In one embodiment, the cartridge 85 and/or the wrapping material 160 of the tobacco rod can be manufactured from materials that, to some degree, conduct electricity. As such, depending upon the positioning of the cigarette 150 within the smoking article 10, the cartridge 85 and/or the wrapping material 160 can be in electrical contact with the electrical circuitry associated with the electrical resistance heating element 72. As a result, it is possible that some degree of electrical resistance heating also can be provided by the cartridge 85 and/or the wrapping material 160.

In one embodiment, the cartridge 85 can be virtually devoid or free of nicotine. For example, the cartridge 85 can contain aerosol-forming materials, non-tobacco flavoring agents, and optionally, tobacco (e.g., as pieces of tobacco or as an extract) that has been de-nicotinized (e.g., using de-nicotinization processes or by using tobaccos virtually devoid of nicotine). As such, visible aerosol or flavored visible aerosol that is produced solely using components incorporated within the container 85 possesses virtually no nicotine. Rather, nicotine provided to the smoker of the smoking article within the mainstream aerosol delivered by the smoking article is provided by action upon tobacco 89 located in another region of the smoking article 10 rather than from nicotine incorporation within the cartridge 85.

In one embodiment, the cartridge 85 can contain a gathered web of paper that incorporates carbon particles (e.g., about 10 to about 60 weight parts carbon and about 40 to about 90 weight parts wood pulp or flax fiber). See, for example, the types of carbon-containing papers set forth in U.S. Pat. No. 5,360,023 to Blakley et al., which is incorporated herein by reference. For example, a gathered sheet of carbon paper weighing about 40 mg, and having a length of about 10 mm to about 20 mm, can be saturated with a liquid mixture of glycerin, tobacco extract, and flavoring agent (e.g., with about 40 mg to about 120 mg of liquid mixture).

In a further embodiment, the cartridge 85 can contain a gathered web of paper that incorporates calcium carbonate particles (e.g., about 10 to about 40 weight parts calcium carbonate and about 60 to about 90 weight parts wood pulp or flax fiber). For example, a gathered sheet of carbon paper weighing about 40 mg, and having a length of about 10 mm to about 20 mm, can be saturated with a liquid mixture of glycerin, tobacco extract, and flavoring agent (e.g., with about 40 mg to about 100 mg of liquid mixture).

In yet another embodiment, the cartridge 85 can contain a fibrous carbonaceous material (e.g., graphite fibers). For example, a segment formed from about 40 mg to about 100 mg of those fibers, and having a length of about 10 mm to about 20 mm, can be saturated with a liquid mixture of glycerin, tobacco extract, and flavoring agent (e.g., in an amount of about 3 times of the dry weight of those fibers).

In a still further embodiment, the cartridge 85 can contain a reconstituted tobacco material (e.g., a cast sheet type material, an extruded material, or a paper-type reconstituted tobacco material) that incorporates particles or pieces of highly heat conductive materials (e.g., a matrix of aluminum wires, aluminum foil, copper wire, copper tubing, metal beads, or the like). Representative pieces or beads can have lengths, thicknesses or diameters of about 0.01 micrometers to about 1 mm. That material can act as a substrate for aerosol-forming material, tobacco extract, flavoring agents, and the like, and also can act as a conductor of heat produced by electrical resistance heating to regions within the cigarette 150.

If desired, the region of the cigarette 150 that is wrapped in the paper wrapper 160 can be composed entirely of tobacco material, processed tobacco material, or a blend of tobacco material and other substrate material, and those materials is treated in such a manner so as to act as substrates for aerosol-forming materials. For such an embodiment, the previously described cartridge 85 is not incorporated within the cigarette 150, and the components contained within the wrapping material 160 are not necessarily positioned or arranged therein in a segmented fashion.

The cigarette 150 also can possess an optional filter element 200 located at the downstream end of the tobacco rod. The filter element can be composed of filter material 215 (e.g., cellulose acetate tow, gathered polypropylene web, plasticized cellulose acetate tube, or the like) wrapped in circumscribing plug wrap 218. The filter element can be attached to the tobacco rod using a tipping material 222 that circumscribes the length of the filter element 200 and an adjacent region of the tobacco rod.

The mouth-end piece 120 of the smoking article 10 can be adapted to act as a support for the filter element 200 of the cigarette 150, and can be removably attached to the outer housing 20 of the smoking article. That is, the mouth-end piece 120 can be removed from the outer housing 20 of the smoking article 10, the filter element 200 of the cigarette 150 can be secured within the mouth-end piece (e.g., by friction fit), and the cigarette can be inserted into the downstream end of the outer housing. In such a circumstance, the mouth-end piece 120 can have a generally tubular shape. As such, the mouth-end piece can act as a type of support for the cigarette 120 while that cigarette is positioned within the outer housing 20 for use.

During use, the mouth-end 15 of the smoking article 10 is placed in the lips of the smoker. Air is drawn through the through the air passageways or openings 32 in the cap 35 located at the distal end 13 of the smoking article, and into the outer container 20. Draw air passages through air passageway 45 that extends along the length of the power source 36 and the electronic control components 50, through an air passageway area within the first optional heating element 70, through the air flow sensing region 60, past or through the second heating element 72, through the cigarette 150 (including through cartridge 85), and into the mouth-end piece 120. Heat generated by the heating elements acting upon the tobacco and components thereof acts to volatilize components of the tobacco or otherwise cause components of tobacco to be entrained in drawn air. As such, the resulting aerosol incorporating tobacco components or tobacco-derived components is drawn into the mouth of the smoker. After use, the spent cigarette 150 is removed from the outer container 20 and disposed of, and when desired, a new cigarette is replaced within the outer container.

Figure 3:
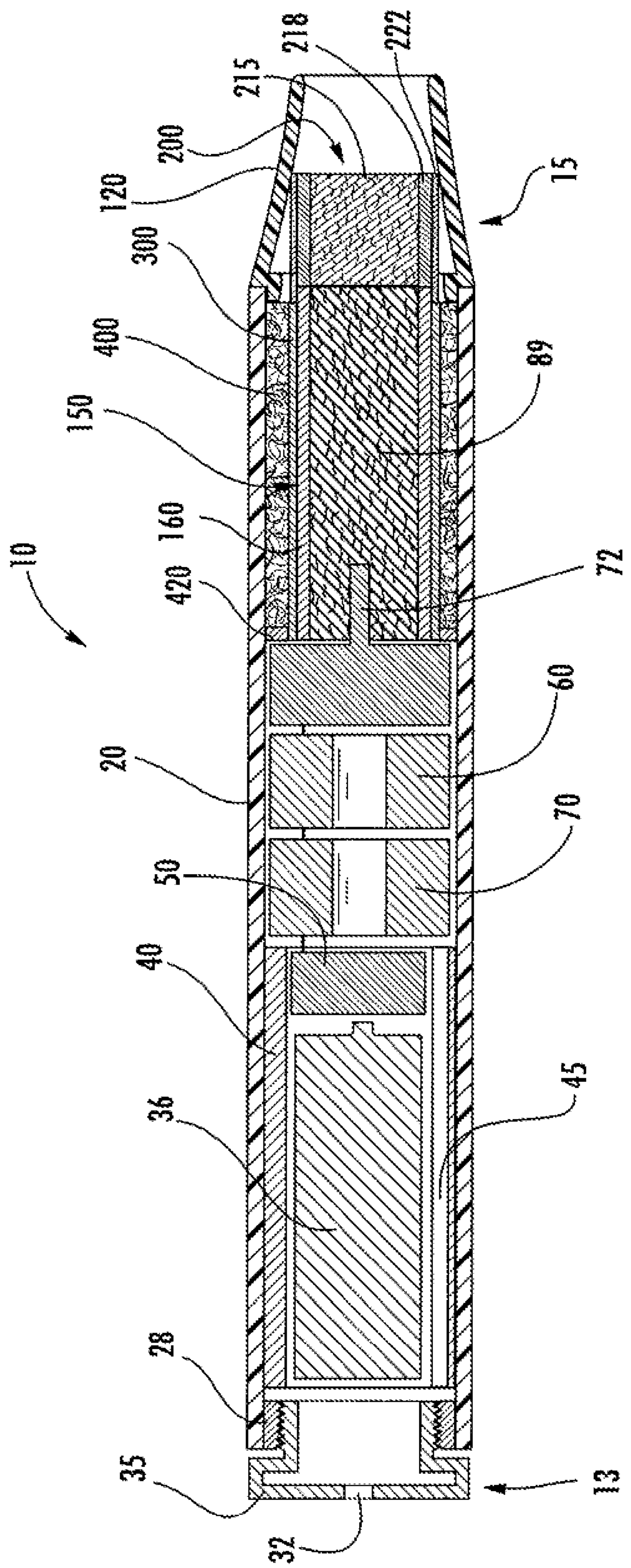

Referring to FIG. 3, yet another embodiment of a representative smoking article 10 is shown. The smoking article possesses a distal end 13 and a mouth-end 15. The smoking article 10 possesses certain components comparable to, and in certain regards operates in a manner generally comparable to, that smoking article described previously with reference to FIG. 1. The smoking article 10 is adapted to incorporate a type of cigarette 150. The tobacco segment 89, circumscribed with a wrapping material 160, can be provided so as to provide tobacco components or tobacco derived components by the action of heat. Components of the tobacco segment 89 can be treated (e.g., by contact with metal salts, moisture, or other suitable materials) in order that the tobacco (e.g., as cut filler, reconstituted tobacco sheet, or the like) that is subjected to heating by the action of the electrically generated heat exhibits desirable heat resistance, does not burn to an undesirable extent, experiences a controlled smolder, or the like. The tobacco segment 89 can also incorporate an aerosol-generating material. As shown, the cigarette 150 may include a filter element 200 as noted in connection with FIG. 2.

The smoking article 10 possesses a third optional resistance heating element 300 that is powered by the power source 36. The third resistance heating element is operated in essentially the same manner as the first and second resistance heating elements 70, 72 that have been described previously with reference to FIG. 1. As such, the third resistance heating element 300 is powered by the power source 36 and controlled by the electrically powered control components 50, through suitable electrical connections, such as conductive wires, or the like (not shown). The third resistance heating element 300 can be provided by a suitable conductive material that can be suitably used as a resistance heating element, such as non-woven graphite yarn or web, ceramic material, metallic cloth or screen, metal alloy sheet, or the like. The physical size and shape of the third resistance heating element is such that the heating element can provide heat to at least a portion of the tobacco 89 of the cigarette 150. For example, the third resistance heating element 300 can have the general shape of a tube that is adapted to fit snuggly around a portion of a tobacco rod 89 inserted therein. Alternatively, the third resistance heating element 300 can have a form so that aerosol-forming material and extracted tobacco components can be wicked from a tobacco substrate or a substrate paper material that is wrapped around that tobacco 89. If desired, at least one of the resistance heating elements (e.g., the first and/or third resistance elements) can be equipped with a separate on/off timing mechanisms and/or switching mechanisms in order that the cigarette 150 can be pre-heated or heating can be otherwise controlled during certain desired periods of use of the smoking article 10. In other words, each heating element can be selectively and separately controlled in certain embodiments. If desired, each of the heating elements can be arranged to have current pass therethrough (and hence provide heat) in response to a signal provided by response to the sensing mechanism component 60. For example, each heating element can be turned "on" and "off" in response to a signal provided by response to the sensing mechanism 60. Alternatively, current flow through the first heating element 70 can be controlled during periods of normal use of the smoking article 10, and current flow through the second heating element 72 can be controlled only during periods of draw. Thus, each resistance heating element can provide differing amounts of heat, and can be operated to provide heat during differing periods.

Optionally, the size and shape of the second resistance heating element 72 can be altered. For example, as shown in FIG. 3, at least a portion of the second resistance heating element can be elongated, and at least a portion thereof can extend downstream within the outer container 20. As such, at least a portion of the second resistance heating element can extend into the tobacco segment 89, and hence be in close contact with a significant amount of substrate and aerosol-forming material within the tobacco.

Preferably, a thermally insulated region 400 circumscribes the resistance heating element 300 of the smoking article 10 as shown, although the insulation can extend further down the smoking article and circumscribe, for example, the first and second heating elements as well. Representative types and configurations of insulation are set forth in U.S. patent application Ser. No. 11/194,215 filed Aug. 1, 2005, to Cantrell et al. and Ser. No. 11/377,630 filed Mar. 16, 2006 to Crooks et al. As such, there is provided a way to prevent the outer regions of the outer container 20 from becoming unduly hot to the touch during use of the smoking article 10. In addition, a series of substantially non-permeable walls or like structural regions 420 can assist in ensuring that drawn air has a tendency to pass through the tobacco 89 during use of the smoking article 10. The insulating material 400 also can be positioned elsewhere within the smoking article 10. For example, insulating material 400 can be used as a substrate material for tobacco extract, tobacco dust, aerosol-forming material, flavoring agent, and the like. In addition, insulating material 400 can be positioned at the locations or regions near the distal end 13 of the smoking article 10, around the power source 36, around the electronic and/or puff control components of the smoking article 10, or elsewhere.

During use, the mouth-end 15 of the smoking article 10 is placed in the lips of the smoker. Air is drawn through the air passageways or openings 32 in the cap 35 located at the distal end 13 of the smoking article, and into the outer container 20. Draw air passages through air passageway 45 that extends along the length of the power source 36 and the electronic control components 50, through an air passageway area within the first heating element 70, through the air flow sensing region 60, past or through the second heating element 72, through the cigarette 150, and into the mouth-end piece 120. Heat generated by the three heating elements 70, 72, 300 acting upon the tobacco and components thereof act to volatilize components of the tobacco or otherwise cause components of tobacco to be entrained in drawn air. Typically, resistance heating elements provide surface region temperatures, and hence the ability to heat aerosol-forming materials and tobacco materials in surrounding regions in the vicinity of those heating elements. Typically, during relevant periods of use, those heating elements can provide surface region temperatures of at least about 200° C., and often at least about 300° C. Those temperatures typically do not exceed about 600° ° C., often do not exceed about 500° C., and frequently do not exceed about 400° C. As such, the resulting aerosol incorporating tobacco components or tobacco derived components is drawn into the mouth of the smoker. After use, the spent cigarette 150 is removed from the outer container 20 and disposed of, and when desired, a new cigarette is replaced within the outer container. Removal of the cigarette 150 can be accomplished by removing the mouthpiece 120, which is typically removably attached to the outer housing 20.

For all the embodiments described above, the selection of battery and resistance heating elements can vary, and can be a matter of design choice. For example, the battery voltage, amount of electrical current and resistance provided by the various resistance heating elements can be selected to provide sufficient power for initial heating (e.g., sufficient to provide virtually immediate aerosol formation and delivery of tobacco derived components upon draw), adequate heating of relevant components within the smoking article (i.e., sufficient heat to generate aerosol formation), adequate power source lifetime, and the like. Typically, the various components of the various control circuitry acts to ensure that current is controlled in order that resistance heating heats relevant components to a desired temperature or within a desired temperature range (i.e., a preferred smoking article does not overheat). Selection of the power source and resistance heating elements can be a matter of design choice, and will be readily apparent to one skilled in the art of design and manufacture of electrical resistance heating systems.

If desired, the smoking articles 10 of the present invention optionally can be air diluted. For smoking articles 10 that optionally are air diluted or ventilated, the amount or degree of air dilution or ventilation can vary. Frequently, the amount of air dilution for an air diluted cigarette is greater than about 10 percent, generally is greater than about 20 percent, often is greater than about 30 percent, and sometimes is greater than about 40 percent. Preferably, the upper level for air dilution for an air diluted cigarette is less than about 80 percent, and often is less than about 70 percent. As used herein, the term "air dilution" is the ratio (expressed as a percentage) of the volume of air drawn through the air dilution means to the total volume and air and aerosol drawn through the cigarette and exiting the mouth end portion of the cigarette. Higher air dilution levels can act to reduce the transfer efficiency of aerosol-forming material into mainstream aerosol.

Preferred smoking articles 10 of the present invention exhibit desirable resistance to draw. For example, an exemplary smoking article exhibits a pressure drop of between about 50 and about 200 mm water pressure drop at 17.5 cc/sec. air flow. Preferred smoking articles exhibit pressure drop values of between about 60 mm and about 180, more preferably between about 70 mm to about 150 mm, water pressure drop at 17.5 cc/sec. air flow. Preferably, pressure drop values of smoking articles are measured using a Filtrona Cigarette Test Station (CTS Series) available form Filtrona Instruments and Automation Ltd.

Aerosols that are produced by smoking articles of the present invention are those that comprise air-containing components such as vapors, gases, suspended particulates, and the like. Aerosol components can be generated by the action of heat upon tobacco of some form; and in certain circumstances, by thermally decomposing tobacco caused by heating tobacco, smoldering tobacco, and charring tobacco; and by vaporizing aerosol-forming agent. As such, the aerosol can contain volatilized components, combustion products (e.g., carbon dioxide and water), incomplete combustion products, and products of pyrolysis. Aerosol components may also be generated by the action of heat from burning tobacco of some form (and optionally other components that are burned to generate heat), upon substances that are located in a heat exchange relationship with tobacco material that is burned and other components that are burned. Aerosol components may also be generated by the aerosol generation system as a result of the action of heat of the heat generation system. Most preferably, components resulting from the aerosol generation system have an overall composition, and are positioned within the smoking article, such that those components have a tendency not to undergo a significant degree of thermal decomposition (e.g., as a result of combustion, smoldering or pyrolysis) during conditions of normal use.

Figure 4:
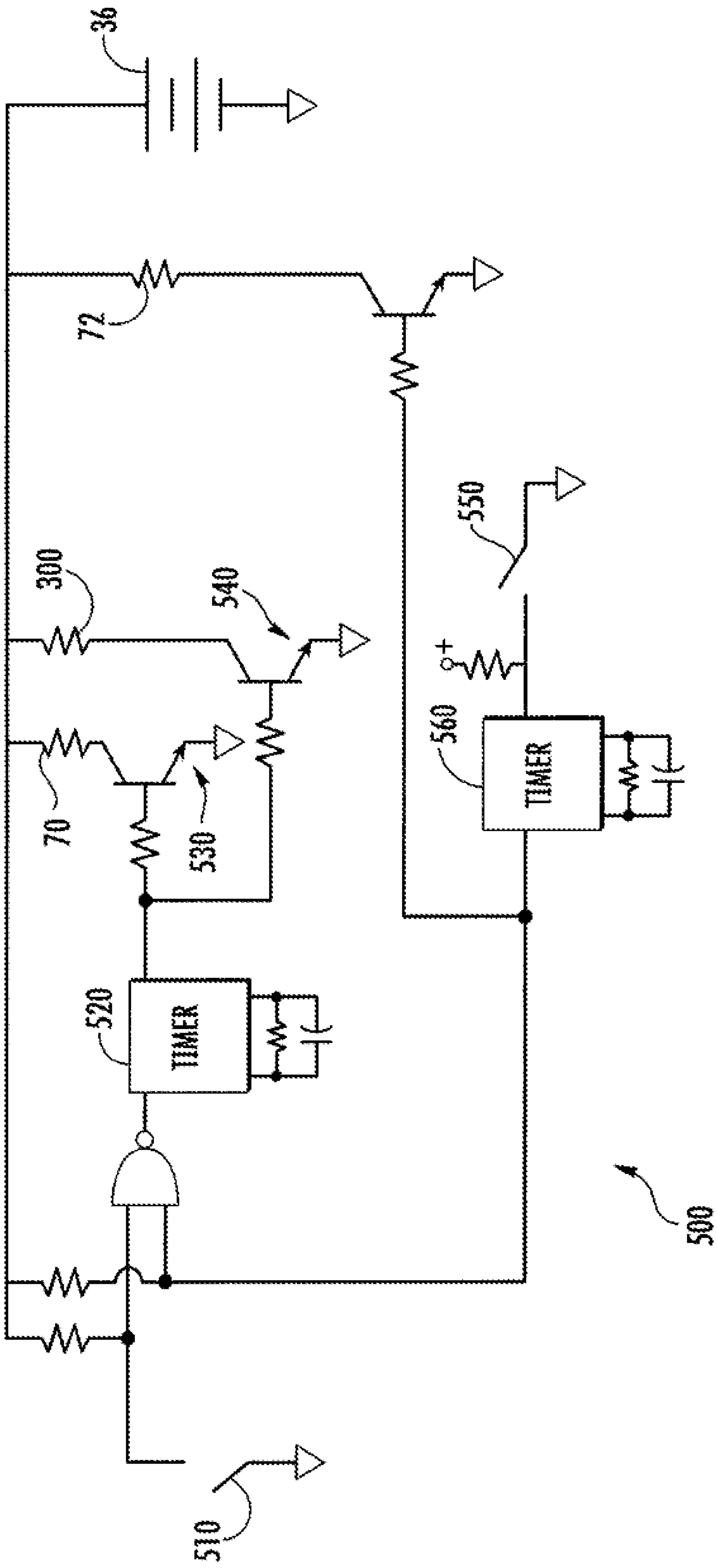
FIG. 4 and FIG. 5 each are representative schematic diagrams of electronic circuits for smoking articles.

Referring to FIG. 4, there is shown a diagram of an embodiment of an electronic circuit 500 that can be incorporated within a smoking article of the present invention. The control circuitry for the smoking articles of the invention can be assembled as discrete electronic components or functionally as an integrated microprocessor device. The representative circuit includes a power source 36, an actuation mechanism 510 (e.g., an actuation switch), and at least one resistance heating element; and for the embodiment shown, a first resistance heating element 70, a second resistance heating element 72, and a third resistance heating element 300. Such a circuit that incorporates three resistance heating elements can be incorporated within the type of smoking article described previously with reference to FIG. 3. It is noted that the circuit 500 of FIG. 4 can be readily adapted for use in a smoking article comprising two heating elements by simply removing the circuit pathways involving heating element 300, and thus would be suitable for use in the embodiments of FIGS. 1 and 2.

The actuation mechanism 510 typically is a switching mechanism that can be engaged by activity of the smoker. That is, such a switch can be activated by pressing or other type of movement by the smoker using his/her finger, by activation by contact with the lips of the smoker, or by at least one other type of sensing mechanism located at an appropriate location on the smoking article. A representative switch can be manually operated by the smoker.

The circuit preferably incorporates a timing mechanism 520. Such a timing mechanism can be programmed to provide for a controlled period of operation. For example, after the circuit has been activated by activity resulting in the switching of the current actuation mechanism 510 to an "on" position, the timing mechanism operates for a selected period of time (e.g., 1 minute, 2 minutes, 4 minutes, or the like). In the event that the remaining portion of the circuit is reactivated within the selected period of time, the timing mechanism 520 is reset and begins operating again. In the event of the occurrence a certain period of inactivity or non-use, the timing mechanism then can act to turn the circuit "off," until reactivation of the cycle.

During operation of the circuit, current passes through the first resistance heating element 70 and the third resistance heating element 300, and as such, those resistance heating elements produce heat. Control of the temperatures generated by each resistance heating element is provided by control mechanisms 530, 540, respectively.

A puff control mechanism 550, such as a suitable air flow sensing switch, acts to complete the circuit that provides current to the second resistance heating element 72. That is, during periods of draw, the circuit that provides current through the second resistance heating element is closed, and hence that heating element produces heat. A predetermined quantity of heat can be produced by current controlled by a timer (e.g., a fixed pulse set at about 0.5 second to about 2 seconds in duration). Alternatively, a series of "on/off" types of pulses can be provided during draw periods. When draw is complete, that circuit is broken. A control mechanism 560, such as a timer, acts to provide for control of the current passing through the circuit, and hence the amount of heat generated by heating element. For example, for longer puff periods, current supplied to the heating element, and hence power for aerosol generation, can be provided by a controlled sequential "on" and "off" signal provided by the timer. Typically, the timed period for current flow ranges from about 0.1 second to about 1 second, and about 0.2 second to about 0.6 second generally can be employed; while the "off" period for between periods of periodic current flow often can range from about 0.1 second to about 0.6 second.

Figure 5:
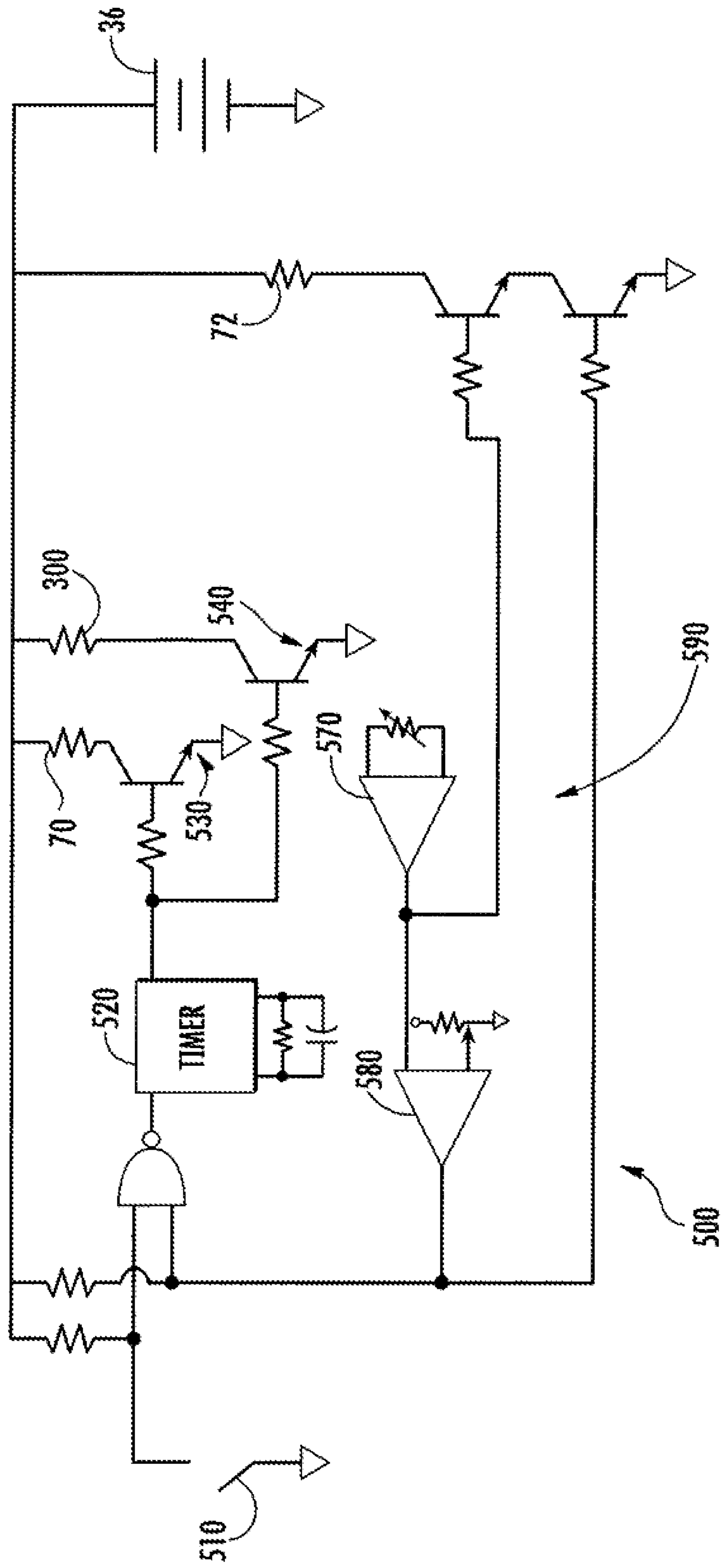

Referring to FIG. 5, there is shown a diagram of another embodiment of an electronic circuit 500 that can be incorporated within a smoking article of the present invention. It is again noted that the control circuitry for the smoking articles of the invention can be assembled as discrete electronic components or as an integrated microprocessor device. The representative circuit includes a power source 36, an actuation mechanism 510, and at least one resistance heating element; and for the embodiment shown, a first resistance heating element 70, a second resistance heating element 72, and a third resistance heating element 300. Such a circuit that incorporates three resistance heating elements can be incorporated within the type of smoking article described previously with reference to FIG. 3. Again, simply removing the third heating element 300 could produce a circuit useful in other smoking article embodiments set forth herein.

The circuit preferably incorporates a timing mechanism 520. Such a timing mechanism can be programmed to provide for a controlled period of operation. For example, after the circuit has been activated by activity resulting in the switching of the current actuation mechanism 510 to an "on" position, the timing mechanism operates for a selected period of time. In the event that the remaining portion of the circuit is activated, the timing mechanism is reset and begins operating again. In the event of the occurrence a certain period of inactivity or non-use, the timing mechanism then can act to turn the circuit "off."

During operation, current passes through the first resistance heating element 70 and the third resistance heating element 300, and as such, those resistance heating elements produce heat. Control of the temperatures generated by each resistance heating element is provided by control mechanisms 530, 540, respectively.

A puff control mechanism 590 acts to complete the circuit that provides current to the second resistance heating element 72. That is, during periods of draw, the circuit that provides current through the second resistance heating element is closed, and hence that heating element produces heat. When draw is complete, that circuit is broken. In the embodiment shown, the puff control mechanism 590 is provided by a pressure sensor 570 and a threshold detector 580 (e.g., a Schmitt trigger), which can provide for control of the current passing through the second resistance heating element 72, and hence for heat generation by heating element 72 that is proportional to the period and magnitude of the draw. For example, for longer puff periods, current supplied to the heating element 72, and hence power for aerosol generation, can be provided for longer periods of time. As another example, for deeper or more rigorous puffs, a sensing of stronger draw can be used to provide for greater current flow to the appropriate resistance heating element, and hence provide for a correspondingly greater aerosol generation. Alternatively, a separate switch (not shown) can be selected by the smoker to provide control of current to at least one of the resistance heating elements; and as such, during periods of draw (e.g., whether or not the draw or puff is intense, long, short, deep, shallow, large in volume, small in volume, or the like) the conditions associated with heat generation for aerosol formation are controlled, and hence, consistent aerosol formation can be provided during each puff.

Many modifications and other embodiments of the invention will come to mind to one skilled in the art to which this invention pertains having the benefit of the teachings presented in the foregoing description; and it will be apparent to those skilled in the art that variations and modifications of the present invention can be made without departing from the scope or spirit of the invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An electrically-powered, aerosol-generating smoking article comprising:

a housing;

an electrical power source within the housing;

a cartridge inserted into the housing, the cartridge including a liquid and electrical resistance heating powered by the electrical power source for heating the liquid to generate an aerosol, wherein the cartridge includes an air path arranged such that the aerosol is directed to exit the cartridge at a mouth end, a portion of the airpath being adjacent a resistive heating element; and an air passageway between the housing and the cartridge for air drawn into the smoking article.

2. The smoking article of claim 1, further comprising a mouthpiece attached proximate the mouth end of the cartridge.

3. The smoking article of claim 2, wherein the air drawn into the smoking article through the air passageway is air from outside of the smoking article.

4. The smoking article of claim 3, wherein the aerosol includes at least a portion of the air drawn through the air passageway.

5. The smoking article of claim 4, wherein a visible mainstream aerosol flows out the mouthpiece into a mouth of a user of the smoking article.

6. The smoking article of claim 2, wherein the mouthpiece is secured by a friction fit at the cartridge.

7. The smoking article of claim 2, wherein the air path through the cartridge comprises aerosol flowing to the mouthpiece.

8. The smoking article of claim 1, wherein the resistive heating element comprises an electrical resistance heater in the cartridge configured to perform the electrical resistance heating.

9. The smoking article of claim 8, wherein the liquid can be wicked into contact with the electrical resistance heater and volatilized to generate the aerosol.

10. The smoking article of claim 9, wherein the cartridge comprises an absorbent fibrous material absorbing at least a portion of the liquid that is wicked into contact with the electrical resistance heater to be vaporized to generate the aerosol that can be drawn into a mouth of the user of the smoking article.

11. The smoking article of claim 8, further comprising a puff-actuated controller comprising a sensor adapted to sense draw on the smoking article by a user.

12. The smoking article of claim 11, wherein the electrical resistance heater is powered by the electrical power source in response to the sensor sensing draw on the smoking article.

13. The smoking article of claim 1, wherein the air passageway is formed between an inner wall of the housing and an outer wall of the cartridge.

14. The aerosol-generating article of claim 1, wherein the liquid comprises glycerin, nicotine, and a flavoring agent.

15. The smoking article of claim 1, further comprising storage in the cartridge for the liquid.

16. The smoking article of claim 1, wherein a conductor of heat produced by the electrical resistance heating is in the form of wire, foil, tubing, or beads.

* * * * *